United States Patent
Maehara et al.

(10) Patent No.: US 8,855,649 B2
(45) Date of Patent: Oct. 7, 2014

(54) NETWORK SYSTEM, OFFLOAD DEVICE, AND USER IDENTIFICATION INFORMATION OBTAINING METHOD FOR OFFLOAD DEVICE

(71) Applicant: Fujitsu Limited, Kawasaki (JP)

(72) Inventors: Satoshi Maehara, Yokohama (JP); Masaharu Kako, Toukai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/692,450

(22) Filed: Dec. 3, 2012

(65) Prior Publication Data

US 2013/0189994 A1    Jul. 25, 2013

(30) Foreign Application Priority Data

Jan. 25, 2012 (JP) .................. 2012-012940

(51) Int. Cl.
*H04W 36/22* (2009.01)
(52) U.S. Cl.
CPC ..................... *H04W 36/22* (2013.01)
USPC ............................ 455/439; 455/436; 370/331
(58) Field of Classification Search
USPC ........ 455/414.1, 429, 435.1, 435.2, 436–439; 370/392, 328, 331, 332
See application file for complete search history.

(56) References Cited

U.S. PATENT DOCUMENTS

| 2005/0079878 | A1* | 4/2005 | Smith et al. ................ 455/456.5 |
| 2011/0038304 | A1* | 2/2011 | Lin et al. ........................ 370/328 |
| 2012/0082090 | A1* | 4/2012 | Horn et al. ..................... 370/328 |
| 2012/0082161 | A1* | 4/2012 | Leung et al. ................... 370/392 |
| 2013/0073581 | A1* | 3/2013 | Sandholm ...................... 707/769 |

FOREIGN PATENT DOCUMENTS

| JP | 2002-77381 | 3/2002 |
| JP | 2006-253794 | 9/2006 |

* cited by examiner

*Primary Examiner* — Cong Tran
(74) *Attorney, Agent, or Firm* — Staas & Halsey LLP

(57) ABSTRACT

A network system includes: a plurality of base stations, each with which a mobile station communicates; a core network to include one or more gateways, each with which the plurality of base stations communicates; a plurality of offload devices, each arranged between the base station and the gateway, each to serve as the gateway of an anchor point at which traffic to be offloaded is transmitted to or received from an offload network, and each to serve as the gateway of a relay point at which the traffic to be offloaded is relayed between the anchor point and one of the plurality of base stations with which the mobile station is communicating; a control station to control the traffic between the mobile station and the gateway; and one or more interception devices, each to intercept the traffic between the control station and the gateway.

5 Claims, 62 Drawing Sheets

FIG. 15

| S11 | Message type=Create Session Request |
|---|---|
| | IMSI=IMSI#x |
| | Sender F-TEID for Control Plane<br>=MME#1-GTP-c-TEID#x |
| | Bearer Contexts to Be Created<br>ESP Bearer ID=1<br>ESP Bearer ID=2 |
| GTP-c | TEID=0 |
| IP | SA:MME#1 IP Address, DA:SGW#1 IP Address |
| L2 | L2 HEADER |
| L1 | L1 HEADER |

FIG. 16

| S11 | Message type=Create Session Request |
|---|---|
| | Sender F-TEID for Control Plane<br>=SGW#1-GTP-c-TEID#x |
| | Bearer Contexts Created<br>ESP Bearer ID=1 \| GTP-TEID=TEID#SGW-u1<br>ESP Bearer ID=2 \| GTP-TEID=TEID#SGW-u2 |
| GTP-c | TEID=MME#1-GTP-c-TEID#x |
| IP | SA:SGW#1 IP Address, DA:MME#1 IP Address |
| L2 | L2 HEADER |
| L1 | L1 HEADER |

FIG. 17

| S11 | Message type=Delete Session Request |
|---|---|
| GTP-c | TEID=SGW#1-GTP-c-TEID#x |
| IP | SA:MME#1 IP Address, DA:S-GW#1 IP Address |
| L2 | L2 HEADER |
| L1 | L1 HEADER |

FIG. 18

USER DETERMINATION STATE TABLE  82a

| INTRA-S11-INTERCEPTION-DEVICE UE IDENTIFIER | USER IDENTIFIER (IMSI) | INTRA-MME-SIDE UE ORDER ID INFO | S-GW-SIDE UE CONTROL ID INFO |
|---|---|---|---|
| 1000 | IMSI#x | MME#1-GTP-c-TEID#x | S-GW#1-GTP-c-TEID#x |
| 1002 | IMSI#z | MME#4-GTP-c-TEID#z | S-GW#1-GTP-c-TEID#z |
|  |  |  |  |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO |
|---|---|---|
| 1000 | 1 | TEID#SGW-u1 |
| 1000 | 2 | TEID#SGW-u2 |
| 1000 | 3 | TEID#SGW-u3 |
| 1002 | 2 | TEID#SGW-u6 |
|  |  |  |
|  |  |  |
|  |  |  |
|  |  |  |

Bearer USER DETERMINATION TABLE ~175a ~175A

| INTRA-oGW UE IDENTIFIER | USER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8000 | IMSI#x | MME#1 UE S1AP ID#x | MME#1 | eNB UE S1AP ID#x | | eNB#1 |
| 8001 | IMSI#z | MME#1 UE S1AP ID#x | MME#1 | eNB UE S1AP ID#z | | eNB#1 |
| | | | | | | |
| | | | | | | |

Bearer USER DETERMINATION TABLE ~175b

| INTRA-oGW UE IDENTIFIER | T-Target CELL ID INFO | INTRA-T-Target-CELL UE ID INFO | | S-Target CELL ID INFO | INTRA-S-Target-CELL UE ID INFO |
|---|---|---|---|---|---|
| | T-Target Cell ID inf | T-C-RNTI inf | Target ID | S-Target Cell ID inf | S-C-RNTI inf |
| 8000 | | | | | |
| 8001 | | | | | |

Bearer TABLE ~175B

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| 8000 | 1 | TEID#SGW-u1 SGW#1 | eNB-TEID#1 eNB#1 | (OFFLOAD NOT APPLICABLE) | |
| 8000 | 2 | TEID#SGW-u2 SGW#1 | eNB-TEID#2 eNB#1 | TOF DL-TEID#1 | TOF UL-TEID#1 oGW#1 |
| 8000 | 3 | TEID#SGW-u3 SGW#1 | eNB-TEID#3 eNB#1 | (OFFLOAD NOT APPLICABLE) | |
| 8001 | 2 | TEID#SGW-u6 SGW#1 | eNB-TEID#4 eNB#1 | TOF DL-TEID#z | TOF UL-TEID#z oGW#1 |
| | | | | | |

FIG. 20

| INTRA-oGW UE IDENTIFIER | USER LINE IDENTIFIER (E RAB ID) | TCP Connection INFO | OFFLOAD ANCHOR POINT INFO |
|---|---|---|---|
| 8000 | 2 | UE#x-IP-Addr. port#10000 | TOF UL-TEID#1, oGW#1 |
| 8001 | 2 | UE#z-IP-Addr. port#10000 | TOF UL-TEID#3z, oGW#3 |
| 8000 | 2 | UE#x-IP-Addr. port#10001 | TOF UL-TEID#1, oGW#1 |
| 8000 | 2 | UE#x-IP-Addr. port#10002 | TOF UL-TEID#1, oGW#1 |
|  |  |  |  |
|  |  |  |  |
|  |  |  |  |

TOF RELAY MANAGEMENT TABLE 178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
| 4001 | IMSI#y | 2 | TOF UL-TEID#y | TOF DL-TEID#2y | oGW#2 |
| 4002 | IMSI#x | 2 | TOF UL-TEID#z | TOF DL-TEID#z | oGW#1 |
| | | | | | |
| | | | | | |

TOF Session MANAGEMENT TABLE 178b

| INTRA-oGW-ANCHOR UE IDENTIFIER | USER LINE IDENTIFIER | UE TCP Connection INFO | oGW TCP Connection INFO | Session STATE |
|---|---|---|---|---|
| 4000 | 2 | UE#x-IP-Addr. port=10000 | oGW#1-IP-Addr. port=20000 | UNDER CONNECTION |
| 4000 | 2 | UE#x-IP-Addr. port=10001 | oGW#1-IP-Addr. port=20010 | WAITING FOR UL DISCONNECT CONFIRMATION |
| 4000 | 2 | UE#x-IP-Addr. port=10002 | oGW#1-IP-Addr. port=20015 | WAITING FOR DL DISCONNECT CONFIRMATION |
| 4001 | 3 | UE#x-IP-Addr. port=10002 | oGW#1-IP-Addr. port=20011 | UNDER CONNECTION |
| | | | | |
| | | | | |
| | | | | |

| S1AP | Message type=Initial Context Setup Request |||
|---|---|---|---|
| | MME UE S1AP ID=MME#1 UE S1AP ID#x |||
| | eNB UE S1AP ID=eNB#1 UE S1AP ID#x |||
| | E RAB to Be Setup List |||
| | E RAB ID=1 | GTP-TEID=TEID#SGW-u1 ||
| | E RAB ID=2 | GTP-TEID=TEID#SGW-u2 ||
| SCTP | SCTP HEADER |||
| IP | SA:MME#1 IP Address, DA:eNB#1 IP Address |||
| L2 | L2 HEADER |||
| L1 | L1 HEADER |||

FIG. 26

| S1AP | Message type=Handover Required |
|---|---|
| | MME UE S1AP ID=MME#1 UE S1AP ID#x |
| | eNB UE S1AP ID=eNB#1 UE S1AP ID#x |
| | Target ID=eNB#2 |
| | Source to Target Transparent Container =Cell ID#x |
| SCTP | SCTP HEADER |
| IP | SA:eNB#1 IP Address, DA:MME#1 IP Address |
| L2 | L2 HEADER |
| L1 | L1 HEADER |

FIG. 27

| S1AP | Message type=Handover Request |
| --- | --- |
| | MME UE S1AP ID=MME#2 UE S1AP ID#x |
| | E RAB to Be Setup List |
| | E RAB ID=1 \| GTP-TEID=TEID#SGW-u21 |
| | E RAB ID=2 \| GTP-TEID=TEID#SGW-u22 |
| | Source to Target Transparent Container =Cell ID#x |
| SCTP | SCTP HEADER |
| IP | SA: MME#2 IP Address, DA: eNB#2 IP Address |
| L2 | L2 HEADER |
| L1 | L1 HEADER |

FIG. 28

| S1AP | Message type=Handover Request Ack. |
| --- | --- |
| | MME UE S1AP ID=MME#2 UE S1AP ID#x |
| | eNB UE S1AP ID=eNB#2 UE S1AP ID#x |
| | E RAB to Be Setup List |
| | E RAB ID=1 \| GTP-TEID=eNB-TEID#21 |
| | E RAB ID=2 \| GTP-TEID=eNB-TEID#22 |
| | Target to Source Transparent Container =C-RNTI#x |
| SCTP | SCTP HEADER |
| IP | SA: eNB#2 IP Address, DA: MME#2 IP Address |
| L2 | L2 HEADER |
| L1 | L1 HEADER |

FIG. 29

| S1AP | Message type=Handover Command |
| --- | --- |
| | MME UE S1AP ID=MME#1 UE S1AP ID#x |
| | eNB UE S1AP ID=eNB#1 UE S1AP ID#x |
| | Target to Source Transparent Container =C-RNTI#x |
| SCTP | SCTP HEADER |
| IP | SA:MME#1 IP Address, DA:eNB#1 IP Address |
| L2 | L2 HEADER |
| L1 | L1 HEADER |

FIG. 30

| S1AP | Message type=UE Context Release Command |
| --- | --- |
| | MME UE S1AP ID=MME#1 UE S1AP ID#x |
| | eNB UE S1AP ID=eNB#1 UE S1AP ID#x |
| SCTP | SCTP HEADER |
| IP | SA:MME#1 IP Address, DA:eNB#1 IP Address |
| L2 | L2 HEADER |
| L1 | L1 HEADER |

FIG. 31

| X2AP | Message type=Handover Request |  |
|---|---|---|
|  | Old eNB UE X2AP ID=eNB#1 UE X2AP ID#x |  |
|  | GUMMEI=MME#1 |  |
|  | UE Context Information |  |
|  | MME UE S1AP ID=MME#1 UE S1AP ID#x |  |
|  | E RAB to Be Setup List |  |
|  | E RAB ID=1 | UL GTP Tunnel Endpoint=TEID#SGW-u1 |
|  | E RAB ID=2 | UL GTP Tunnel Endpoint=TEID#SGW-u2 |
| SCTP | SCTP HEADER |  |
| IP | SA:eNB#1 IP Address, DA:eNB#2 IP Address |  |
| L2 | L2 HEADER |  |
| L1 | L1 HEADER |  |

FIG. 32

| X2AP | Message type=UE Context Release |
|---|---|
|  | Old eNB UE S1AP ID=eNB#1 UE X2AP ID#x |
|  | New eNB UE S1AP ID=eNB#2 UE X2AP ID#x |
| SCTP | SCTP HEADER |
| IP | SA:eNB#2 IP Address, DA:eNB#1 IP Address |
| L2 | L2 HEADER |
| L1 | L1 HEADER |

FIG. 43

| USER DETERMINATION STATE TABLE | | | | 82a |
|---|---|---|---|---|
| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO | |
| 1000 | IMSI#x | MME#1-GTP-c-TEID#x | S-GW#1-GTP-c-TEID#x | |
| | | | | |
| | | | | |
| | | | | |
| | | | | |

| USER-TEID (GTP-u) CORRESPONDENCE TABLE | | | 82b |
|---|---|---|---|
| INTRA-S11-INTERCEPTION-DEVICE UE IDENTIFIER | USER LINE IDENTIFIER | uplink LINE ASSIGNMENT INFO | |
| 1000 | 1 | TEID#SGW-u1 | |
| 1000 | 2 | TEID#SGW-u2 | |
| | | | |
| | | | |
| | | | |
| | | | |
| | | | |

FIG. 44

Bearer USER DETERMINATION TABLE — 175A

| INTRA-oGW UE IDENTIFIER | USER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8000 | IMSI#x | MME#1 UE S1AP ID#x | MME#1 | eNB UE S1AP ID#x | | eNB#1 |

Bearer USER DETERMINATION TABLE

| INTRA-oGW UE IDENTIFIER | INTRA-T-Target-CELL UE ID INFO | | INTRA-T-Target-CELL ID INFO | | INTRA-S-Target-CELL ID INFO | | INTRA-S-Target-CELL UE ID INFO |
|---|---|---|---|---|---|---|---|
| | T-C-RNTI inf | Target ID | T-Target Cell ID inf | | S-Target Cell ID inf | | S-C-RNTI inf |
| 8000 | | | | | | | |

Bearer TABLE — 175B

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO |
|---|---|---|---|---|---|---|---|
| 8000 | 1 | TEID#SGW-u1 | SGW#1 | eNB-TEID#1 | eNB#1 | (OFFLOAD NOT APPLICABLE) | |
| 8000 | 2 | TEID#SGW-u2 | SGW#1 | eNB-TEID#2 | eNB#1 | TOF DL-TEID#x | TOF UL-TEID#1 oGW#1 |

FIG. 45

TOF RELAY MANAGEMENT TABLE  178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
| | | | | | |
| | | | | | |
| | | | | | |
| | | | | | |

TOF Session MANAGEMENT TABLE  178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |
| | | | | |
| | | | | |
| | | | | |
| | | | | |
| | | | | |

FIG. 46

Bearer USER DETERMINATION TABLE

| INTRA-oGW UE IDENTIFIER | USER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8000 | IMSI#x | MME#1 UE S1AP ID#x | MME#1 | eNB UE S1AP ID#x | | eNB#1 |
| 8100 | IMSI#x | MME#1 UE S1AP ID#1x | MME#1 | eNB UE S1AP ID#1z | | eNB#1 |

← DELETE

175A Bearer USER DETERMINATION TABLE

| INTRA-oGW UE IDENTIFIER | INTRA-T-Target-CELL UE'ID INFO | | Target ID | INTRA-S-Target-CELL UE ID INFO | |
|---|---|---|---|---|---|
| | T-Target Cell ID inf | T-C-RNTI inf | | S-Target Cell ID inf | S-C-RNTI inf |
| 8000 | | | | | |
| 8100 | | | | | |

← DELETE

175B Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | | TOF ANCHOR POINT POSITION INFO | |
|---|---|---|---|---|---|---|---|---|---|
| 8000 | 1 | TEID#SGW-u1 | SGW#1 | eNB-TEID#1 | eNB#1 | (OFFLOAD NOT APPLICABLE) | | | |
| 8000 | 2 | TEID#SGW-u2 | SGW#1 | eNB-TEID#2 | eNB#1 | TOF DL-TEID#1 | eNB#1 | TOF UL-TEID#1 | oGW#1 |
| 8100 | 1 | TEID#SGW-u31 | SGW#3 | eNB-TEID#11 | eNB#1 | (OFFLOAD NOT APPLICABLE) | | | |
| 8100 | 2 | TEID#SGW-u32 | SGW#3 | eNB-TEID#12 | eNB#1 | TOF DL-TEID#11 | | TOF UL-TEID#11 | oGW#1 |

FIG. 47

TOF RELAY MANAGEMENT TABLE                              178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
| | | | | | |
| 4100 | IMSI#x | 2 | TOF UL-TEID#11 | TOF DL-TEID#11 | oGW#1 |
| | | | | | |

← DELETE

TOF Session MANAGEMENT TABLE                            178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |

FIG. 48

Old S11 INTERCEPTION DEVICE (S11 INTERCEPTION DEVICE #1)
USER DETERMINATION STATE TABLE — 82a(#1)

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 1000 | IMSI#x | MME#1-GTP-c-TEID#x | S-GW#1-GTP-c-TEID#x |
|  |  |  |  |
|  |  |  |  |
|  |  |  |  |
|  |  |  |  |

USER-TEID (GTP-u) CORRESPONDENCE TABLE — 82b(#1)

| INTRA-S11-INTERCEPTION-DEVICE UE IDENTIFIER | USER LINE IDENTIFIER | uplink LINE ASSIGNMENT INFO |
|---|---|---|
| 1000 | 1 | TEID#SGW-u1 |
| 1000 | 2 | TEID#SGW-u2 |
|  |  |  |
|  |  |  |
|  |  |  |

DELETE

New S11 INTERCEPTION DEVICE (S11 INTERCEPTION DEVICE #2)
USER DETERMINATION STATE TABLE — 82a(#2)

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 2000 | IMSI#x | MME#1-GTP-c-TEID#x | S-GW#3-GTP-c-TEID#3x |
|  |  |  |  |
|  |  |  |  |
|  |  |  |  |
|  |  |  |  |

USER-TEID (GTP-u) CORRESPONDENCE TABLE — 82b(#2)

| INTRA-S11-INTERCEPTION-DEVICE UE IDENTIFIER | USER LINE IDENTIFIER | uplink LINE ASSIGNMENT INFO |
|---|---|---|
| 2000 | 1 | TEID#SGW-u31 |
| 2000 | 2 | TEID#SGW-u32 |
|  |  |  |
|  |  |  |
|  |  |  |

FIG. 49

USER DETERMINATION STATE TABLE  82a

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 1000 | IMSI#x | MME#1-GTP-c-TEID#x | S-GW#1-GTP-c-TEID#x |
|  |  |  |  |
| 1100 | IMSI#x | MME#3-GTP-c-TEID#3x | S-GW#1-GTP-c-TEID#1x |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO | 82b |
|---|---|---|---|
| 1000 | 1 | TEID#SGW-u1 |  |
| 1000 | 2 | TEID#SGW-u2 |  |
|  |  |  |  |
| 1100 | 1 | TEID#SGW-u11 |  |
| 1100 | 2 | TEID#SGW-u12 |  |
|  |  |  |  |
|  |  |  |  |
|  |  |  |  |

DELETE

FIG. 50

Bearer USER DETERMINATION TABLE

| INTRA-oGW UE IDENTIFIER | USER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8000 | IMSI#x | MME#1 UE S1AP ID#x | MME#1 | eNB UE S1AP ID#x | | eNB#1 |
| 8100 | IMSI#x | MME#1 UE S1AP ID#3x | MME#3 | eNB UE S1AP ID#1x | | eNB#1 |
| | | | | | | |

→ DELETE

175A Bearer USER DETERMINATION TABLE

| INTRA-oGW UE IDENTIFIER | INTRA-T-Target-CELL ID INFO | | INTRA-T-Target UE ID INFO | INTRA-S-Target-CELL ID INFO | | INTRA-S-Target UE ID INFO |
|---|---|---|---|---|---|---|
| | T-Target Cell ID inf | Target ID | T-C-RNTI inf | S-Target Cell ID inf | S-Target Cell ID INFO | S-C-RNTI inf |
| 8000 | | | | | | |
| 8100 | | | | | | |
| | | | | | | |

→ DELETE

175B Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | | TOF ANCHOR POINT POSITION INFO | |
|---|---|---|---|---|---|---|---|---|---|
| 8000 | 1 | TEID#SGW-u1 | SGW#1 | eNB-TEID#1 | eNB#1 | (OFFLOAD NOT APPLICABLE) | | | |
| 8000 | 2 | TEID#SGW-u2 | SGW#1 | eNB-TEID#2 | eNB#1 | TOF DL-TEID#1 | eNB#1 | TOF UL-TEID#1 | oGW#1 |
| 8100 | 1 | TEID#SGW-u11 | SGW#1 | eNB-TEID#11 | eNB#1 | (OFFLOAD NOT APPLICABLE) | | | |
| 8100 | 2 | TEID#SGW-u12 | SGW#1 | eNB-TEID#12 | eNB#1 | TOF DL-TEID#11 | eNB#1 | TOF UL-TEID#11 | oGW#1 |
| | | | | | | | | | |

FIG. 51

TOF RELAY MANAGEMENT TABLE                                              178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
|  |  |  |  |  |  |
| 4100 | IMSI#x | 2 | TOF UL-TEID#11 | TOF DL-TEID#11 | oGW#1 | DELETE
|  |  |  |  |  |  |

TOF Session MANAGEMENT TABLE                                            178b

| INTRA-oGW-ANCHOR UE IDENTIFIER | USER LINE IDENTIFIER | UE TCP Connection INFO | oGW TCP Connection INFO | Session STATE |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

FIG. 53

Source oGW (=oGW#1)
TOF RELAY MANAGEMENT TABLE          178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
|  |  |  |  |  |  |
|  |  |  |  |  |  |
|  |  |  |  |  |  |

TOF Session MANAGEMENT TABLE          178b

| INTRA-oGW-ANCHOR UE IDENTIFIER | USER LINE IDENTIFIER | UE TCP Connection INFO | oGW TCP Connection INFO | Session STATE |
|---|---|---|---|---|
|  |  |  |  |  |
|  |  |  |  |  |
|  |  |  |  |  |
|  |  |  |  |  |

Target oGW (=oGW#2)
TOF RELAY MANAGEMENT TABLE          178a'

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4102 | IMSI#x | 2 | TOF UL-TEID#2 | TOF DL-TEID#2 | oGW#2 |
|  |  |  |  |  |  |
|  |  |  |  |  |  |
|  |  |  |  |  |  |

TOF Session MANAGEMENT TABLE          178b'

| INTRA-oGW-ANCHOR UE IDENTIFIER | USER LINE IDENTIFIER | UE TCP Connection INFO | oGW TCP Connection INFO | Session STATE |
|---|---|---|---|---|
|  |  |  |  |  |
|  |  |  |  |  |
|  |  |  |  |  |
|  |  |  |  |  |

FIG. 54

Source oGW (= oGW#1)
Bearer USER DETERMINATION TABLE

| INTRA-oGW UE IDENTIFIER | SUBSCRIBER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8000 | IMSI#x | MME#1 UE S1AP ID#x | MME#1 | eNB#1 UE S1AP ID#x | eNB#1 UE X2AP ID#x | eNB#1 |
|  |  |  |  |  |  |  |
|  |  |  |  |  |  |  |

Bearer USER DETERMINATION TABLE — 175A

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8000 |  |  |  |  |  |
|  |  |  |  |  |  |
|  |  |  |  |  |  |

Bearer TABLE — 175B

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
| 8000 | 1 | TEID#SGW-u1 SGW#1 | eNB-TEID#1 eNB#1 | (OFFLOAD NOT APPLICABLE) |  |
| 8000 | 2 | TEID#SGW-u2 SGW#1 | eNB-TEID#2 eNB#1 | TOF DL-TEID#1 | TOF UL-TEID#1 oGW#1 |
|  |  |  |  |  |  |

Target oGW (= oGW#2)
Bearer USER DETERMINATION TABLE

| INTRA-oGW UE IDENTIFIER | SUBSCRIBER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8102 | IMSI#x | MME#1 UE S1AP ID#x | MME#1 | eNB#2 UE S1AP ID#x |  | eNB#2 |
|  |  |  |  |  |  |  |

Bearer USER DETERMINATION TABLE — 175A'

| INTRA-oGW UE IDENTIFIER | T-Target Cell ID inf | T-C-RNTI inf | Target ID | S-Target Cell ID inf | S-C-RNTI inf |
|---|---|---|---|---|---|
| 8102 |  |  |  |  |  |
|  |  |  |  |  |  |
|  |  |  |  |  |  |

Bearer TABLE — 175B'

| INTRA-oGW UE IDENTIFIER | USER LINE IDENTIFIER | uplink LINE ASSIGNMENT INFO | downlink LINE ASSIGNMENT INFO | TOF SORTING POINT POSITION INFO | TOF ANCHOR POINT POSITION INFO |
|---|---|---|---|---|---|
|  |  |  |  |  |  |
| 8102 | 1 | TEID#SGW-u21 SGW#2 | eNB-TEID#21 eNB#2 | (OFFLOAD NOT APPLICABLE) |  |
| 8102 | 2 | TEID#SGW-u22 SGW#2 | eNB-TEID#22 eNB#2 | TOF DL-TEID#2 | TOF UL-TEID#2 oGW#2 |

FIG. 55

Source oGW (= oGW#1)
TOF RELAY MANAGEMENT TABLE 178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
| | | | | | |
| | | | | | |
| | | | | | |
| | | | | | |

TOF Session MANAGEMENT TABLE 178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |

Target oGW (= oGW#2)
TOF RELAY MANAGEMENT TABLE 178a'

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| | | | | | |
| 4102 | IMSI#x | 2 | TOF UL-TEID#2 | TOF DL-TEID#2 | oGW#2 |
| | | | | | |
| | | | | | |
| | | | | | |

TOF Session MANAGEMENT TABLE 178b'

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |

FIG. 56

S-GW ACCOMMODATION TABLE FOR S11 INTERCEPTION

| S-GW IDENTIFIER FOR INTERCEPTION | S-GW Address INFO | ACCOMMODATED S11 INTERCEPTION DEVICE INFO |
|---|---|---|
| S-GW#1 | S-GW#1 Address | S11 INTERCEPTION DEVICE #1 |
| S-GW#2 | S-GW#2 Address | S11 INTERCEPTION DEVICE #2 |
| S-GW#3 | S-GW#3 Address | S11 INTERCEPTION DEVICE #3 |
| S-GW#4 | S-GW#4 Address | S11 INTERCEPTION DEVICE #1 |
| | | |
| | | |
| | | |

FIG. 57 eNB ACCOMMODATION TABLE

| eNB IDENTIFIER | eNB Address INFO | ACCOMMODATED oGW INFO |
|---|---|---|
| eNB#1 | eNB#1 Address | oGW#1 |
| eNB#2 | eNB#2 Address | oGW#2 |
| eNB#3 | eNB#3 Address | oGW#2 |
| eNB#4 | eNB#4 Address | oGW#1 |
| | | |
| | | |
| | | |

FIG. 59

MME ACCOMMODATION TABLE FOR S11 INTERCEPTION

| MME IDENTIFIER FOR INTERCEPTION | MME Address INFO | ACCOMMODATED S11 INTERCEPTION DEVICE INFO |
|---|---|---|
| MME#1 | MME#1 Address | S11 INTERCEPTION DEVICE #1 |
| MME#2 | MME#2 Address | S11 INTERCEPTION DEVICE #2 |
| MME#3 | MME#3 Address | S11 INTERCEPTION DEVICE #3 |
| MME#4 | MME#4 Address | S11 INTERCEPTION DEVICE #1 |
| | | |
| | | |
| | | |

FIG. 60

USER DETERMINATION STATE TABLE                                82a

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 1000 | IMSI#x | MME#1-GTP-c-TEID#x | S-GW#1-GTP-c-TEID#x |
|  |  |  |  |
| 1100 | IMSI#x | MME#1-GTP-c-TEID#x | S-GW#3-GTP-c-TEID#3x |
|  |  |  |  |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO |
|---|---|---|
| 1000 | 1 | TEID#SGW-u1 |
| 1000 | 2 | TEID#SGW-u2 |
|  |  |  |
| 1100 | 1 | TEID#SGW-u31 |
| 1100 | 2 | TEID#SGW-u32 |
|  |  |  |
|  |  |  |
|  |  |  |

82b

DELETE

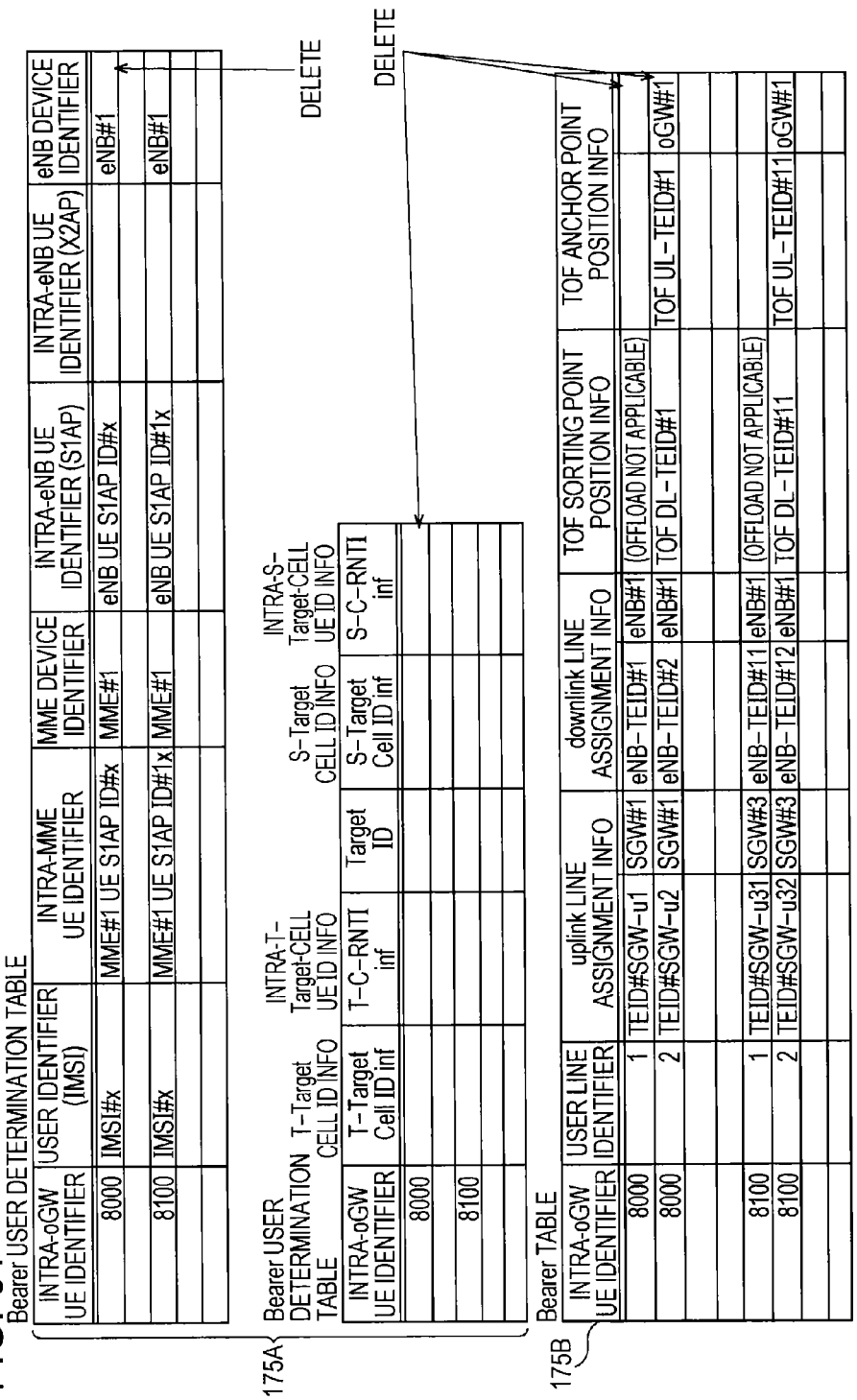

FIG. 62

TOF RELAY MANAGEMENT TABLE 178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
| | | | | | |
| 4100 | IMSI#x | 2 | TOF UL-TEID#11 | TOF DL-TEID#11 | oGW#1 |
| | | | | | |
| | | | | | |

← DELETE (pointing to oGW#1 in row 4000)

TOF Session MANAGEMENT TABLE 178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |
| | | | | |
| | | | | |
| | | | | |
| | | | | |

FIG. 64

Bearer USER DETERMINATION TABLE

| Intra-oGW UE IDENTIFIER | USER IDENTIFIER (IMSI) | INTRA-MME UE IDENTIFIER | MME DEVICE IDENTIFIER | INTRA-eNB UE IDENTIFIER (S1AP) | INTRA-eNB UE IDENTIFIER (X2AP) | eNB DEVICE IDENTIFIER |
|---|---|---|---|---|---|---|
| 8000 | IMSI#x | MME#1 UE S1AP ID#x | MME#1 | eNB UE S1AP ID#x | | eNB#1 |
| 8100 | IMSI#x | MME#1 UE S1AP ID#3x | MME#3 | eNB UE S1AP ID#1x | | eNB#1 |
| | | | | | | |

→ DELETE

175A Bearer USER DETERMINATION TABLE

| INTRA-oGW UE IDENTIFIER | T-Target CELL ID INFO | INTRA-T-Target-CELL UE ID INFO | S-Target CELL ID INFO | INTRA-S-Target-CELL UE ID INFO |
|---|---|---|---|---|
| | T-Target Cell ID inf | T-C-RNTI inf | S-Target Cell ID inf | S-C-RNTI inf |
| 8000 | | | | |
| 8100 | | | | |
| | | | | |

→ DELETE

175B Bearer TABLE

| INTRA-oGW UE IDENTIFIER | USER LINE IDENTIFIER | uplink LINE ASSIGNMENT INFO | | downlink LINE ASSIGNMENT INFO | | TOF SORTING POINT POSITION INFO | TOF ANCHOR POINT POSITION INFO |
|---|---|---|---|---|---|---|---|
| 8000 | 1 | TEID#SGW-u1 | SGW#1 | eNB-TEID#1 | eNB#1 | (OFFLOAD NOT APPLICABLE) | |
| 8000 | 2 | TEID#SGW-u2 | SGW#1 | eNB-TEID#2 | eNB#1 | TOF DL-TEID#1 | TOF UL-TEID#1 oGW#1 |
| 8100 | 1 | TEID#SGW-u11 | SGW#1 | eNB-TEID#11 | eNB#1 | (OFFLOAD NOT APPLICABLE) | |
| 8100 | 2 | TEID#SGW-u12 | SGW#1 | eNB-TEID#12 | eNB#1 | TOF DL-TEID#11 | TOF UL-TEID#11 oGW#1 |
| | | | | | | | |

FIG. 65

TOF RELAY MANAGEMENT TABLE     178a

| INTRA-oGW-ANCHOR UE IDENTIFIER | USER IDENTIFIER (IMSI) | USER LINE IDENTIFIER | TOF ANCHOR POINT POSITION | TOF SORTING POINT POSITION | |
|---|---|---|---|---|---|
| 4000 | IMSI#x | 2 | TOF UL-TEID#1 | TOF DL-TEID#1 | oGW#1 |
| | | | | | |
| 4100 | IMSI#x | 2 | TOF UL-TEID#11 | TOF DL-TEID#11 | oGW#1 |
| | | | | | |
| | | | | | |

← DELETE

TOF Session MANAGEMENT TABLE     178b

| INTRA-oGW-ANCHOR UE IDENTIFIER | USER LINE IDENTIFIER | UE TCP Connection INFO | oGW TCP Connection INFO | Session STATE |
|---|---|---|---|---|
| | | | | |
| | | | | |
| | | | | |
| | | | | |

FIG. 66

Source S11 INTERCEPTION DEVICE (S11 INTERCEPTION DEVICE #1)
USER DETERMINATION STATE TABLE — 82a

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 1000 | IMSI#x | MME#1-GTP-c-TEID#x | S-GW#1-GTP-c-TEID#x |
|  |  |  |  |
|  |  |  |  |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO | 82b |
|---|---|---|---|
| 1000 | 1 | TEID#SGW-u1 |  |
| 1000 | 2 | TEID#SGW-u2 |  |
|  |  |  |  |
|  |  |  |  |
|  |  |  |  |

Target S11 INTERCEPTION DEVICE (S11 INTERCEPTION DEVICE #2)
USER DETERMINATION STATE TABLE — 82a'

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 2000 | IMSI#x | MME#2-GTP-c-TEID#2x | S-GW#2-GTP-c-TEID#2x |
|  |  |  |  |
|  |  |  |  |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO | 82b' |
|---|---|---|---|
| 2000 | 1 | TEID#SGW-u21 |  |
| 2000 | 2 | TEID#SGW-u22 |  |
|  |  |  |  |
|  |  |  |  |

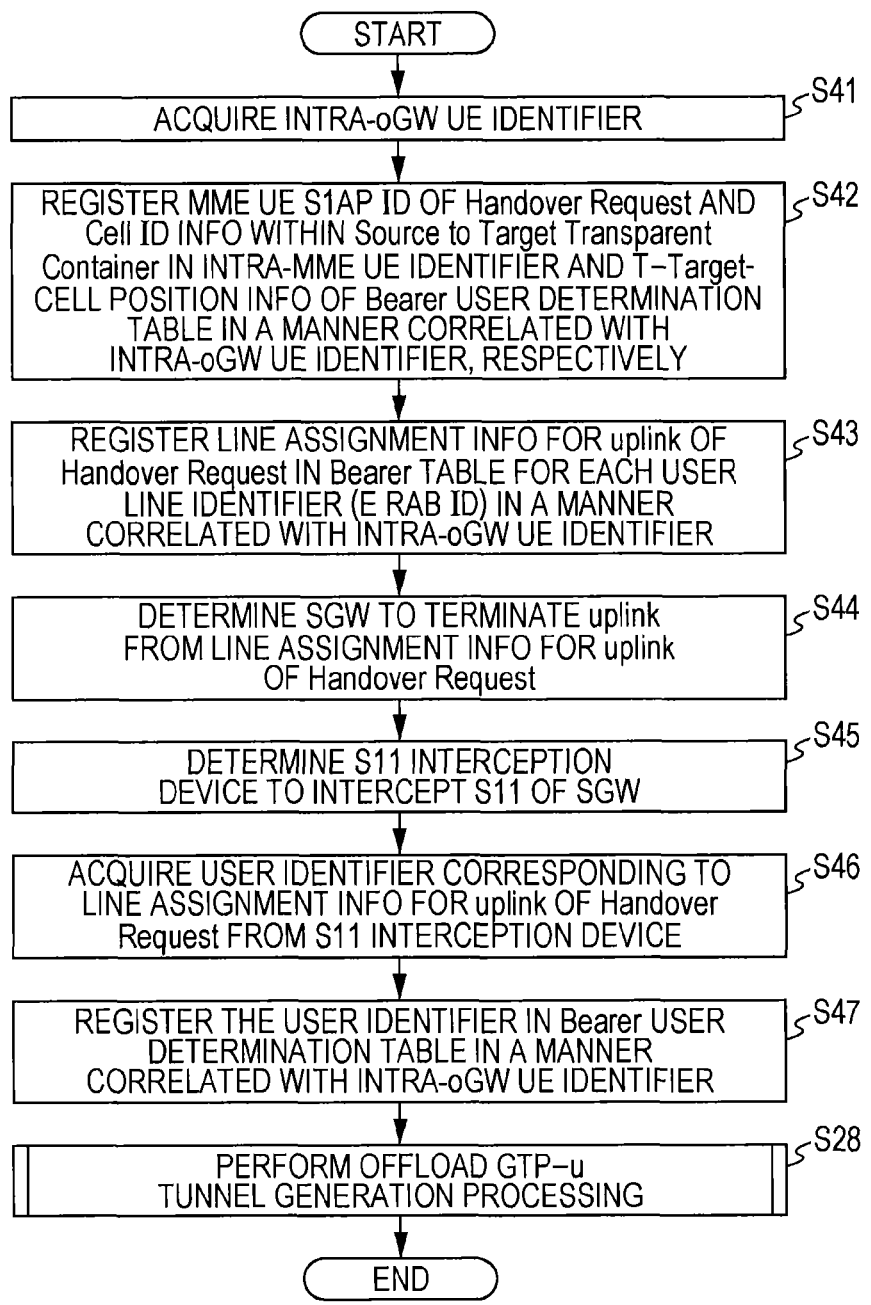

FIG. 69

Source S11 INTERCEPTION DEVICE (S11 INTERCEPTION DEVICE #1)
USER DETERMINATION STATE TABLE — 82a

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
| 1000 | IMSI#x | MME#1-GTP-c-TEID#x | S-GW#1-GTP-c-TEID#x |
|  |  |  |  |
|  |  |  |  |
|  |  |  |  |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO |
|---|---|---|
| 1000 | 1 | TEID#SGW-u1 |
| 1000 | 2 | TEID#SGW-u2 |
|  |  |  |
|  |  |  |
|  |  |  |

— 82b

Target S11 INTERCEPTION DEVICE (S11 INTERCEPTION DEVICE #2)
USER DETERMINATION STATE TABLE — 82a'

| INTRA-S11-INTERCEPTION-DEVICE UE IDENTIFIER | USER IDENTIFIER (IMSI) | MME-SIDE UE CONTROL ID INFO | S-GW-SIDE UE CONTROL ID INFO |
|---|---|---|---|
|  |  |  |  |
|  |  |  |  |
|  |  |  |  |
|  |  |  |  |
|  |  |  |  |

USER-TEID (GTP-u) CORRESPONDENCE TABLE

| INTRA-S11-INTERCEPTION-DEVICE UE IDENTIFIER | USER LINE IDENTIFIER | uplink LINE ASSIGNMENT INFO |
|---|---|---|
|  |  |  |
|  |  |  |
|  |  |  |
|  |  |  |
|  |  |  |

— 82b'

NETWORK SYSTEM, OFFLOAD DEVICE, AND USER IDENTIFICATION INFORMATION OBTAINING METHOD FOR OFFLOAD DEVICE

CROSS-REFERENCE TO RELATED APPLICATION

This application is based upon and claims the benefit of priority of the prior Japanese Patent Application No. 2012-012940 filed on Jan. 25, 2012, the entire contents of which are incorporated herein by reference.

FIELD

The embodiment discussed herein is related to a network system, an offload device, and a user identification information obtaining method for an offload device.

BACKGROUND

LTE/EPC (Long term Evolution/Evolved Packet Core) has been standardized with 3GPP as a mobile communication system according to the next generation of the third generation cellular phone network (3G mobile system). LTE/EPC includes an LTE network (wireless access network conforming to LTE: referred to as eUTRAN), and an EPC network (also referred to as SAE (System Architecture Evolution) serving as a core network (mobile transmission network)). The EPC network is connected to an IP (Internet Protocol) network (packet network) via an IMS (IP Multimedia Subsystem) network. Examples of the IP network includes an ISP (Internet Service Provider) network (the Internet) and an intranet.

A mobile station (User Equipment: UE) may be connected to the EPC network via the LTE network, and is connected to the IP network via the EPC network and IMS network. The UE may receive various packet communication services (e.g., Web service, VoIP (Voice over IP)) by accessing various servers and terminal devices connected to the IP network.

The EPC network includes multiple nodes such as MME (Mobility Management Entity), S-GW (Serving Gateway), P-GW (Packet Data Network Gateway), and PCRF (Policy and Charging rule Function). The UE is connected to the IMS network via an S-GW and a P-GW, whereby the UE can access the IP network.

In recent years, along with increase in web access via a mobile network such as LTE/EPC, a configuration to offload traffic from an S-GW to an offload network has been employed as a method to offload traffic for web access from a mobile network.

Japanese Laid-open Patent Publication Nos. 2006-253794 and 2002-77381 are examples of the related art of the present technology.

SUMMARY

According to an aspect of the invention, a network system includes: a plurality of base stations, each with which a mobile station communicates; a core network to include one or more gateways, each with which the plurality of base stations communicates; a plurality of offload devices, each arranged between the base station and the gateway, each to serve as the gateway of an anchor point at which traffic to be offloaded is transmitted to or received from an offload network, and each to serve as the gateway of a relay point at which the traffic to be offloaded is relayed between the anchor point and one of the plurality of base stations with which the mobile station is communicating; a control station to control the traffic between the mobile station and the gateway; and one or more interception devices, each to intercept the traffic between the control station and the gateway; wherein each of the one or more interception devices obtains user identification information of the mobile station by intercepting the traffic, and stores the user identification information, wherein each of the offload devices intercepts the traffic between the mobile station and the gateway at a time of starting of the traffic between the mobile station and the gateway, obtains line information used for the traffic, and receives the user identification information corresponding to the obtained line information from the interception device, wherein a first offload device of the offload devices, in a case that the first offload device serves as the offload device for a handover source according to handover of the mobile station, receives the user identification information from a second offload device of the offload devices for the handover source or the interception device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 indicates a structure example of a Create Session Request message;

FIG. 16 indicates a structure example of the Create Session Response message;

FIG. 17 indicates a structure example of a Delete Session Request message;

FIG. 18 indicates a structure example of TEID-IMSI correspondence state data;

FIG. 19 indicates a structure example of Bearer state management data at a sorting point;

FIG. 20 indicates a structure example of an offload condition application state table;

FIG. 21 indicates a data structure example of TOF relay state management data;

FIG. 25 indicates a structure example of an Initial Context Setup Request message;

FIG. 26 indicates a structure example of a Handover Required message;

FIG. 27 indicates a structure example of a Handover Request message;

FIG. 28 indicates a structure example of a Handover Request Ack. message;

FIG. 29 indicates a structure example of a Handover Command message;

FIG. 30 indicates a structure example of a UE Context Release Command message;

FIG. 31 indicates a structure example of an X2AP: Handover Request message;

FIG. 32 indicates a structure example of an X2AP: UE Context Release message;

FIG. 43 indicates a setting example of TEID-IMSI correspondence state data after activation (Attach) of UE;

FIG. 44 indicates a setting example of Bearer state management data in the state indicated in FIG. 43;

FIG. 45 indicates a setting example of TOF relay state management data in the state indicated in FIG. 43;

FIG. 46 indicates a setting example of Bearer state management data when restoring via an idle state of UE;

FIG. 47 indicates a setting example of TOF relay state management data when restoring via an idle state of UE;

FIG. 48 indicates a setting example of TEID-IMSI correspondence state data when restoring via an idle state of UE;

FIG. 49 indicates a setting example of TEID-IMSI correspondence state data after reactivation (re-Attach) of UE;

FIG. 50 indicates a setting example of Bearer state management data in the state indicated in FIG. 49;

FIG. 51 indicates a setting example of TOF relay state management data in the state indicated in FIG. 49;

FIG. 53 indicates a setting example of TOF relay state management data in the state indicated in FIG. 52;

FIG. 54 indicates a setting example of Bearer state management data at the X2-based handover;

FIG. 55 indicates a setting example of TOF relay state management data in the state indicated in FIG. 54;

FIG. 56 indicates a table structure example of information of the S11 interception device housing an S-GW for S11 protocol interception;

FIG. 57 indicates a table structure example of information of an offload GW housing an eNB;

FIG. 59 indicates a table structure example of information of an S11 interception device housing an MME for S11 protocol interception in the event that the S11 interception device has been disposed near the MME;

FIG. 60 indicates a setting example of TEID-IMSI correspondence state data when restoring via the idle state of UE in the event that an S11 interception device is disposed near an MME;

FIG. 61 indicates a setting example of Bearer state management data in the state indicated in FIG. 60;

FIG. 62 indicates a setting example of TOF relay state management data in the state indicated in FIG. 60;

FIG. 64 indicates a setting example of Bearer state management data in the state indicated in FIG. 63;

FIG. 65 indicates a setting example of TOF relay state management data in the state indicated in FIG. 63;

FIG. 66 indicates an example of setting values of TEID-IMSI correspondence state data at the time of a target offload GW intercepting Handover Request;

FIG. 67 illustrates a processing flow in the event of receiving a user identifier from an S11 interception device disposed near an S-GW at the time of interception of a Handover Request message (target MME->target eNB);

FIG. 69 indicates an example of setting values of TEID-IMSI correspondence state data at the time of a target offload GW intercepting X2AP: Handover Request.

DESCRIPTION OF EMBODIMENT

With the system above-mentioned, traffic is offloaded from the S-GW. This results a situation in which the resource of the EPC network has been consumed between a joint point of the wireless access network and the EPC network, and the S-GW.

There has been demand to offload traffic from the joint point between the wireless access network and EPC network in preparation for reduction in resource consumption of the EPC network in the light of the above problem. Regarding offload from such a joint point as well, it is desirable to realize a service requirement to determine a user such as accounting or the like in the same way as offload at the S-GW.

However, it has been very difficult to determine a communication line user at a joint point between the wireless access network and EPC network which are mobile networks. Communication of NAS (Non-Access Stratum) is passed through a joint point between the wireless access network and EPC network. There is IMSI (International Mobile Subscriber Identity) which uniquely determines a user within a NAS message. However, with mobile networks, in order to suppress spoofing of user equipment (UE), tampering with information, and so forth, communication of NAS is encrypted with an encryption procedure and encryption code that an MME (Mobility Management Entity) and UE agreed, GUTI (Global Unique Temporary Identity) is employed as a temporary user identifier instead of IMSI, and the MME successively changes the GUTI.

One aspect of the present technology is to provide technology whereby the user information of offload traffic is suitably obtained at an offload device.

Hereinafter, an embodiment of the present disclosure will be described with reference to the drawings. The configuration of the embodiment is an example, and the present disclosure is not restricted to the configuration of the embodiment.

The present embodiment has a configuration as described below.

(1) A user identifier (IMSI) and line assignment information used for communication are stored in a correlated manner by intercepting an S11 signal between an MME and an S-GW. The user identifier and line assignment information are held at a table, for example.

(2) An offload GW (oGW) determines, with eNodeB-SGW section setting (Initial Context Setup Request) at communication line settings as to a mobile terminal (UE) as a trigger, a user identifier coincided with line assignment information that the eNodeB-SGW section setting thereof indicates, from storage information in the above-mentioned (1), and stores this. The user identifier to be stored is held at a table, for example.

(3) With handover along with movement of UE as a trigger, a handover destination oGW obtains a user identifier in the above-mentioned (2) that the handover source oGW has, and stores this. The handover destination oGW may hold the obtained user identifier at a table, for example.

Overall Configuration

Figure 1:
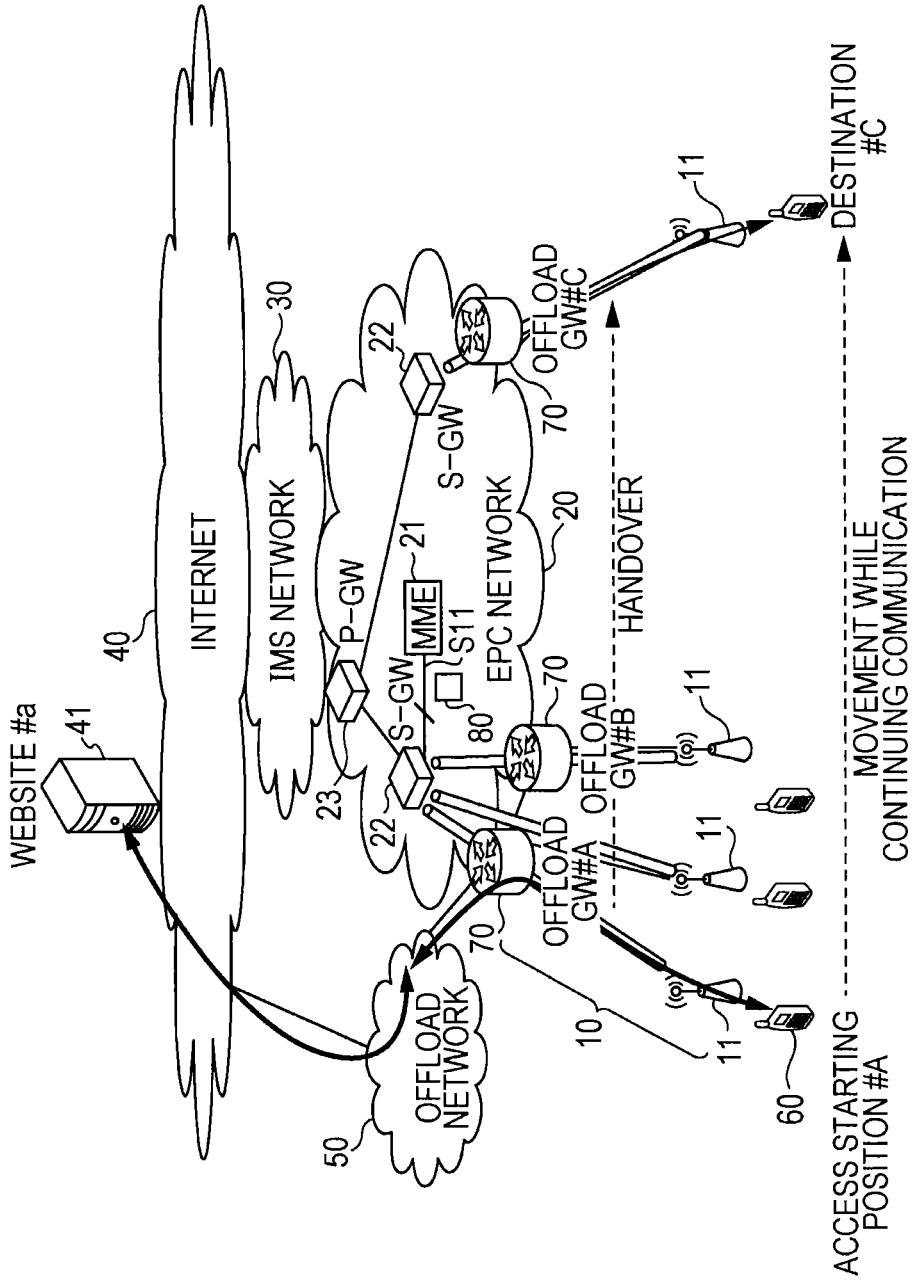
FIG. 1 illustrates a configuration example of a network system according to an embodiment.

FIG. 1 illustrates a configuration example of a network system according to the embodiment. The network system illustrated in FIG. 1 briefly includes an LTE network (eUTRAN) 10, an EPC network 20, an IMS network 30, an ISP (Internet Service Provider) network (Internet) 40, and an offload network 50. The LTE network 10 is an example of a wireless access network, and the EPC network is an example of a core network. The ISP network 40 is an example of a packet network (IP network).

The LTE network 10 includes multiple base stations (eNodeB (eNB)) 11 to which user equipment (hereafter, also referred to as UE) 60 may be connected.

A web server 41 configured to provide a website #a is exemplified in the ISP network 40. However, the web server 41 is an example of a communication partner (correspondence node: server and terminal device) of the UE 60 connected to the ISP network 40. The types of the server and terminal device, and services to be provided are not restricted.

The User Equipment 60 is wirelessly connected to the base station 11, whereby the UE can communicate with a communication partner connected to the ISP network 40 such as the web server 41 via the EPC network 20. The User Equipment 60 may continue communication with a communication partner by changing the connection destination base station 11 (handover) according to movement of the User Equipment 60.

The EPC network 20 includes various nodes such as an MME (Mobility Management Entity) 21, an S-GW (Serving-Gateway) 22, a P-GW (Packet Data Network-Gateway) 23, and a PCRF (Policy and Changing Rule Function) (not illustrated). The MME 21 handles a C plane (Control Plane) for network control. The MME 21 performs movement control, such as establishment/release of Bearer (connection between a user and a packet network), position registration or handover of User Equipment 60. Also, the MME 21 performs authentication of User Equipment in collaboration with an HSS (Home Subscriber Server: not illustrated) in which subscriber information is registered. The MME 21 is an example of a control station.

The S-GW 22 handles a U plane (User Plane) which is the packet data of user data. The S-GW 22 may serve as an anchor point of the wireless access network of 3GPP (eNB, 2G/3G), and perform relay processing of user packet data with the P-GW 23.

The P-GW 23 serves as a connection point as to a packet network such as the ISP network 40. The P-GW 23 performs handover of an IP address as to user equipment, user authentication relating to connection to a packet network at the time of Bearer establishment. Further, the P-GW 23 has functions such as QoS (Quality of Service) control in accordance with a PCRF's instructions, accounting data generation, and a DHCP (Dynamic Host Configuration Protocol) server. The number of each node such as the MME 21, S-GW 22, and P-GW 23 is one or more in the EPC network 20.

The base station 11 is connected to the MME 21 by a U-plane interface called as "S1-MME interface". Also, the base station 11 is connected to the S-GW 22 by an interface called as "S1-U interface". The S-GW 22 and MME 21 are connected by a C-plane interface called as "S11 interface". The S-GW 22 and P-GW 23 are connected by a U-plane interface called as "S5", and an interface for U-plane. Also, the base stations 11 are connected by an interface called as "X2 interface".

Further, the network system illustrated in FIG. 1 includes multiple offload GWs (oGWs) 70 and S11 interception devices 80. The S11 interception device 80 intercepts a signal (S11 signal) to be transmitted/received between the MME 21 and S-GW 22 via the S11 interface to obtain a user identifier (IMSI). The S11 interception device 80 is installed between the MME 21 and S-GW 22. At this time, the S11 interception device 80 may be installed in a position closer to the S-GW 22 than the MME21. Conversely, the S11 interception device 80 may be installed in a position closer to the MME 21 than the S-GW 22. The S11 interception device 80 may be provided for each S11 interface. The S11 interception device 80 is an example of an interception device.

The oGWs 70 are each disposed in a boundary between the LTE network 10 and EPC network 20, and offload traffic toward the EPC network 20 to the offload network 50. With the example illustrated in FIG. 1, oGW#A, oGW#B, and oGW#C are illustrated as examples of the oGWs 70. However, the number of installations of oGWs 70 can be determined as appropriate. For example, the oGWs 70 may be disposed for each base station 11. The oGWs 70 are examples of a plurality of offload devices.

For example, in the event that User Equipment 60 communicates with the web server 41, the User Equipment 60 is connected to the IPS network 40 via the base station 11, S-GW 22, and P-GW 23, whereby the User Equipment 60 can access the web server 41. Of the traffic flowing over such an EPC network 20, oGWs 70 change the route of traffic to be offloaded to a route reaching the web server 41 via the offload network 50. Thus, the amount of traffic which flows into the EPC network 20 may be reduced. Also, an oGW is disposed in a boundary (connection point), thereby restraining the resource consumption of the EPC network 20.

Configurations of S11 Interception Device and oGW

Figure 2:
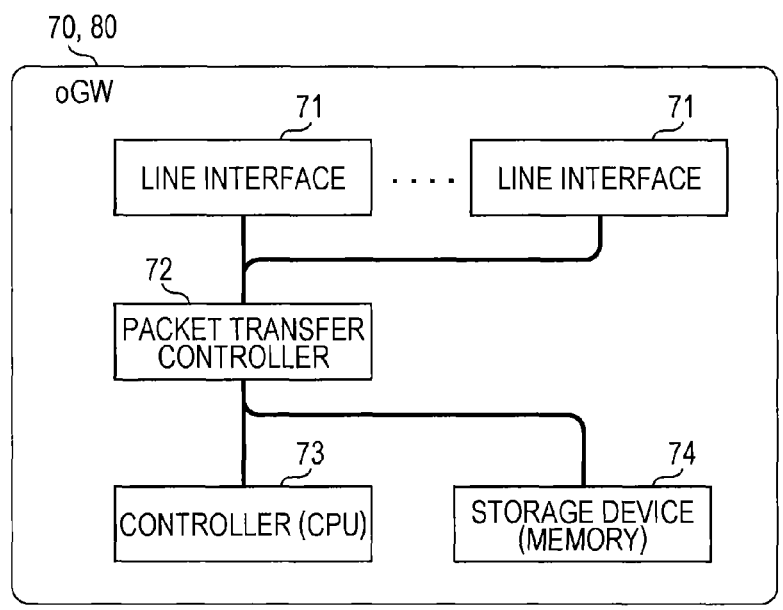
FIG. 2 illustrates a hardware configuration example of an S11 interception device and an oGW.

FIG. 2 illustrates a hardware configuration example of the S11 interception device 80 and oGW 70. The same hardware configuration may be applied to the S11 interception device 80 and oGW 70. Hereafter, the oGW 70 will be described as an example.

In FIG. 2, the oGW 70 includes multiple line interfaces 71, a packet transfer controller 72 connected to the line interfaces 71, and a CPU (Central Processing Unit) 73 and a storage device 74 which are connected to the packet transfer controller 72.

The line interfaces 71 house various lines such as a line configured to connect the base station 11 and S-GW 22, a line configured to connect the base station 11 and MME 21, and a line configured to connect oGWs 70. With the oGWs 70, there are provided one or more line interfaces 71 corresponding to the number of lines which the oGWs 70 house. The line interfaces 71 are formed of a general-purpose or dedicated semiconductor circuit (LSI, ASIC, or the like).

The packet transfer controller 72 performs packet transfer processing. Specifically, the packet transfer controller 72 includes a routing table, calculates an output port corresponding to the destination address of a packet from the routing table, and transmits the packet to the output port. The packet transfer controller 72 is an example of a communication device. The packet transfer controller 72 may be formed as a circuit chip on which a general-purpose or dedicated semiconductor circuit (LSI, ASIC, programmable logic device (PLD), DSP (Digital Signal Processor), or the like) is mounted.

The CPU 73 controls the entire operation of the oGW 70 through the control of the packet transfer controller 72. The CPU 73 is an example of a controller (control unit), and an example of a processor. Note that a controller configured to take charge of the function of the CPU 73 may be realized by application of a dedicated or general-purpose hardware chip.

The storage device 74 is formed of, for example, semiconductor memory such as ROM (Read Only Memory), RAM (Random Access Memory), EEPROM (Electrically Erasable Programmable Read-Only Memory), flash memory, or the like. The storage device 74 provides the work area of the CPU 73, the storage areas of various programs to be executed by the CPU 73, and data to be used at the time of executing a program.

Figure 3:
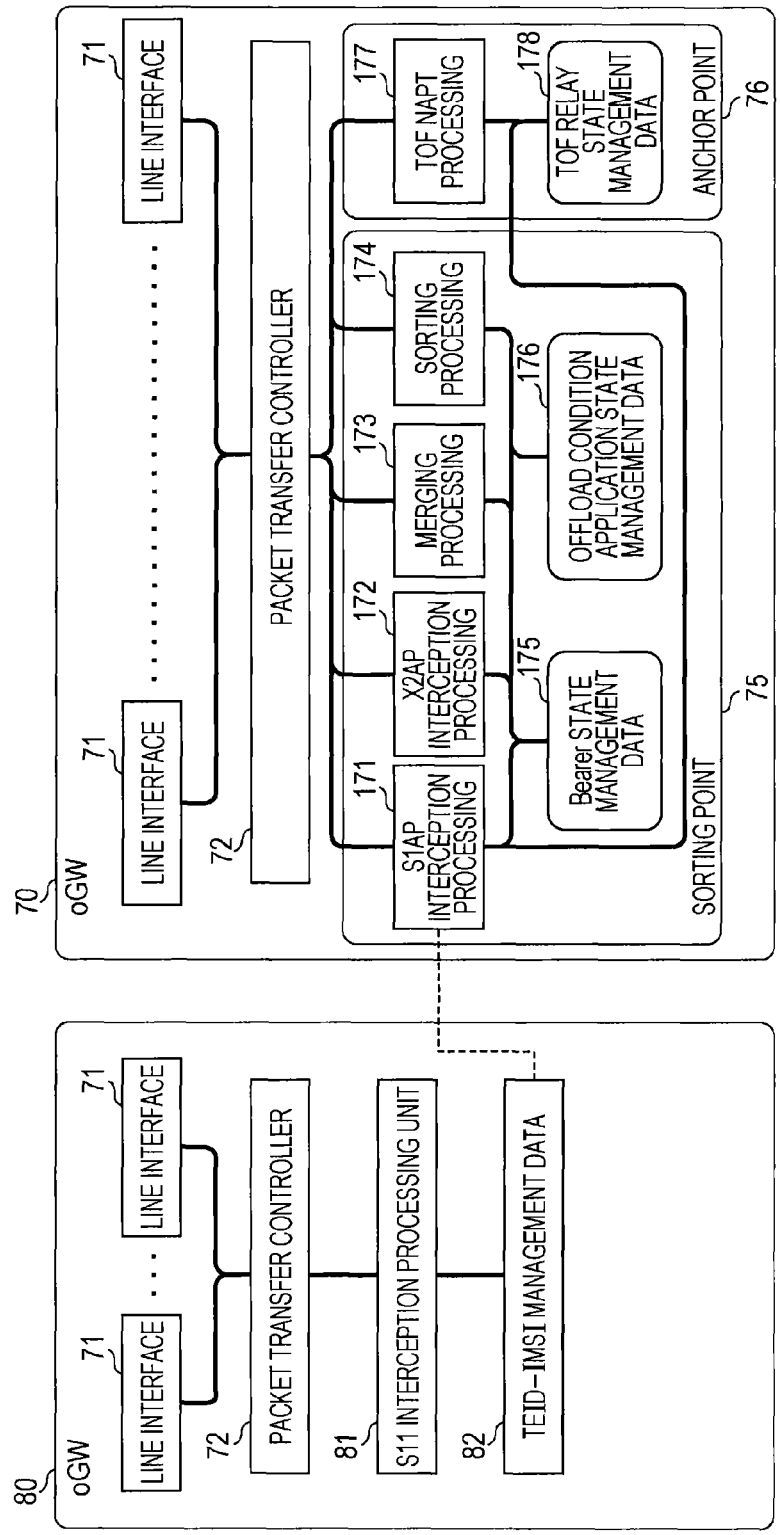
FIG. 3 is an explanatory diagram of functions of an oGW and an S11 interception device realized by the CPU illustrated in FIG. 2 executing a program stored in a storage device.

FIG. 3 is an explanatory diagram of the functions of the oGW 70 and S11 interception device 80 to be executed by the CPU 73 illustrated in FIG. 2 executing a program stored in the storage device 74. As illustrated in FIG. 3, the S11 interception device 80 executes S11 interception processing to intercept an S11 signal to be received at the line interface 71 by the CPU 73 executing the program. Also, the S11 interception device 80 stores TEID (Tunnel Endpoint Identifier)-IMSI correspondence state management data 82 in the storage device 74 by program execution of the CPU 73. The TEID is the identifier of a GTP tunnel.

On the other hand, with oGWs 70, the CPU 73 serves as a sorting point (relay point) 75 and an anchor point 76 by the CPU 73 executing the program. A function serving as the sorting point (relay point) 75 includes S1AP interception processing 171, X2AP interception processing 172, merging processing 173, and sorting processing 174. Bearer state management data 175 and offload condition application state management data 176 are stored in the storage device 74. A function serving as the anchor point 76 includes TOF (Trame Omoad Function) NAPT (Network Address Port Translation) processing 177, and TOF relay state management data 178 is stored in the storage device 74.

The S11 interception device 80 and oGW 70 are connected by a communication line, and the oGW 70 receives the TEID-IMSI correspondence state management data 82 from the S11 interception device 80, which may be used at the S1AP interception processing 171.

Figure 4:
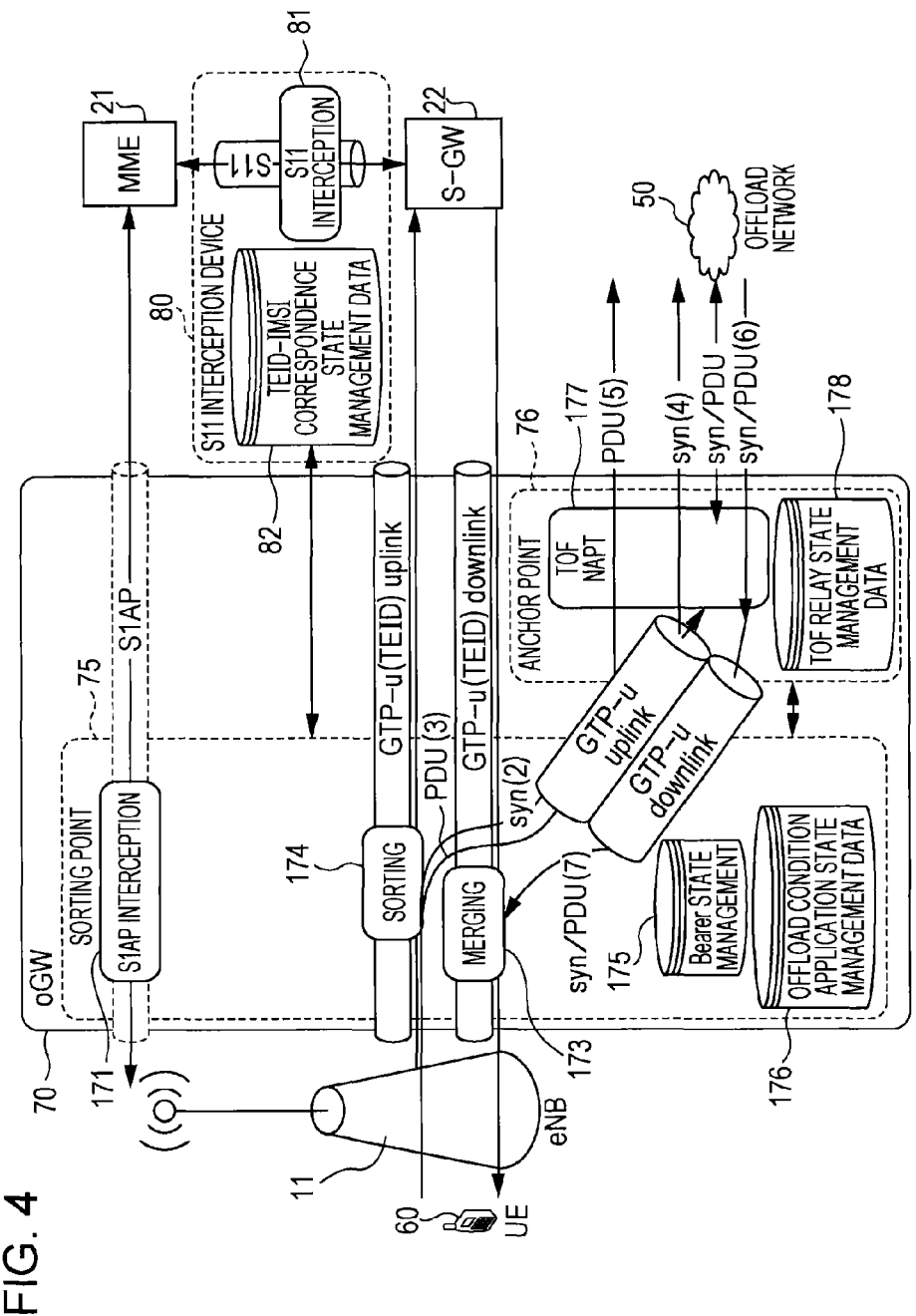
FIG. 4 is an explanatory diagram of a function that the CPU illustrated in FIG. 3 realizes.

FIG. 4 is an explanatory diagram of a function to be executed by the CPU 73 illustrated in FIG. 3. In FIG. 4, the S11 interception device 80 intercepts an S11 signal flowing into the S11 interface connecting the MME 21 and S-GW 22 to obtain IMSI which is a user identifier, by S11 interception processing 81 of the CPU 73, and stores this as TEID-IMSI correspondence state management data 82 in a manner correlated with the corresponding line assignment information (TEID). The TEID-IMSI correspondence state management data 82 is obtained from the S11 interception device 80 at the processing of the sorting point 75 of the oGW 70, and is stored as part of the Bearer state management data 175.

In FIG. 4, the S1AP interception processing 171 of the oGW 70 intercepts a control packet based on the S1AP (S1 Application Protocol) to be transmitted/received between the base station 11 and S-GW 22. The S1AP is a C-plane protocol which provides a signaling service between the base station 11 (eUTRAN) and MME 21 (EPC). Examples of functions that the S1AP includes include establishment, change, and release of Bearer, handover control, and incoming control as to standby user equipment.

The sorting processing 174 causes, of traffic flowing into the GTP-u (GPRS Tunneling Protocol for User Plane) tunnel of uplink, traffic to be offloaded to branch to the TOF NAPT processing 177. GTP-u is a protocol for IP transmission between the base station 11 and S-GW 22. The traffic flows into the GTP-u tunnel established between the base station 11 and S-GW 22 based on the GTP-u.

The merging processing 173 is to merge offload traffic from the TOF NAPT processing 177 into traffic from the S-GW 22 which flows into the downlink GTP-u tunnel.

The TOF NAPT processing 177 of the anchor point 76 performs NAPT processing between the EPC network 20 and offload network 50 (IP address conversion relating to traffic to be offloaded, TCP/UDP port conversion).

Figure 5:
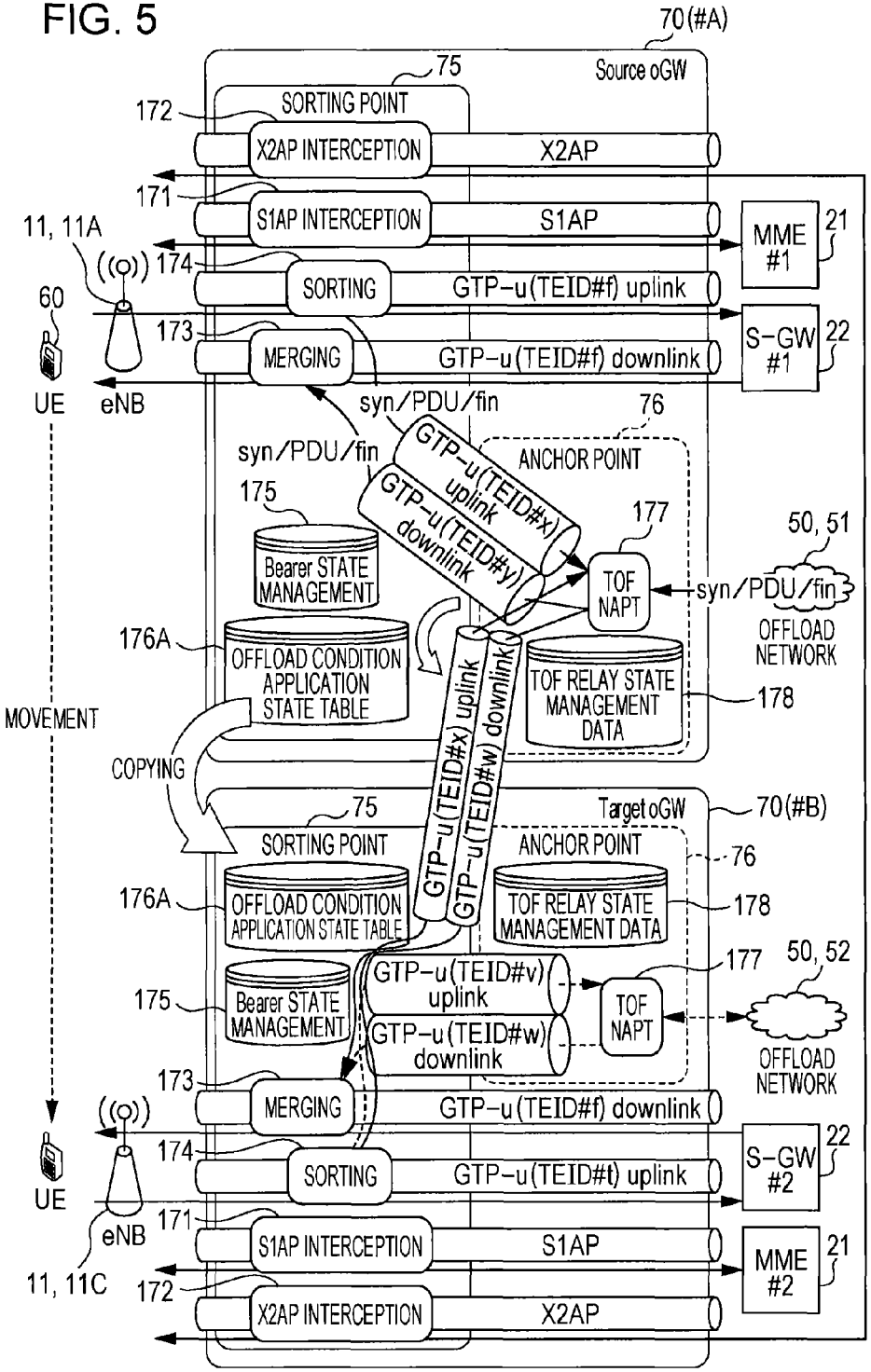
FIG. 5 is an explanatory diagram of a function that the CPU illustrated in FIG. 3 realizes.

FIG. 5 is an explanatory diagram of a function that the CPU 73 illustrated in FIG. 3 realizes. FIG. 5 indicates an oGW 70 (#A) serving as a source oGW, and an oGW 70 (#B) serving as a target oGW according to handover of the User Equipment 60 (11A->11C).

In FIG. 5, the S1AP interception processing 171 intercepts a control packet based on the S1AP (S1 Application Protocol). The X2AP interception processing 172 intercepts a control packet based on the X2AP (X2 Application Protocol) to be transmitted/received to/from the base station 11. The X2AP is a C-plane protocol between base stations (eNodeB) on the X2 interface, and supports load management and handover adjustment between the base stations 11. Handover of the User Equipment 60 may be detected by the S1AP interception processing 171 and X2AP interception processing 172.

According to handover, the Bearer state management data 175 is transmitted from the source oGW 70 (#A) to a target oGW 70 (#C). Thus, the user identifier is handed over to the oGW 70 (#C) which is the handover destination. According to such handover, processing such as accounting employing a user identifier, or the like may be continued at a handover destination.

With the present embodiment, an oGW 70 to be offloaded between the User Equipment 60 and a communication partner (web server 41 is exemplified) at the time of TCP communication being started is set as a sorting point and an anchor point. For example, as illustrated in FIG. 4, in the event that the User Equipment 60 connected to a base station 11A has started TCP communication with the web server 41 (FIG. 1), the offload GW#A which executed the offload processing of this TCP communication is set as a sorting point and an anchor point.

Change of a sorting point is caused due to handover in accordance with movement of the User Equipment 60. Specifically, in the event that a base station 11 which is a handover destination of the User Equipment 60 (target base station) is housed in an offload GW 70 different from that of a base station 11 which is a handover source (source base station), the sorting point is changed.

With the present embodiment, anchor point information including user line information of traffic to be offloaded, identification information of communication relating to traffic (TCP connection information in the present embodiment), and position information of an anchor point is transmitted to an oGW 70 serving as a new sorting point (target oGW) from a source offload GW 70 (source oGW).

The target oGW 70 holds the transmitted information, and uses this to transfer traffic to be offloaded to an anchor point, or to transfer traffic received from an anchor point toward the base station 11. Thus, the setting (position) of the anchor point may be maintained regardless of handover while continuing communication (TCP communication).

On the other hand, in the event that TCP communication serving as a new offload target has been started at the target oGW, this target oGW becomes an anchor point in this TCP communication. Also, in the event that the maintained TCP communication has been ended, the setting of the anchor point as to the offload traffic is released (discarded (deleted)).

Note that, as for handover, there are X2-based handover to be carried out within a management range of the same MME 21, and S1-based handover to be performed straddling different MMEs 21. Change of an oGW 70 occurs regarding both the of the X2-based handover and S1-based handover in the event that an offload GW 70 has been installed for each base station 11. As described above, with an oGW 70, the S1AP interception processing 171 and X2AP interception processing 172 are executed, and accordingly, anchor point information and an user identifier can be handed over by detecting both of the ha ndovers.

Figure 6:
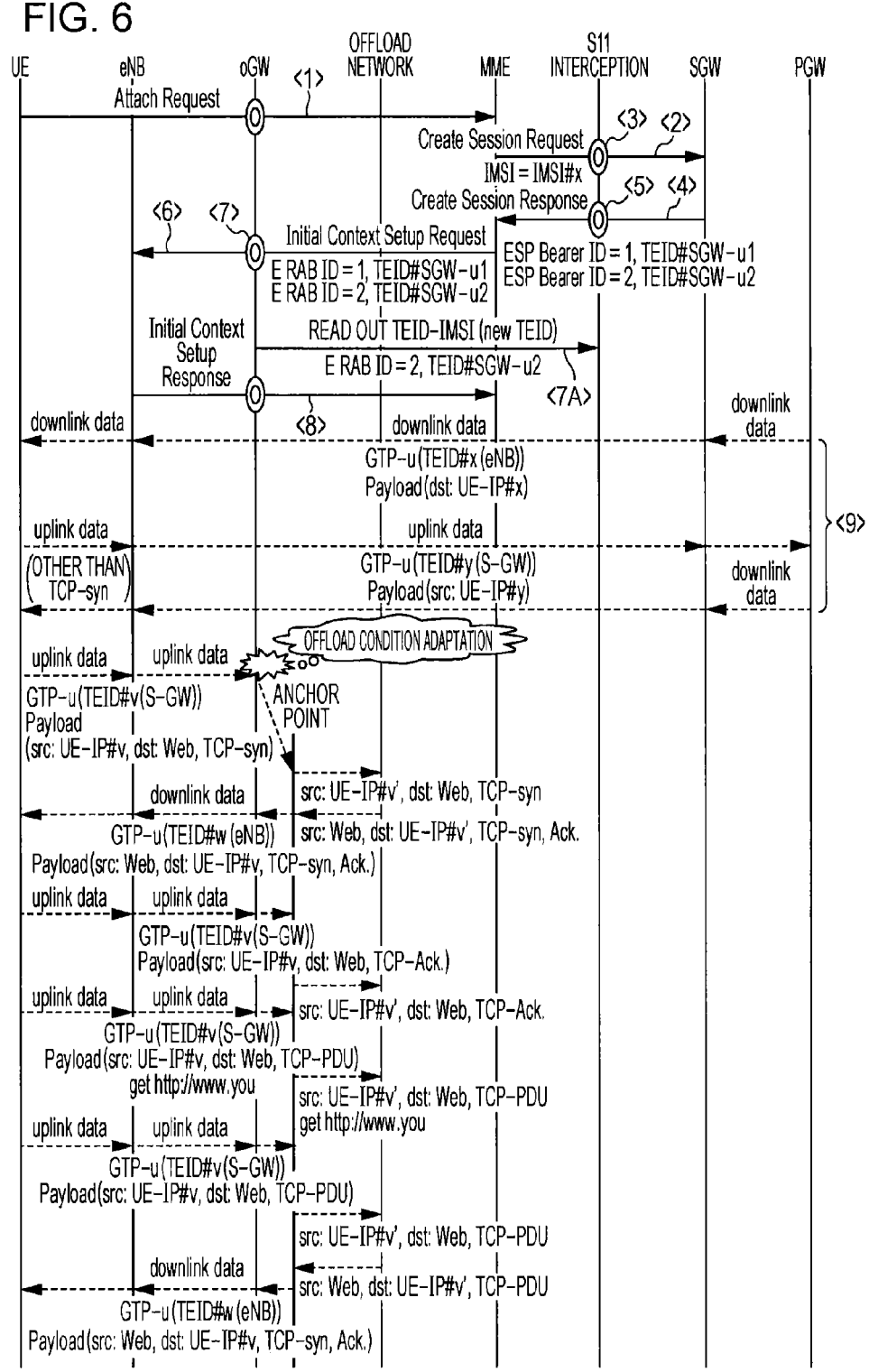
FIG. 6 illustrates a sequence example in the event that UE is activated to perform Attach.
Figure 7:
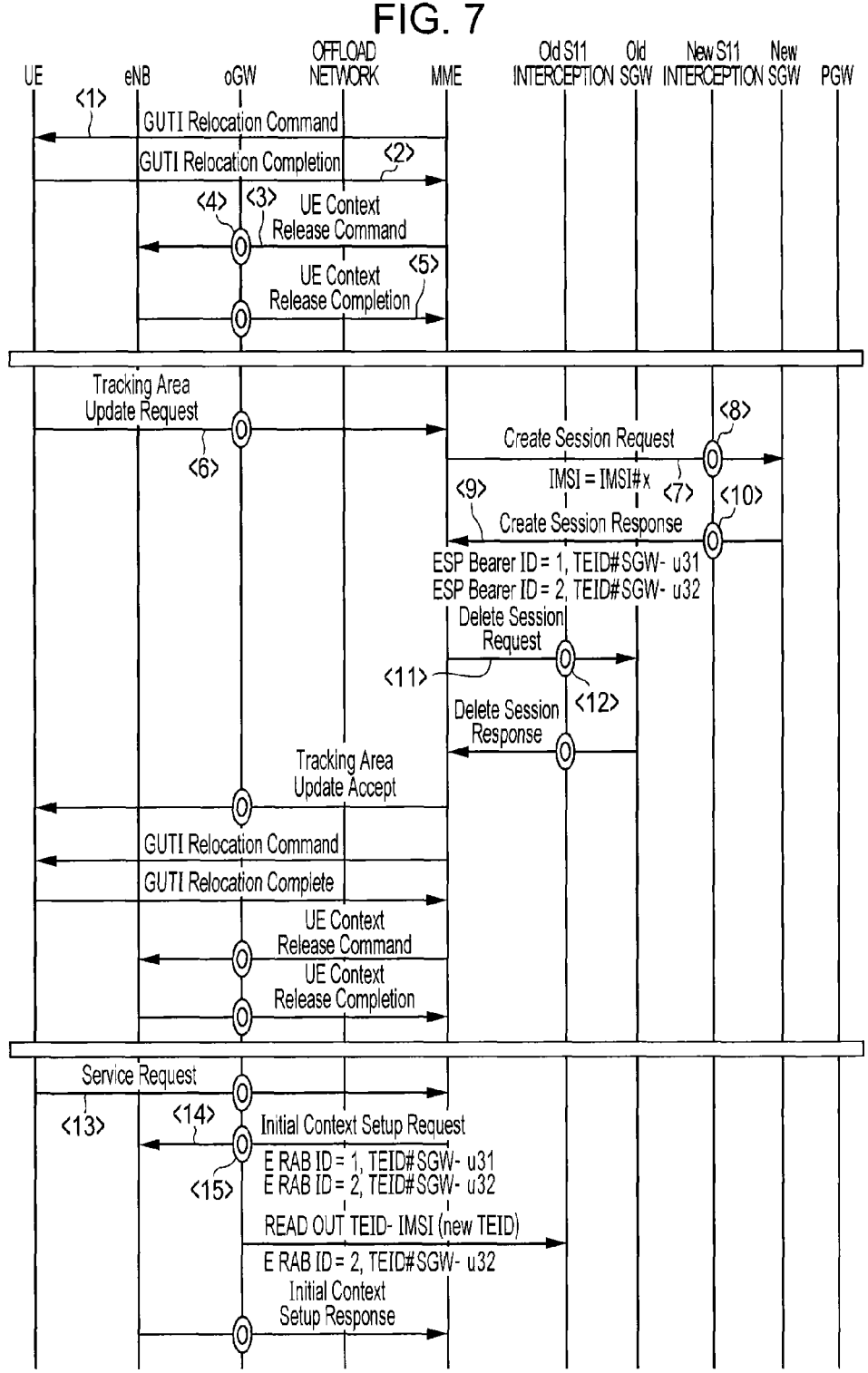
FIG. 7 illustrates a sequence example in the event that UE is changed to a non-communication state, and is restored from the non-communication state.
Figure 8:
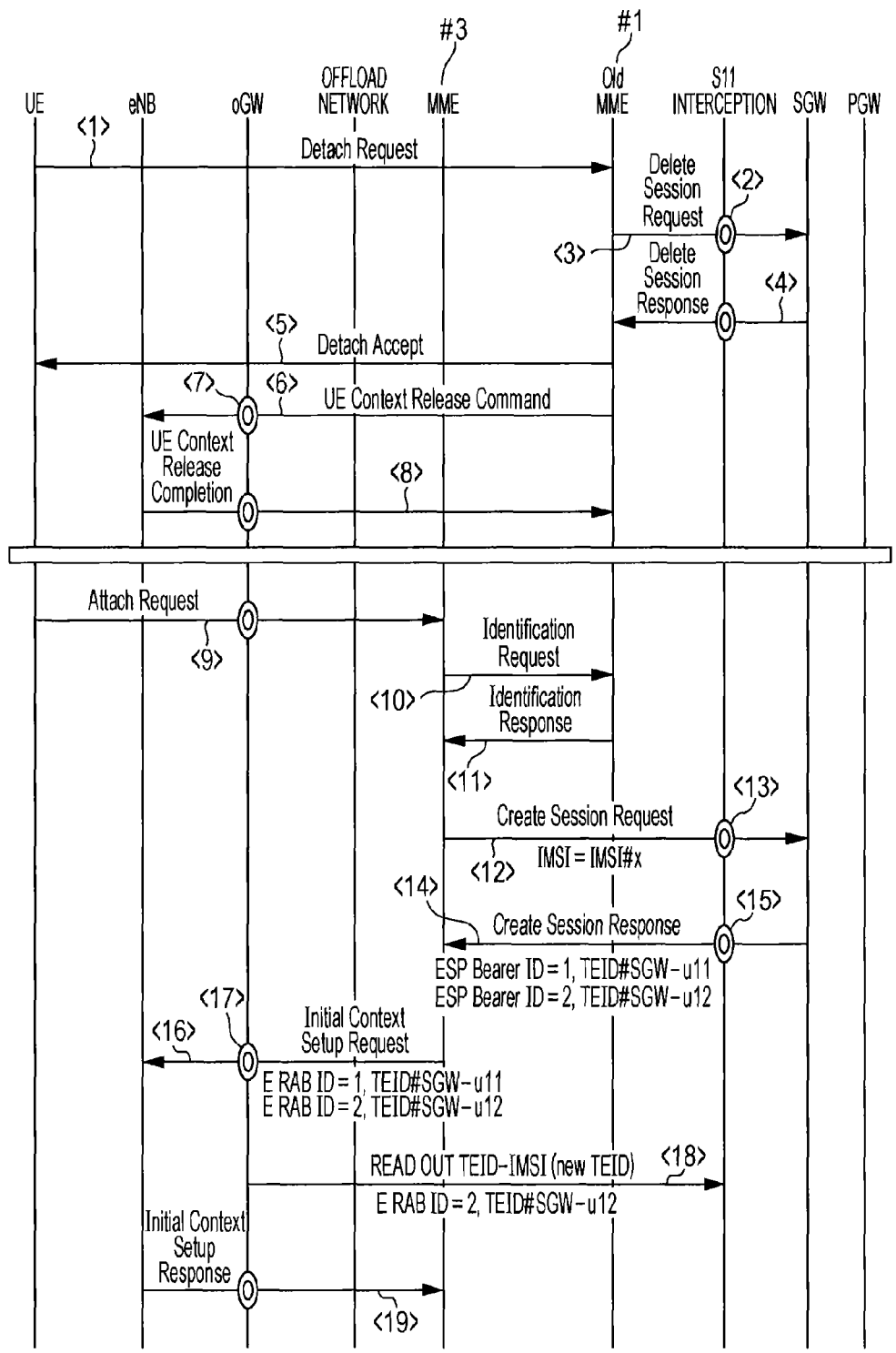
FIG. 8 illustrates a sequence example in the event that UE is reactivated to perform Attach.
Figure 9:
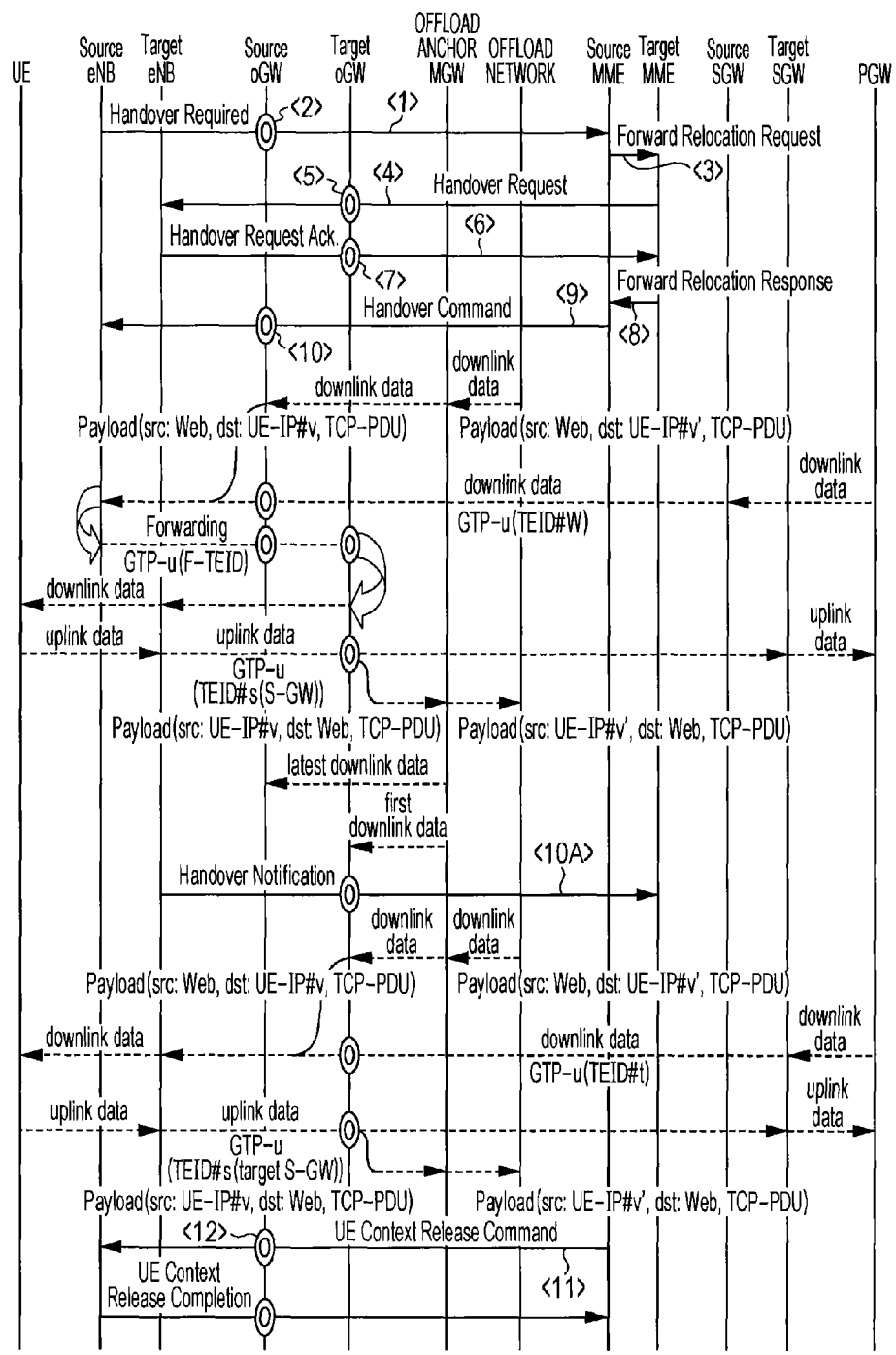
FIG. 9 illustrates a sequence example of S1-based handover under offload communication.
Figure 10:
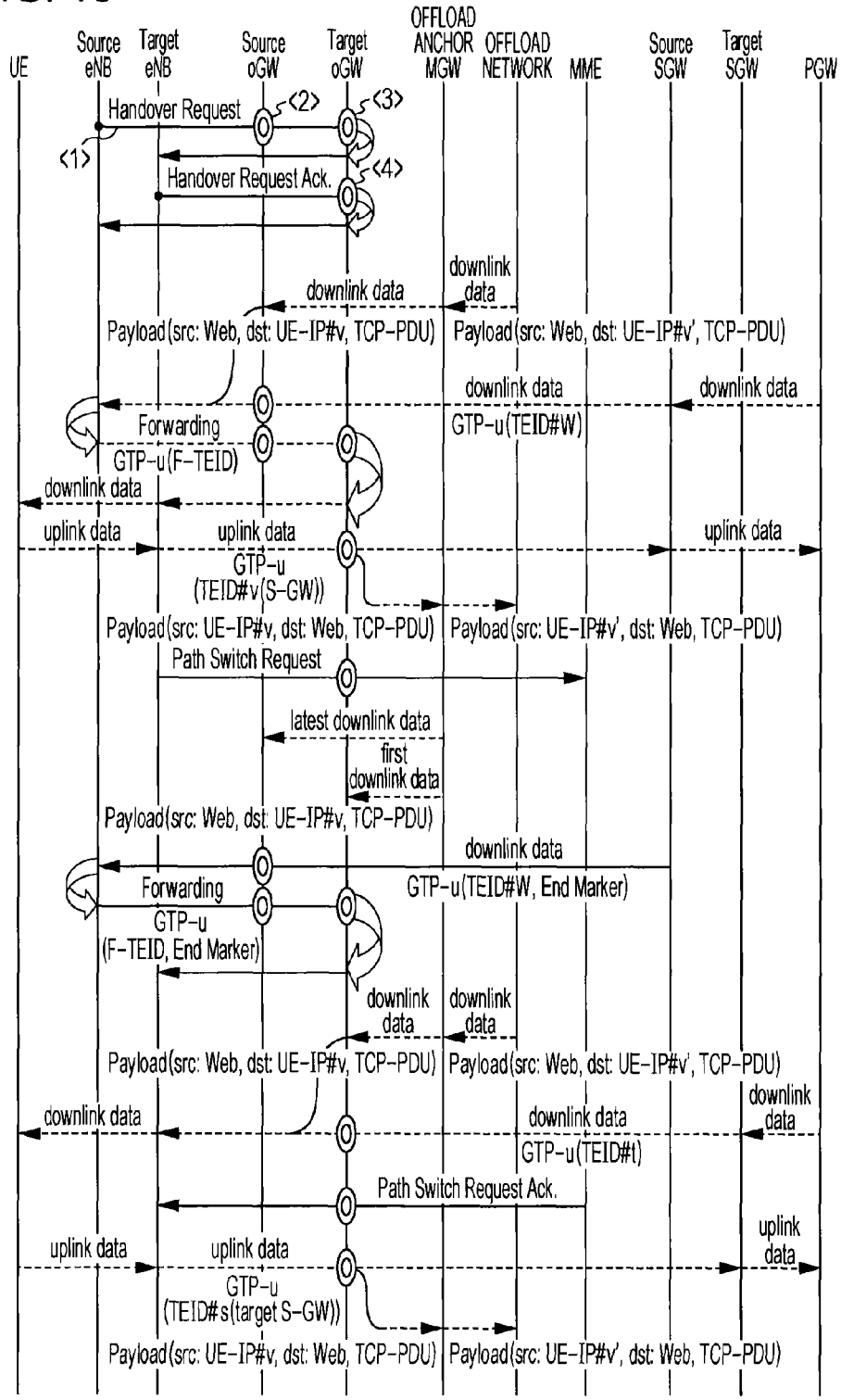
FIG. 10 illustrates a sequence example of X2-based handover under offload communication.

Hereafter, further details of the oGW 70 will be described. FIG. 6 is a sequence example in the event of US starting up and performing Attach. FIG. 7 is a sequence example in the that UE is changed to a non-communication state, and is restored from the non-communication state. FIG. 8 is a sequence example in the event that UE is reactivated to perform Attach. FIG. 9 illustrates a sequence example of the S1-based handover during offload communication. FIG. 10 illustrates a sequence example of the X2-based handover during offload communication.

Figure 11:
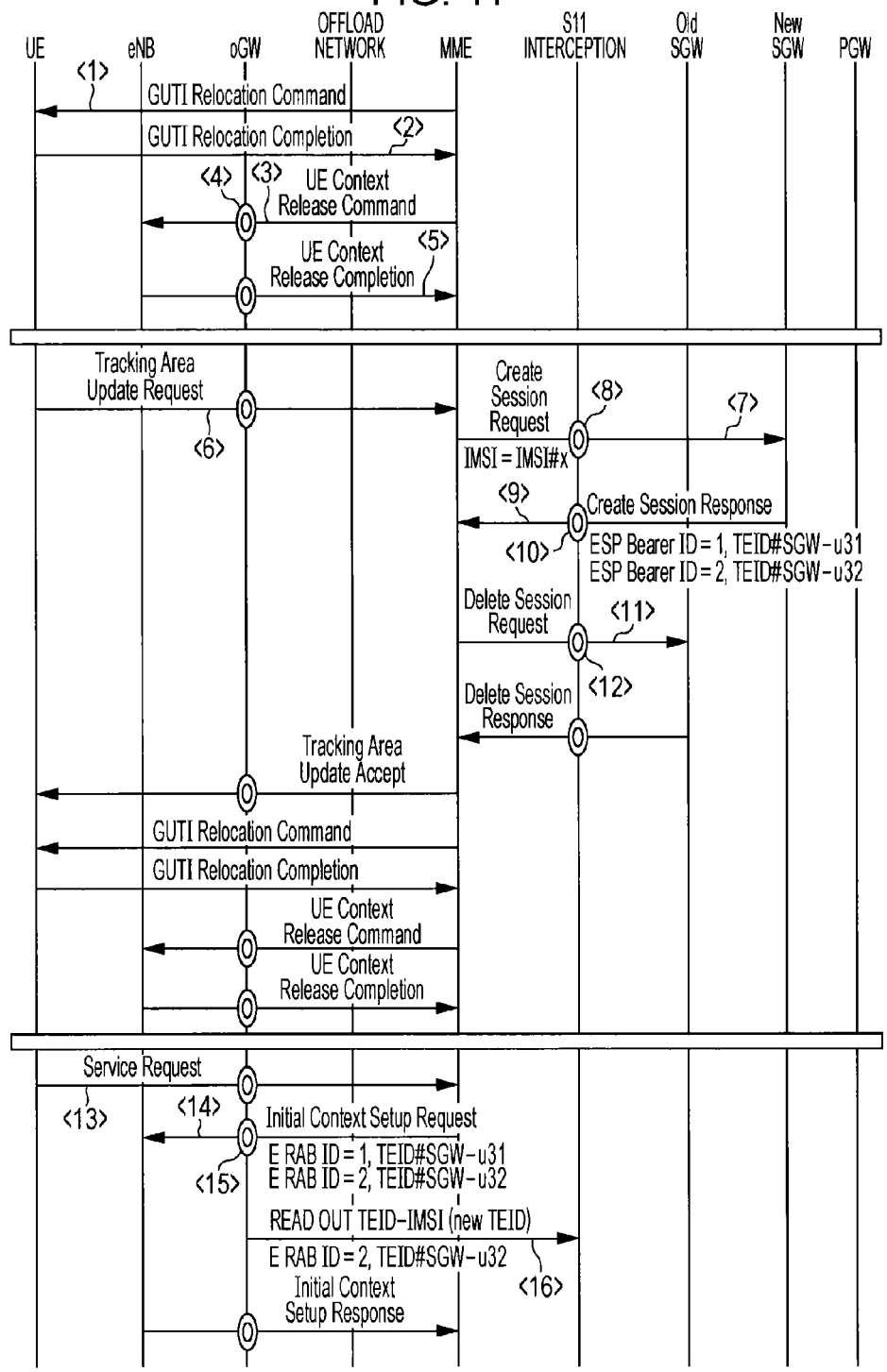
FIG. 11 illustrates, with a case where an S11 interception device has been disposed near an MME, a sequence example in the event that UE is changed to a non-communication state, and is restored from the non-communication state.
Figure 12:
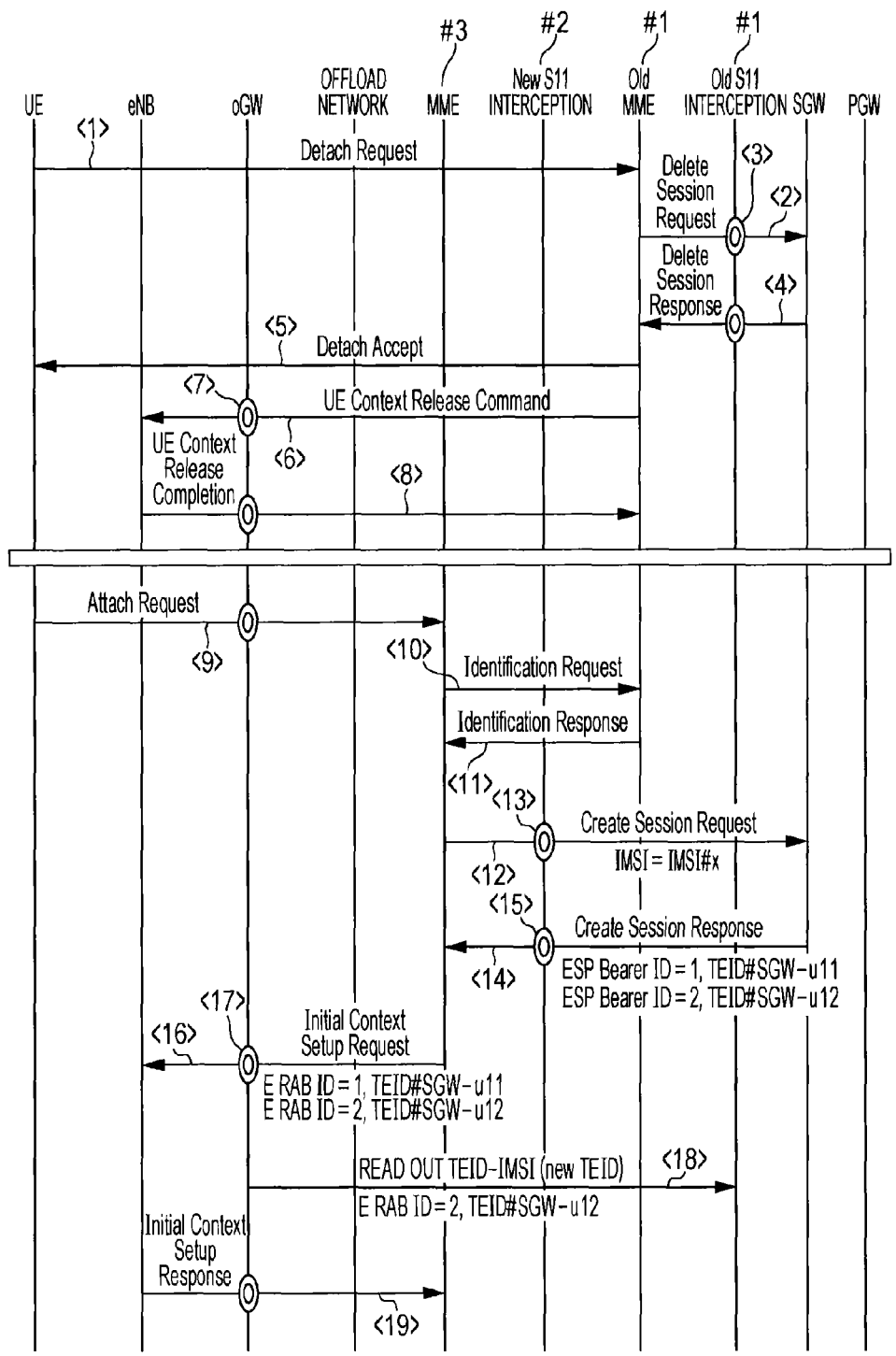
FIG. 12 illustrates, with a case where an S11 interception device has been disposed near an MME, a sequence example in the event that UE is reactivated to perform Attach.
Figure 13:
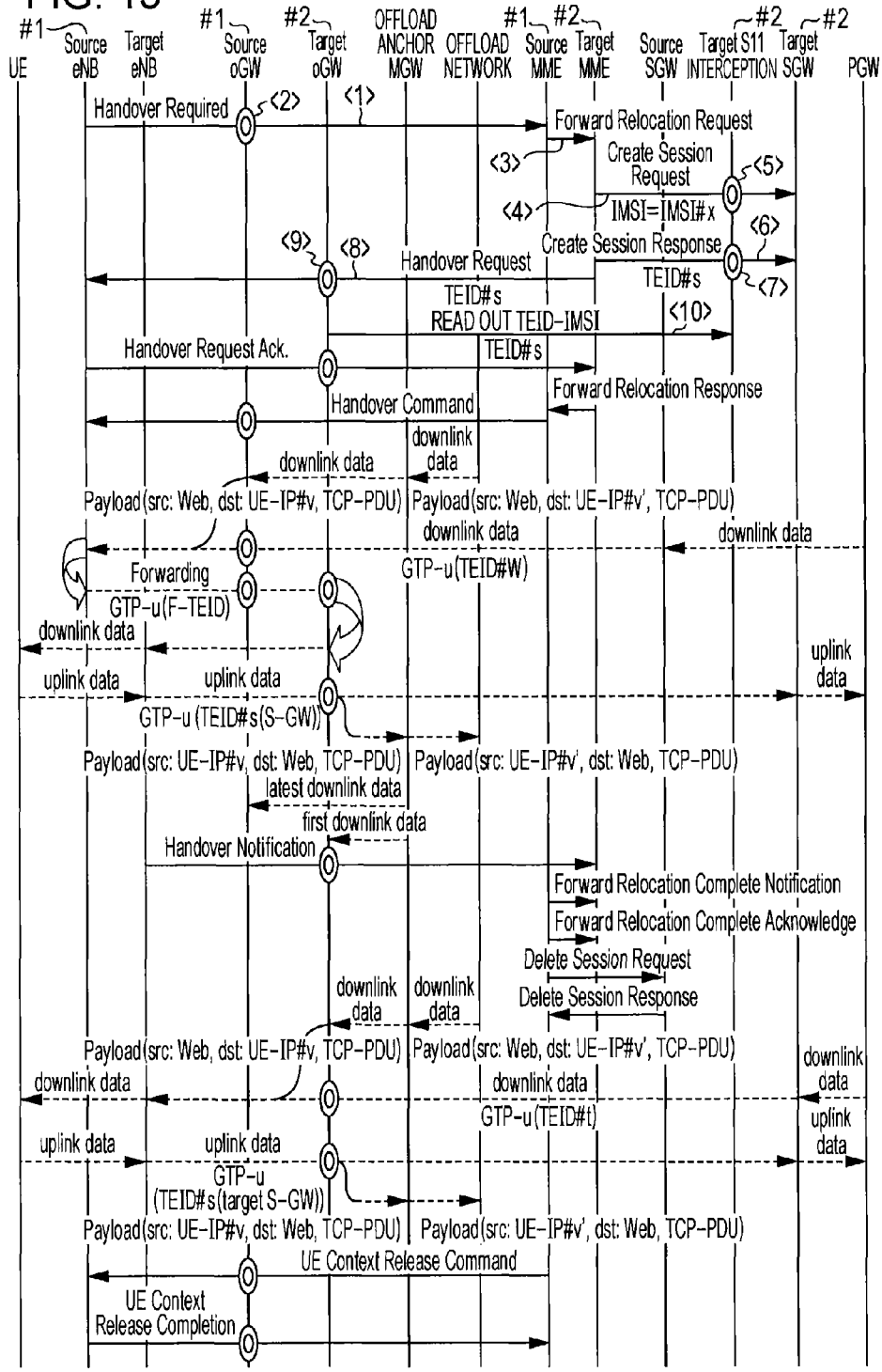
FIG. 13 illustrates a sequence example in the event that, with the S1-based handover as well, a user identifier is received from an S11 interception device disposed near an S-GW.
Figure 14:
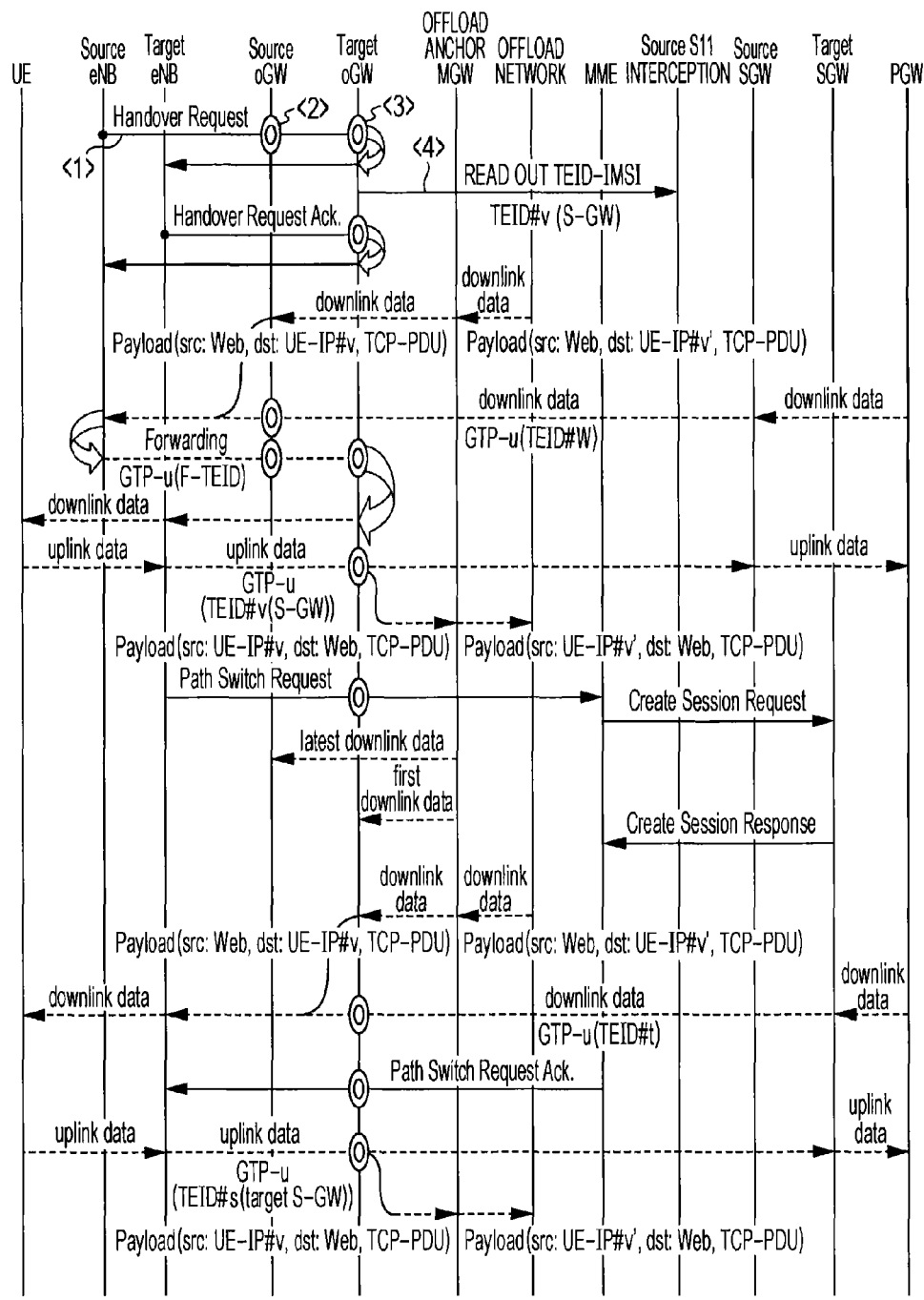
FIG. 14 illustrates a sequence example in the event that, with the X2-based handover as well, a user identifier is received from an S11 interception device disposed near an S-GW.

FIG. 11 is, with a case where an S11 interception device 80 has been disposed near an MME, a sequence example in the event that UE is changed to a non-communication state and is restored from the non-communication state. FIG. 12 is, with a case where an S11 interception device 80 has been disposed near an MME, a sequence example in the event that UE is reactivated to perform Attach. FIG. 13 is, with the S1-based handover as well, a sequence example in the event of receiving a user identifier from an S11 interception device disposed near an S-GW. FIG. 14 is, with the X2-based handover as well, a sequence example in the event of receiving a user identifier from an S11 interception device disposed near an S-GW. The details of the above-mentioned sequences in FIGS. 6 through 14 will be described later.

Messages to Be Intercepted by S11 Interception Device

FIGS. 15, 16, and 17 indicate messages (S11 signals) to be intercepted from the S11 interface by an S11 interception device 80. FIG. 15 is a structure example of a Create Session Request message. FIG. 16 is a structure example of a Create Session Response message. FIG. 17 is a structure example of a Delete Session Request message.

TEID-IMSI Correspondence State Data

FIG. 18 is a structure example of the TEID-IMSI correspondence state data 82. With the present embodiment, the TEID-IMSI correspondence state data 82 is, as indicted in FIG. 18, managed with a user determination state table 82a and a user-TEID (GTP-u) correspondence table 82b.

User Determination State Table

The user determination state table 82a is formed of one or more records in which an intra-S11-interception-device UE identifier, a user identifier (IMSI), MME-side UE control identification information, and S-GW-side UE control identification information are stored.

"intra-S11-interception-device UE identifier" is information to uniquely identify UE 60 using the S11 interception device 80. As for "user identifier", an identifier (IMSI) to uniquely identify a user within the mobile network is stored.

As for "MME-side UE control identification information", identification information appended at the MME 21 (MME device) to manage the communication line of UE (GTP-c TEID, MME device address) is stored. As for "S-GW-side UE control identification information", identification information appended at the S-GW 22 (S-GW device) to manage the communication line of UE (GTP-c TEID, S-GW device address) is stored.

User-TEID (GTP-u) Correspondence Table

The user-TEID (GTP-u) correspondence table 82*b* is formed of one or more records in which an intra-S11-interception-device UE identifier, a user line identifier, and uplink line assignment information are stored. Here, "intra-S11-interception-device UE identifier" is information to uniquely identify UE 60 using an S11 interception device 80. With regard to the same UE, the same value as the intra-S11-interception-device UE identifier in the user determination state table 82*a* is stored.

"user line identifier" stores information to uniquely identify a line within UE 60. This is sync with the line identifier (E RAB ID) at UE 60. "uplink line assignment information" is destination information of an uplink packet toward an S-GW 22, corresponding to the user line identifier.

Bearer State Management Data

FIG. 19 indicates a structure example of the Bearer state management data 175 at a sorting point. The Bearer state management data 175 is managed with a Bearer user determination table 175A and a Bearer table 175B. However, the table structure is an example.

Bearer User Determination Table

Bearer user determination tables 175*a* and 175*b* in FIG. 19 are a series of the table 175A. "Intra-oGW UE identifier" in the Bearer user determination table 175*b* is the same value as "Intra-oGW UE identifier" in the Bearer user determination table 175*a*, and is described so as to clearly specify that both are the same record.

Information to uniquely identify UE 60 using this oGW 70 is stored in "Intra-oGW UE identifier". With regard to the same UE 60, the Intra-oGW UE identifier having the same value is stored in both of the offload condition application state table 176A (FIG. 20) and the Bearer user determination table 175A.

"Intra-MME UE identifier" is the identifier of UE 60 appended at an MME 21 (MME UE S1AP ID). "MME device identifier" is the identifier of the MME 21 (MME device) which appended the intra-MME UE identifier to UE 60. "intra-eNB UE identifier (S1AP)" is the identifier (eNB UE S1AP ID) of UE 60 appended at a base station 11 (eNB).

"Intra-eNB UE identifier (X2AP)" is the identifier of UE 60 appended at the base station 11 (eNB UE X2AP ID). "eNB device identifier" is the identifier of the base station 11 which appended the intra-eNB UE identifier (S1AP) and intra-eNB UE identifier (X2AP) to UE 60.

"T-Target cell identification information" is handover destination cell identification information selected by a handover source base station 11, received at a handover destination oGW 70. "intra-T-Target-cell UE identification information" is identification information of UE 60 within the handover destination cell selected by the handover destination base station 11, received at the handover destination oGW 70. "Target ID" is the identifier of the handover destination base station 11 selected by the handover source base station 11, received at the handover source oGW 70.

"S-Target cell identification information" is the handover destination cell identification information selected by the handover source base station 11, received at the handover source oGW 70. "intra-S-Target-cell UE identification information" is identification information of UE 60 within the handover destination cell selected by the handover destination base station 11, received at the handover source oGW 70.

Bearer Table

The Bearer table 175B indicated in FIG. 19 includes data as described below. "intra-oGW UE identifier" is information to uniquely identify UE 60 using an oGW 70. With regard to the same UE 60, the same value as with "intra-oGW UE identifier" of the Bearer user determination table 175A is stored in the Bearer table 175B. "user line identifier" is information to uniquely identify a line within UE 60, and is sync with a line identifier at UE 60 (E RAB ID).

"uplink line assignment information" is destination information of an uplink packet toward an S-GW 22 as to a user line identifier. "downlink line assignment information" is destination information of a downlink packet toward a base station 11, corresponding to a user line identifier. "TOF sorting point position information" is destination information to transmit a packet passed through the offload network 50 from an oGW 70 serving as an offload anchor point to an oGW 70 serving as a sorting point. The oGW 70 serving as a sorting point waits for a packet from the oGW 70 serving as an anchor point based on this "TOF sorting point position information".

"TOF anchor point position information" is destination information to transmit a packet to be offloaded from an oGW 70 serving as a sorting point to an oGW 70 serving as an anchor point. The oGW 70 serving as a sorting point transmits a packet to the oGW 70 serving as an anchor point based on this "TOF anchor point position information".

Offload Condition Application State Data

FIG. 20 indicates a structure example of the offload condition application state table. The offload condition application state data 176 is managed with the offload condition application state table 176A. The offload condition application state table 176A stores one or more records including an intra-oGW UE identifier, a user line identifier (E RAB ID), TCP connection information, and offload anchor point information.

"intra-oGW UE identifier" is information to uniquely identify UE 60 using an oGW 70. "user line identifier" is information to uniquely identify a line within UE 60, and is sync with the line identifier at UE 60 (E RAB ID). "TCP connection information" is connection information of TCP communication to be offloaded with communication between UE 60 and a communication partner (e.g., website). With the example in FIG. 20, the TCP connection information includes the IP address and TCP port number of UE.

"offload anchor point information" is position information of an offload anchor point at a position where TCP communication to be offloaded has been started. With the example in FIG. 5, the offload anchor point information includes TEID relating to offload traffic, and the identifier of an offload GW.

TOF Relay State Management Data

FIG. 21 indicates a data structure example of the TOF relay state management data 178. The TOF relay state management data 178 is managed with a TOF relay management table 178*a* and a TOF session management table (TOF Session management table) 178*b*. The data structure is an example.

The TOF relay management table 178*a* is formed of one or more records including an intra-oGW-anchor UE identifier, a user identifier, a user line identifier, a TOF anchor point position, and a TOF sorting point position.

"intra-oGW-anchor UE identifier" is information to uniquely identify UE 60 within the anchor point of an oGW 70. "user identifier" is IMSI. "user line identifier" is information to uniquely identify a line within UE 60, and is sync with a line identifier (E RAB ID) at UE 60.

"TOF anchor point position" is destination information to transmit a packet to be offloaded from an oGW 70 serving as a sorting point to an oGW 70 serving as an offload anchor point. The oGW 70 serving as an offload anchor point waits for a packet from the oGW 70 serving as a sorting point based on "TOF anchor point position".

"TOF sorting point position" is destination information to transmit a packet passed through the offload network 50 from an oGW 70 serving as an offload anchor point to an oGW 70 serving as a sorting point. The oGW 70 serving as an offload anchor point transmits a packet toward the oGW 70 serving as a sorting point based on "TOF sorting point position".

The TOF session management table 178b is formed of one or more records including an intra-oGW-anchor UE identifier, a user line identifier, UE TCP connection information, oGW TCP connection information, and Session state.

"intra-oGW-anchor UE identifier" is information to uniquely identify UE 60 within the anchor point of an oGW 70. With regard to the same UE 60, the same value as with "intra-oGW-anchor UE identifier" stored in the TOF relay management table 178a is stored.

"user line identifier" is information to uniquely identify a line within UE 60, and is sync with the line identifier (E RAB ID) at UE 60. As "UE TCP connection information", the IP address and port number on the UE 60 side are stored for each session of TCP communication. With "oGW TCP connection information", the IP address and port number on the oGW 70 side, corresponding to the IP address and port number on the UE 60 side are stored for each session of TCP communication. As "Session state", communication state ("under connection", waiting for uplink (UL) disconnect confirmation, waiting for downlink (DL) disconnect confirmation) for each session of TCP communication is stored.

Processing when Intercepting Create Session Request Message

Figure 22:
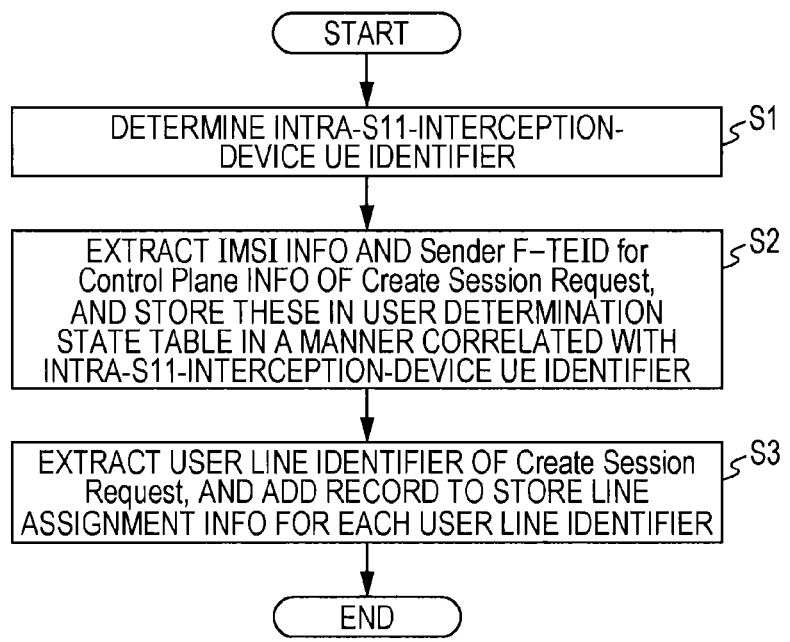
FIG. 22 illustrates a processing flow example in the event of having intercepted the Create Session Request message indicated in FIG. 15 (MME->S-GW)

FIG. 22 illustrates a processing flow example when intercepting a Create Session Request message (MME->S-GW) (FIG. 15). The processing illustrated in FIG. 22 is executed by the CPU 73 of an S11 interception device 80.

In S1, the CPU 73 acquires an intra-S11-interception-deivce UE identifier. In the next S2, the CPU 73 extracts IMSI information, and Sender F-TEID for Control Plane information within the Create Session Request message, and stores this in the user determination information table 82a (FIG. 18) in a manner correlated with the intra-S11-interception-deivce UE identifier.

In S3, the CPU 73 extracts a user line identifier of the Create Session Request message, and adds a record in which line assignment information has been stored for each user line identifier to the user-TEID (GTP-u) correspondence table 82b. Thereafter, the processing in FIG. 22 is ended.

Processing when Intercepting Create Session Response Message

Figure 23:
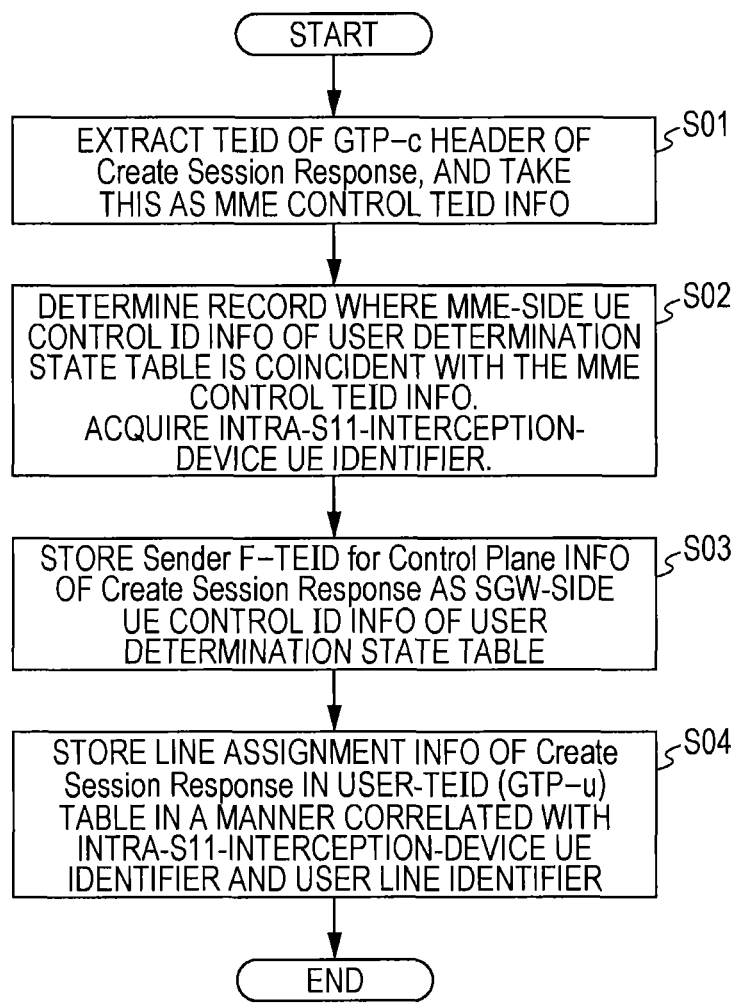
FIG. 23 illustrates a processing flow example in the event of having intercepted the Create Session Response message indicated in FIG. 16 (S-GW->MME)

FIG. 23 illustrates a processing flow example when intercepting a Create Session Response message (S-GW->MME) indicated in FIG. 16. The processing illustrated in FIG. 23 is executed by the CPU 73 of an S11 interception device 80.

In S01, the CPU 73 extracts TEID of a GTP-c header of the Create Session Response message, and takes this as TEID information for MME control.

In the next S02, the CPU 73 determines a record where MME-side UE control identification information of the user determination state table 82a (FIG. 18) is coincided with the TEID information for MME control. The CPU 73 determines an intra-S11-interception-device UE identifier within the determined record.

In the next S03, the CPU 73 stores Sender F-TEID for Control Plane information of the Create Session Response message as S-GW-side UE control information identification information of the user determination state table 82a.

In the next S04, the CPU 73 stores line assignment information of the Create Session Response message in the user-TEID (GTP-u) table 82b in a manner correlated with the intra-S11-interception-device UE identifier, and user line identifier, and ends the processing in FIG. 23.

Processing Flow when Intercepting Delete Session Request Message

Figure 24:
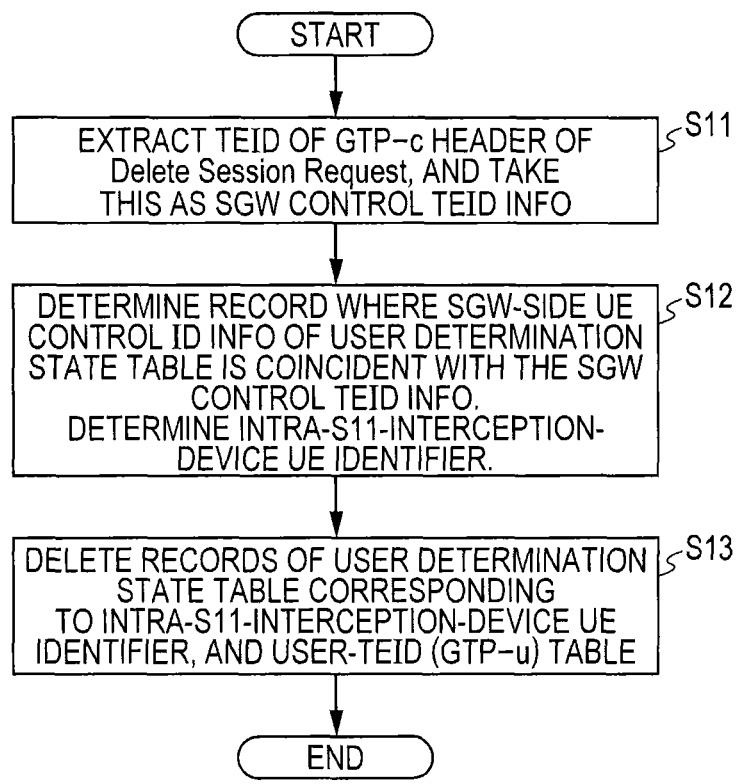
FIG. 24 illustrates a processing flow example in the event of having intercepted the Delete Session Request message indicated in FIG. 17 (MME->S-GW)

FIG. 24 illustrates a processing flow example when intercepting a Delete Session Request message (MME->S-GW) indicated in FIG. 17. The processing illustrated in FIG. 24 is executed by the CPU 73 of an S11 interception device 80.

In the first S11, the CPU 73 extracts TEID of a GTP-c header of the Delete Session Request message, and takes this as TEID information for S-GW control.

In the next S12, the CPU 73 determines a record where S-GW-side UE control identification information of the user determination state table 82a (FIG. 18) is coincided with the TEID information for S-GW control, and determines an intra-S11-interception-device UE identifier within the determined record.

In the next S13, the CPU 73 deletes the records of the user determination state table 82a corresponding to the intra-S11-interception-device UE identifier, and the user-TEID (GTP-u) table, and ends the processing in FIG. 24.

Messages

Next, data structure examples of principal messages to be exchanged between nodes will be indicated. FIG. 25 indicates a structure example of an Initial Context Setup Request message to be transmitted from an MME 21 to a base station 11 at the time of activation of UE 60.

FIG. 26 indicates a structure example of a Handover Required message to be transmitted from UE 60 to a source MME 21 at the time of the S1-based handover of the UE 60. FIG. 27 indicates a structure example of a Handover Required message to be transmitted from a target MME 21 to a target base station 11 at the time of the S1-based handover. FIG. 28 indicates a structure example of a Handover Request Ack. message to be sent back to the target MME 21 from the target base station 11 in response to the Handover Request message.

FIG. 29 indicates a structure example of a Handover Command message to be transmitted from a source MME 21 to a source base station (serving base station) 11. FIG. 30 indicates a structure example of a UE Context Release Command message to be transmitted from the source MME 21 to the source base station 11.

FIG. 31 indicates a structure example of an X2AP: Handover Request message to be transferred from the source base station 11 to the target base station 11 via a target oGW 70 with X2-based handover. FIG. 32 indicates a structure example of an X2AP: UE Context Release message.

Processing Flows at oGW

Next, processing flows to be executed by the CPU 73 of an oGW 70 will be described.

Processing Flow when Intercepting Initial Context Setup Request

Figure 33:
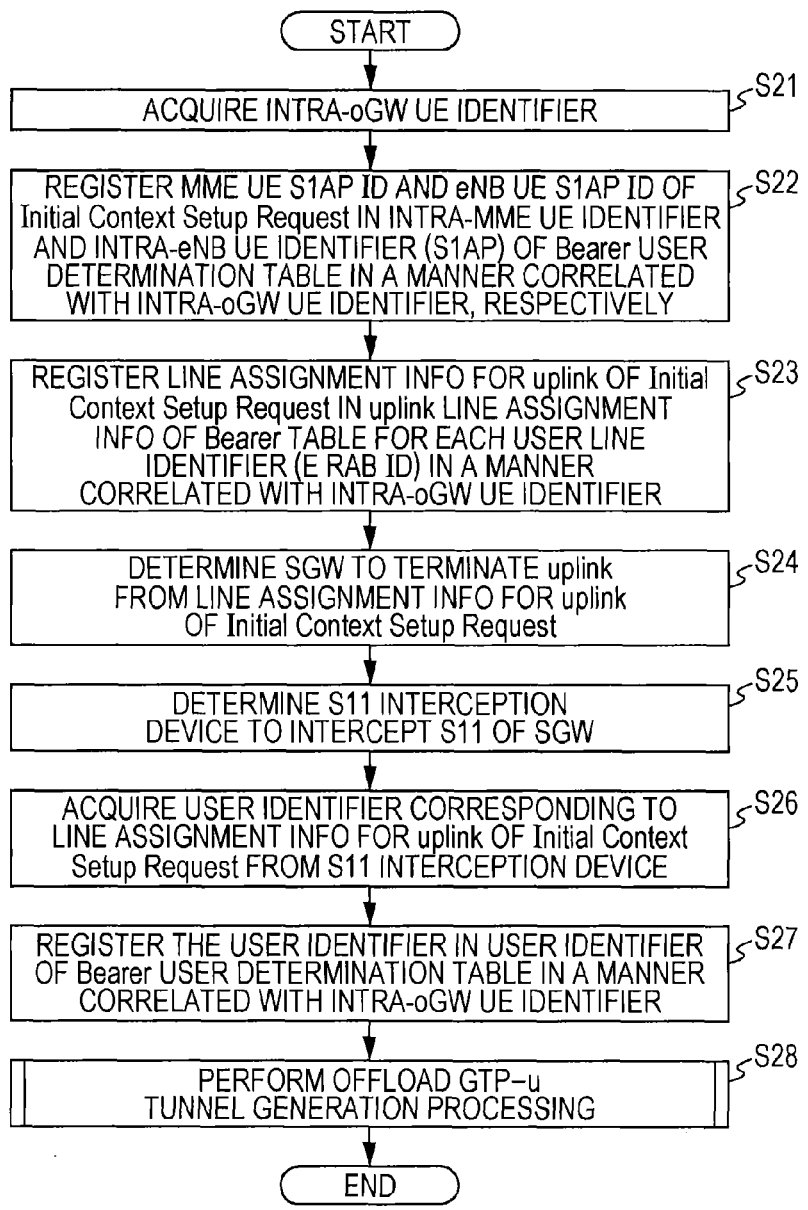
FIG. 33 illustrates a processing flow example at the time of interception of the Initial Context Setup Request message (MME->eNB) to be executed by S1AP interception processing of the CPU of an oGW.

FIG. 33 illustrates a processing flow example when intercepting an Initial Context Setup Request message (MME->eNB) to be executed by the S1AP interception processing 171 of the CPU 73.

In S21, the CPU 73 acquires an intra-oGW UE identifier.

In the next S22, the CPU 73 registers "MME UE S1AP ID" and "eNB UE S1AP ID" within the Initial Context Setup Request message as the intra-MME UE identifier and intraeNB UE identifier (S1AP) of the Bearer user determination table 175A in a manner correlated with the intra-oGW UE identifier, respectively.

In the next S23, the CPU 73 registers the line assignment information for uplink within the Initial Context Setup Request message in the uplink line assignment information of the Bearer table 175B in a manner correlated with the intra-oGW UE identifier for each user line identifier (E RAB ID).

In the next S24, the CPU 73 determines the S-GW 22 to terminate uplink from the line assignment information for uplink of the Initial Context Setup Request message. In the next S25, the CPU 73 determines the S11 interception device 80 to intercept the S11 interface of the S-GW 22.

In the next S26, the CPU 73 obtains a user identifier corresponding to the line assignment information for uplink of the Initial Context Setup Request message from an S11 interception device 80. In the next S27, the CPU 73 registers the user identifier in the user identifier of the Bearer user determination table 82a in a manner correlated with the intra-oGW UE identifier.

Thereafter, the CPU 73 ends the processing illustrated in FIG. 33 after execution of the offload GTP-u tunnel generation processing (S28).

Processing when Intercepting Handover Required

Figure 34:
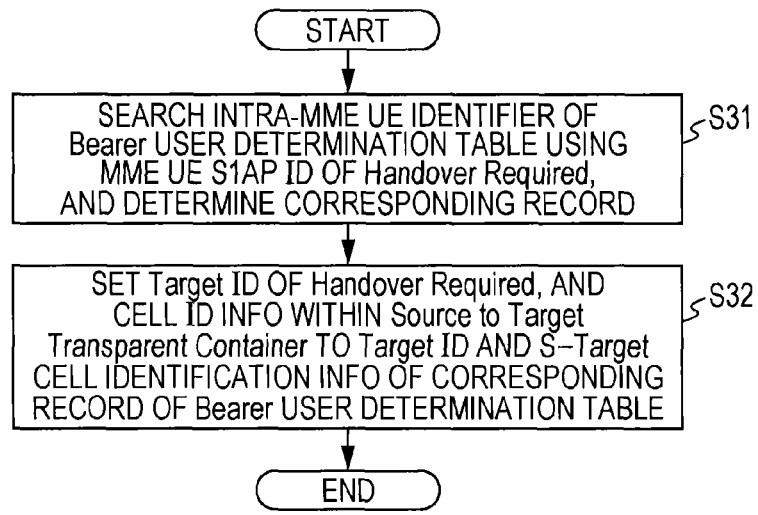
FIG. 34 illustrates a processing flow example at the time of interception of the Handover Required message (source eNB->source MME) indicated in FIG. 26 to be executed by S1AP interception processing of the CPU of an oGW at the time of the S1-based handover.

FIG. 34 illustrates a processing flow example when intercepting the Handover Required message (source eNB->source MME) indicated in FIG. 26 to be executed by the S1AP interception processing 171 of the CPU 73 of an oGW 70 at the time of the S1-based handover.

In the first S31, the CPU 73 searches the intra-MME UE identifier of the Bearer user determination table 175A using "MME UE S1AP ID" within the Handover Required message to determine the corresponding record.

In the next S32, the CPU 73 sets "Target ID" within the Handover Required message, and the cell identification information within "Source to Target Transparent Container" as "Target ID" and "S-Target cell identification information" of the corresponding record in the Bearer user determination table 175A, respectively. Thereafter, the processing in FIG. 34 is ended.

Processing when Intercepting Handover Request

Figure 35:
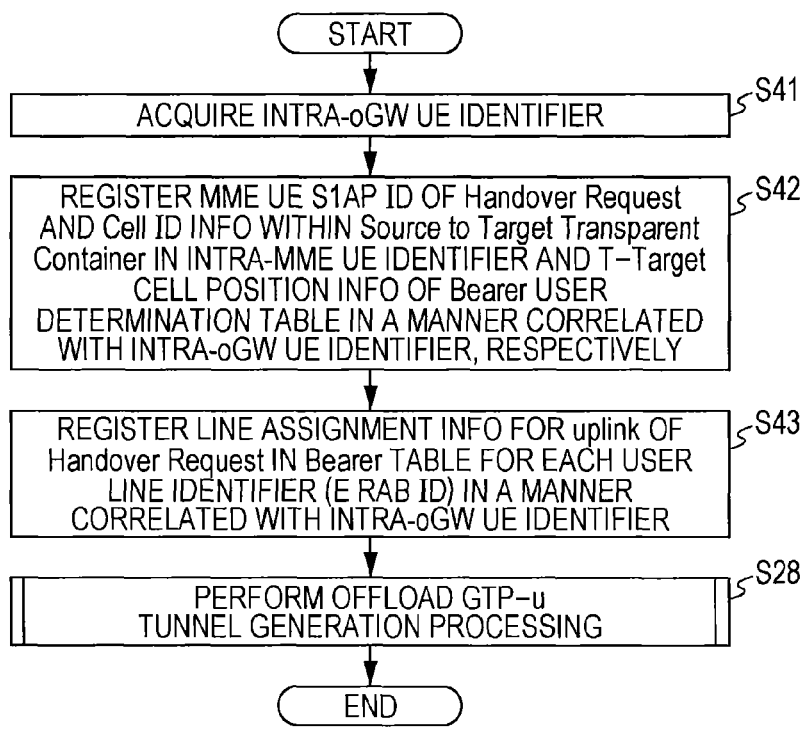
FIG. 35 illustrates a processing flow example at the time of interception of the Handover Request message (target MME->target eNB) indicated in FIG. 27 to be executed by S1AP interception processing of the CPU of an oGW at the time of the S1-based handover.

FIG. 35 illustrates a processing flow example when intercepting the Handover Request message (target MME->target eNB) indicated in FIG. 27 to be executed by the S1AP interception processing 171 of the CPU 73 of an oGW at the time of the S1-based handover.

In the first S41, the CPU 73 acquires the intra-oGW UE identifier. In the next S42, the CPU 73 registers "MME UE S1AP ID" within the Handover Request message, "Call ID" information within "Source to Target Transparent Container" in the intra-MME UE identifier and T-Target cell position information of the Bearer user determination table 175A in a manner correlated with the intra-oGW UE identifier.

In the next S43, the CPU 73 registers the line assignment information for uplink within the Handover Request message in the Bearer table 175B for each user line identifier in a manner correlated with the intra-oGW UE identifier.

Figure 36:
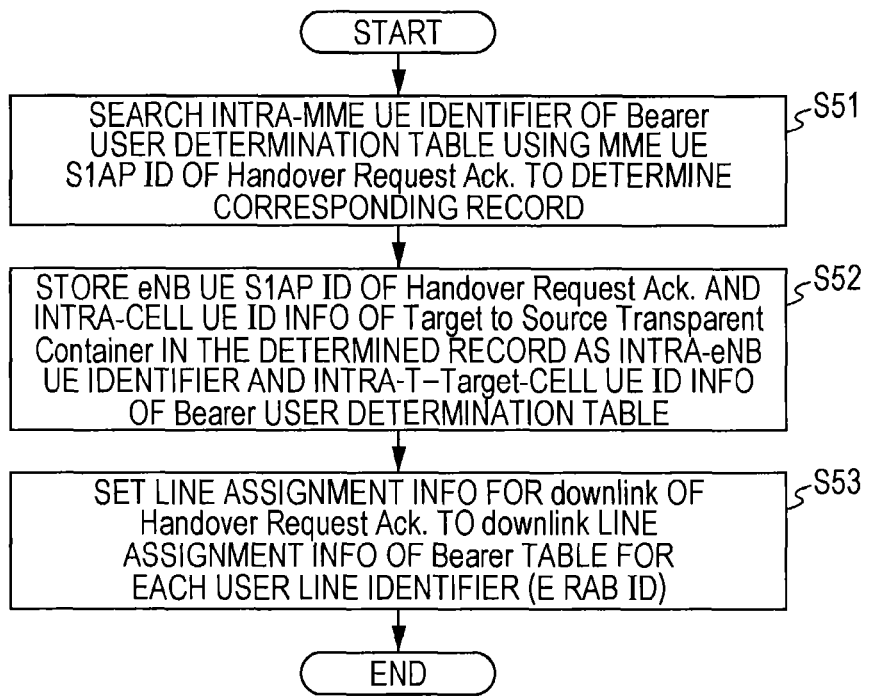
FIG. 36 illustrates a processing flow example at the time of interception of the Handover Request Ack. message (target eNB->target MME) indicated in FIG. 28 to be executed by S1AP interception processing of the CPU of an oGW at the time of the S1-based handover.

Thereafter, the CPU 73 executes the offload GTP-u tunnel generation processing (S28). Thereafter, the processing in FIG. 35 is ended. Processing When Intercepting Handover Request Ack. Message FIG. 36 illustrates a processing flow example when intercepting the Handover Request Ack. message (target eNB->target MME) indicated in FIG. 28 to be executed by the S1AP interception processing 171 of the CPU 73 of an oGW at the time of the S1-based handover.

In the first SS1, the CPU 73 searches the intra-MME UE identifier of the Bearer user determination table 175A using "MME UE S1AP ID" within the Handover Request Ack. message to determine the corresponding record.

In the next S52, the CPU 73 stores "eNB UE S1AP ID" within the Handover Request Ack. message, and the intra-cell UE identification information within "Target to Source Transparent Container" in the record determined in S51 as the intra-eNB UE identifier and intra-T-Target-cell UE identification information in the Bearer user determination table 175A.

In the next S53, the CPU 73 sets the line assignment information for downlink within the Handover Request Ack. message as the downlink line assignment information in the Bearer table 176B for each user line identifier, and ends the processing.

Processing When Intercepting Handover Command

Figure 37:
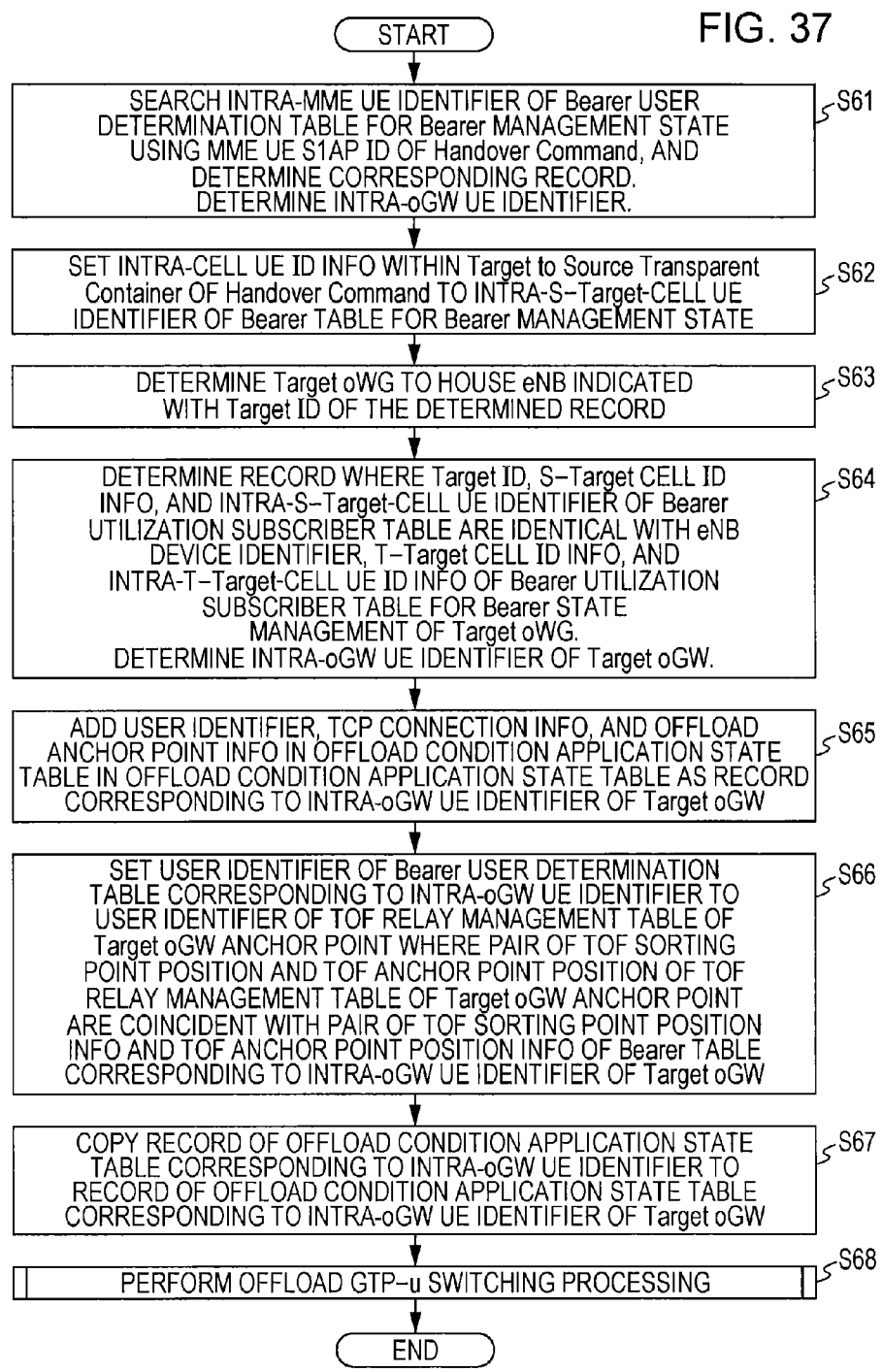
FIG. 37 illustrates a processing flow example at the time of interception of the Handover Command message (source MME->source eNB) indicated in FIG. 29 to be executed by S1AP interception processing of the CPU of an oGW at the time of the S1-based handover.

FIG. 37 illustrates a processing flow example when intercepting the Handover Command message (source MME->source eNB) indicated in FIG. 29 to be executed by the S1AP interception processing 171 of the CPU 73 of an oGW at the time of the S1-based handover.

In the first S61, the CPU 73 searches the intra-MME UE identifier of the Bearer user determination table 175A using "MME UE S1AP ID" within the Handover Command message to determine the corresponding record, thereby determining the intra-oGW UE identifier within the record.

In the next S62, the CPU 73 sets the intra-cell UE identification information within "Target to Source Transparent Container" within the Handover Command message as the intra-S-Target-cell UE identification information in the Bearer user determination table 175A.

In the next S63, the CPU 73 determines a target offload GW 70 to house the base station 11 indicted with the Target ID of the determined record.

In the next S64, the CPU 73 determines a record where "Target ID", "S-Target cell identification information", and "intra-S-Target-cell UE identification information" in the Bearer user determination table 175A are coincided with "eNB device identifier", "T-Target cell identification information", and "intra-T-Target-cell UE identification information" in the Bearer user determination table 175A in the target oGW 70, and determines the target intra-oGW UE identifier within the record.

In the next S65, the CPU 73 adds a record to the offload condition application state table 176A by taking "user line identifier", "TCP connection information", and "offload anchor point information" within the offload condition application state table 176A corresponding to the intra-oGW UE identifier as "user line identifier", "TCP connection information", and "offload anchor point information" corresponding to the intra-oGW UE identifier of the target oGW 70.

In the next S66, the CPU 73 sets the user identifier of the Bearer user determination table 175A corresponding to the intra-oGW UE identifier as the user identifier of the TOF relay management table 178a (FIG. 21) of a target oGW anchor point where a pair of a TOF sorting point position and a TOF anchor point position of the TOF rely management table of the target oGW anchor point are coincided with a pair of TOF sorting point position information and TOF anchor point position information of the Bearer table 175B corresponding to the intra-oGW UE identifier of the target oGW.

In the next S67, the CPU 73 copies the record of the offload condition application state table 176A (FIG. 20) corresponding to the intra-oGW UE identifier to the record of the offload condition application state table 176A corresponding to the intra-oGW UE identifier of the target oGW. Thereafter, in the next S68, the CPU 73 performs offload GTP-u switching processing, and ends the processing.

Processing when Intercepting UE Context Release Command

Figure 38:
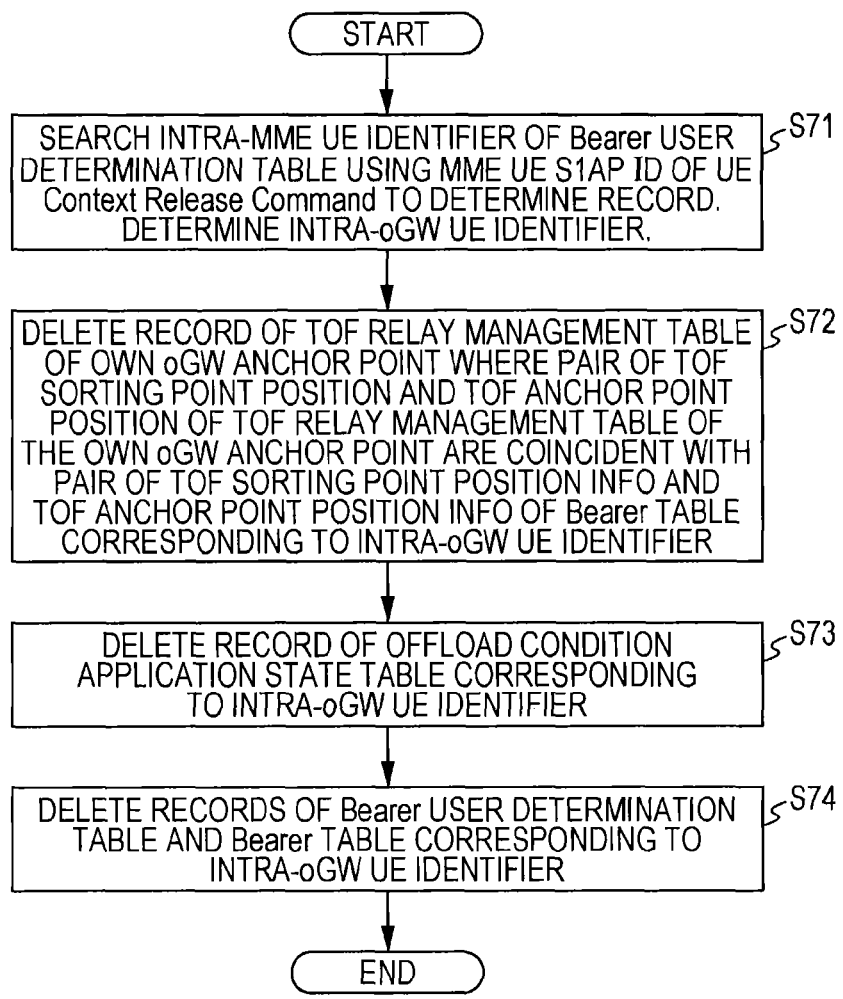
FIG. 38 illustrates a processing flow example at the time of interception of the UE Context Release message (source MME->source eNB) indicated in FIG. 30 to be executed by S1AP interception processing of the CPU of an oGW at the time of the S1-based handover.

FIG. 38 illustrates a processing flow example when intercepting the UE Context Release Command message (source MME->source eNB) indicated in FIG. 30 to be executed by the S1AP interception processing 171 of the CPU 73 at the time of the S1-based handover.

In the first S71, the CPU 73 searches the intra-MME UE identifier of the Bearer user determination table 175A using "MME UE S1AP ID" within the UE Context Release Command message to determine the corresponding record, thereby determining the intra-oGW UE identifier within the record.

In the following S72, the CPU 73 deletes the record of the TOF relay management table 178a of the own oGW anchor point where a pair of "TOF sorting point position" and "TOF anchor point position" in the TOF relay state management table 178a of the own oGW anchor point are coincided with a pair of "TOF sorting point position information" and "TOF anchor point position information" in the bearer table 175B corresponding to the intra-oGW UE identifier.

In the following S73, the CPU 73 deletes the record in the offload condition application state table 176A corresponding to the inter-oGW UE identifier. In the next S74, the CPU 73 deletes records of the Bearer user determination table 175A and Bearer table 175B, corresponding to the intra-oGW UE identifier, and ends the processing.

Processing when Intercepting X2AP: Handover Request

Figure 39:
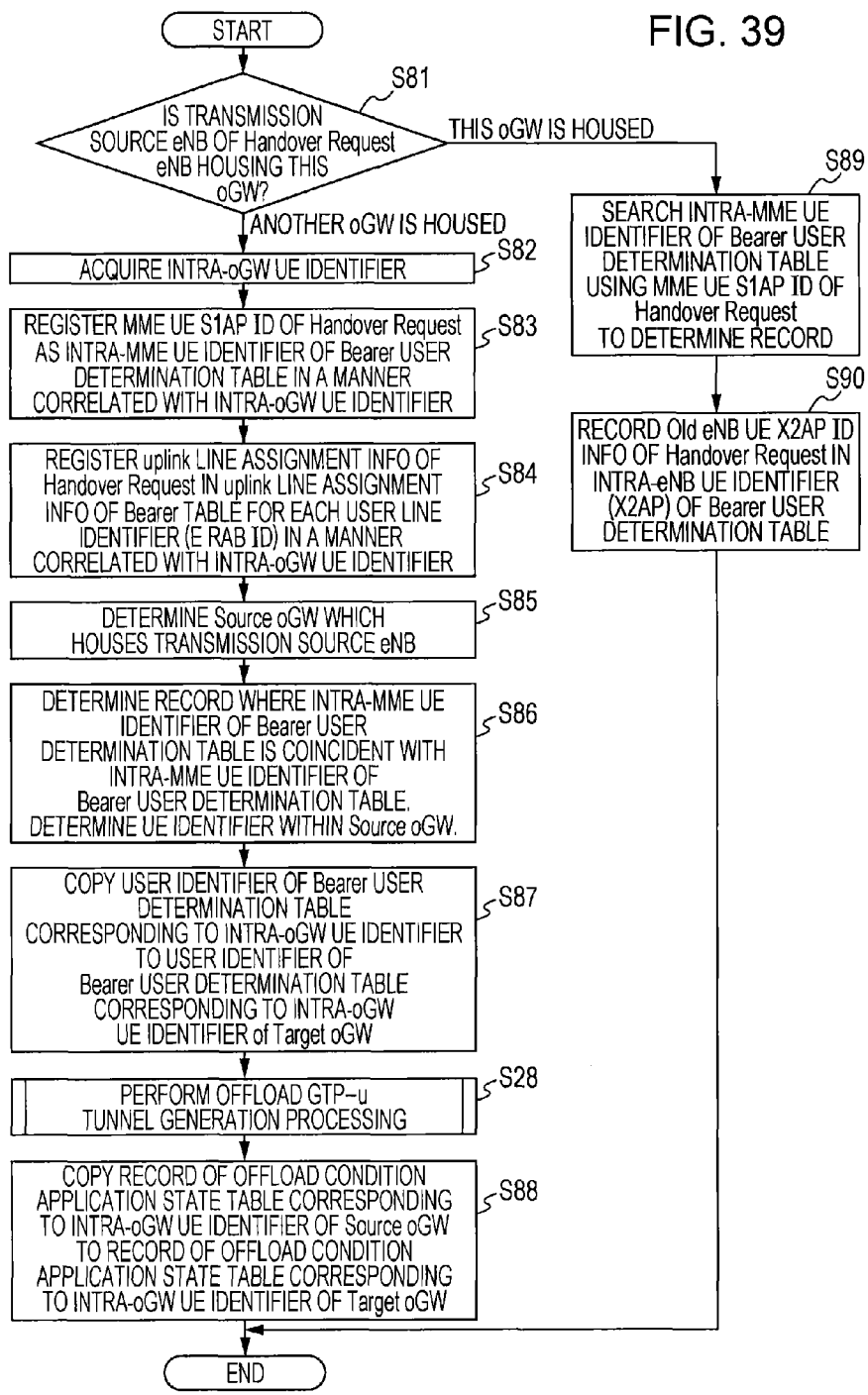
FIG. 39 illustrates a processing flow example at the time of interception of the X2AP: Handover Request message (source eNB->target eNB) indicated in FIG. 31 to be executed by X2AP interception processing of the CPU of an oGW at the time of the X2-based handover.

FIG. 39 illustrates a processing flow example when intercepting the X2AP: Handover Request message (source eNB->target eNB) indicated in FIG. 31 to be executed by the X2AP interception processing 172 of the CPU 73 at the time of the X2-based handover.

In the first S81, the CPU 73 determines whether or not the base station 11 serving as the Handover Request transmission source is a base station 11 which the own oGW houses. In the event that the base station 11 is housed in the own oGW, the processing proceeds to S89. On the other hand, in the event that the base station 11 is housed in another oGW, the processing proceeds to S82.

In S82, the CPU 73 acquires the intra-oGW UE identifier. In the next S83, the CPU 73 registers "MME UE S1AP ID" within the Handover Request as the intra-MME UE identifier of the Bearer user determination table 175A in a manner correlated with the intra-oGW UE identifier.

In the next S84, the CPU 73 registers the uplink line assignment information within the Handover Request in the uplink line assignment information in the Bearer table 175B for each user line identifier in a manner correlated with the intra-oGW UE identifier.

In the next S85, the CPU 73 determines the source oGW which houses the transmission source base station 11. In the next S86, the CPU 73 determines a record where the intra-MME UE identifier in the Bearer user determination table 175A is coincided with the intra-MME UE identifier information in the Bearer user determination table 175A of the Bearer state management of the source oGW.

In the next S87, the CPU 73 copies the user identifier in the Bearer user determination table 175A corresponding to the intra-oGW UE identifier to the user identifier in the Bearer user determination table 175A corresponding to the intra-oGW UE identifier of the target oGW 70.

Next, the CPU 73 performs the offload GTP-u tunnel generation processing (S28). Thereafter, in S88, the CPU 73 copies the record in the offload condition application state table 176A, corresponding to the intra-oGW UE identifier of the source oGW 70 to the record in the offload condition application state table 176A, corresponding to the intra-oGW UE identifier of the target oGW 70, and ends the processing.

In S89, the CPU 73 searches the intra-MME UE identifier in the Bearer user determination table 175A using "MME UE S1AP ID" within the Handover Request message to determine the corresponding record.

In the next S90, the CPU 73 records "Old eNB UE X2AP ID" information within the Handover Request message in "intra-eNB UE identifier (X2AP)" in the Bearer user determination table 175A, and ends the processing.

Processing when Intercepting X2AP: UE Context Release

Figure 40:
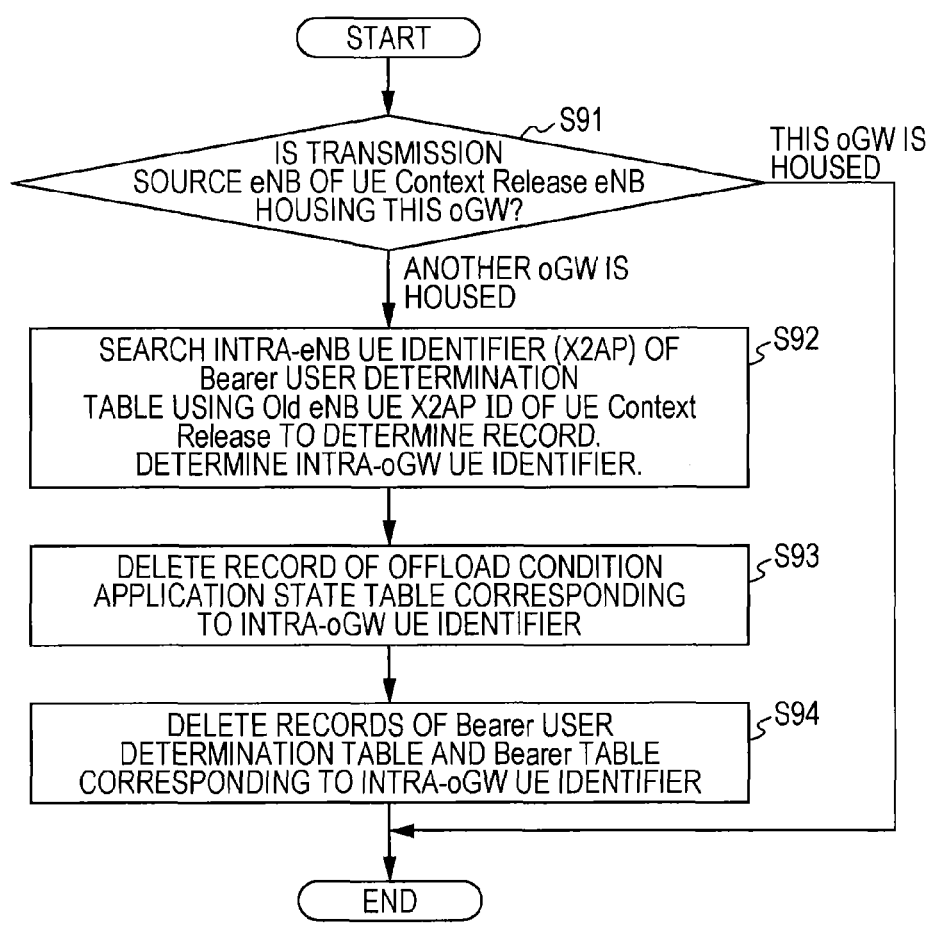
FIG. 40 illustrates a processing flow example at the time of interception of the X2AP: UE Context Release message (target eNB->source eNB) indicated in FIG. 32 to be executed by X2AP interception processing of the CPU of an oGW at the time of the X2-based handover.

FIG. 40 illustrates a processing flow example when intercepting the X2AP: UE Context Release message (target eNB->source eNB) indicated in FIG. 32 to be executed by the X2AP interception processing 172 of the CPU 73 at the time of the X2-based handover.

In the first S91, the CPU 73 determines whether or not the base station 11 serving as the UE Context Release transmission source is a base station 11 which this oGW 70 houses. In the event that the base station 11 is housed in this oGW 70, the CPU 73 ends the processing.

On the other hand, in the event that the base station 11 is housed in another oGW 70, the CPU 73 searches the intra-eNB UE identifier (X2AP) of the Bearer user determination table 175A using "Old eNB UE X2AP ID" within the UE Context Release to determine the corresponding record, and also to determine the intra-oGW UE identifier within the record (S92).

In the next S93, the CPU 73 deletes the record in the offload condition application state table 176A corresponding to the intra-oGW UE identifier. In the next S124, the CPU 73 deletes records of the Bearer user determination table 175A and Bearer table 175B corresponding to the intra-oGW UE identifier, and ends the processing.

Offload GTP-u Tunnel Generation Processing

Figure 41:
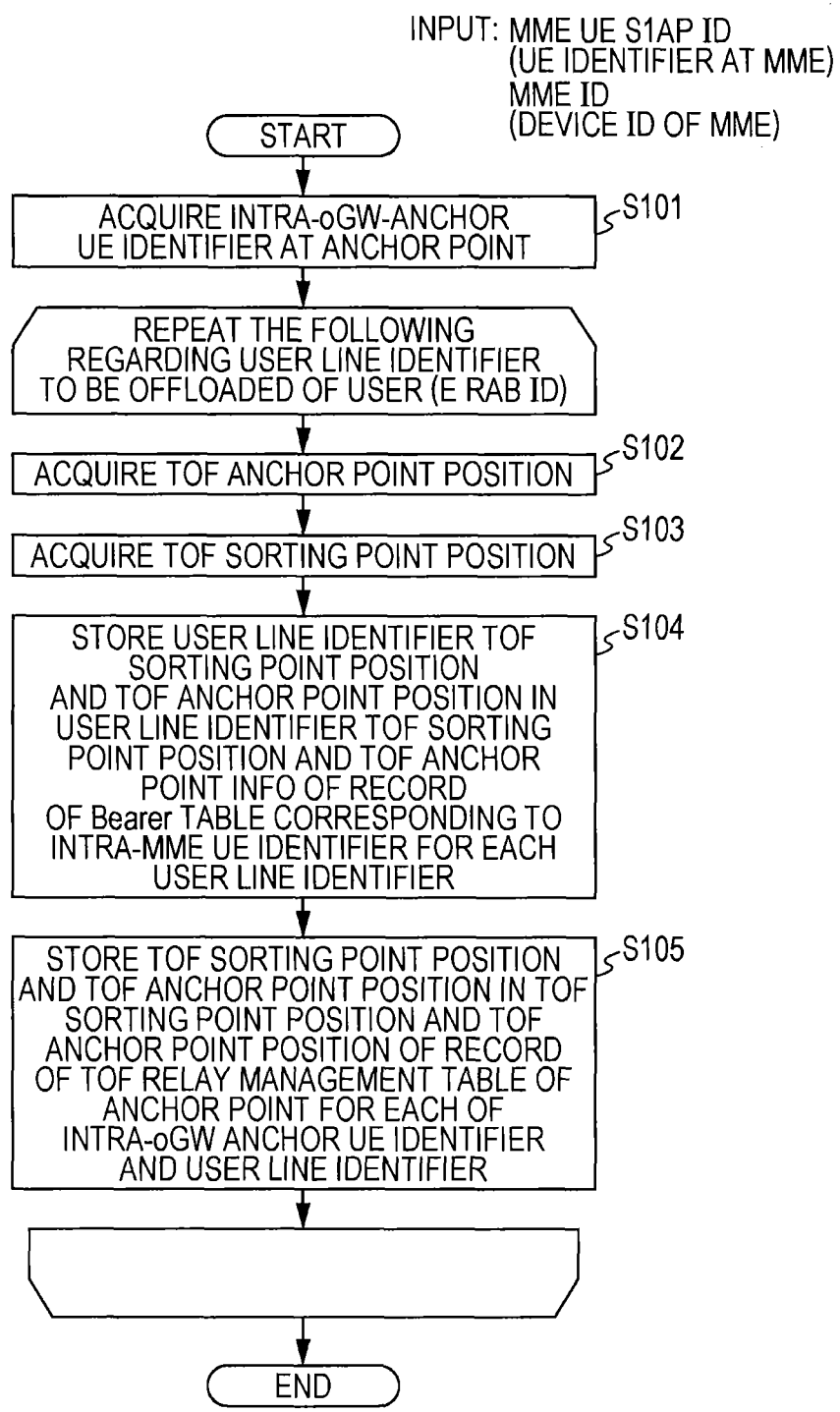
FIG. 41 illustrates an example of GTP-u tunnel generation processing (subroutine in S28) illustrated in FIGS. 33 and 35.

FIG. 41 illustrates an example of the GTP-u tunnel generation processing illustrated in FIGS. 33 and 35 (subroutine in S28). As input of the subroutine, MME UE S1AP ID (UE identifier at the MME) and MMEID (device ID of the MME) are used.

In the first S101, the CPU 73 acquires the intra-oGW-anchor UE identifier at the anchor point.

In the next S102, the CPU 73 acquires the TOF anchor point position. In the next S103, the CPU 73 acquires the TOF sorting point position. In the next S104, the CPU 73 stores the user identifier, TOF sorting point position, and TOF anchor point position in the record in the Bearer table 175B corresponding to the intra-MME UE identifier for each user line identifier as the user identifier, TOF sorting point position information, and TOF anchor point position information.

In the next S105, the CPU 73 stores the intra-oGW-anchor UE identifier, and for each user line identifier, the TOF sorting point position and TOF anchor point position as the TOF sorting point position and TOF anchor point position within the record of the TOF relay management table 178a of the anchor point.

The processing in S102 through S105 is repeatedly executed for each user line identifier to be offloaded of a user. According to the processing in FIG. 41, a resource to transmit a packet to be offloaded is generated between a sorting point and an anchor point.

Offload GTP-u Switching Processing

Figure 42:
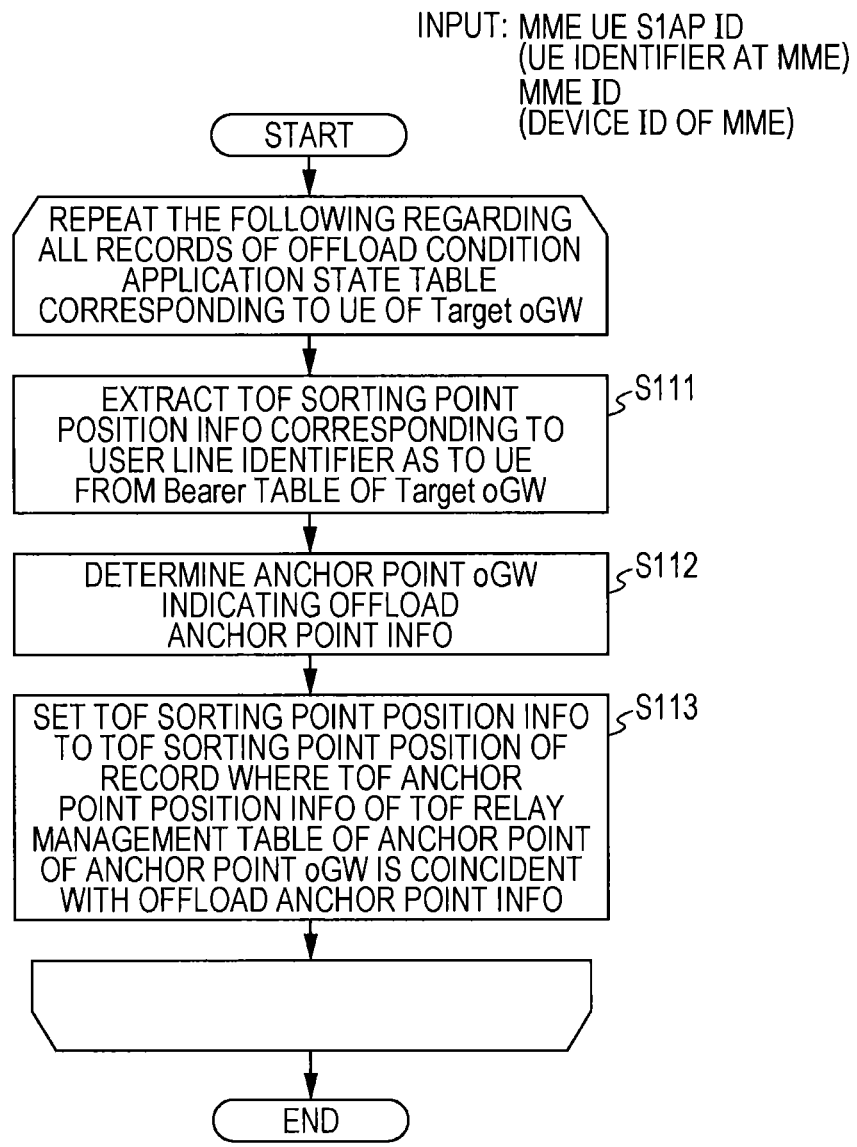
FIG. 42 illustrates a processing flow example of the offload GTP-u switching processing subroutine (S68) illustrated in FIG. 37.

FIG. 42 illustrates a processing flow example of a subroutine for the offload GTP-u switching processing illustrated in FIG. 37 (S68). In the first S111, the CPU 73 extracts the TOF sorting point position information corresponding to the user line identifier as to a base station 11 from the Bearer table 175B of a target oGW 70.

In S112, the CPU 73 determines the oGW 70 serving as the anchor point that the offload anchor point information indicates.

In the next S113, the CPU 73 sets the TOF sorting point position information as the TOF sorting point position of a record where the TOF anchor point position information stored in the TOF relay management table 175a of the anchor point of the anchor point offload GW 70 is coincided with the offload anchor point.

The processing in S111 through S113 is repeatedly executed regarding all of the records of the UE-compatible offload condition application state table 176A of the target oGW. Upon the processing as to all of the records being ended, the processing in FIG. 42 is ended.

According to the processing in FIG. 42, along with handover of UE 60, the transmission destination of a packet that the oGW 70 serving as the offload anchor point received from the offload network 50 may be switched to the oGW 70 serving as the sorting point of the handover destination.

S-GW for S11 Interception Housing Table

FIG. 56 indicates a structure example of S-GW information for S11 interception that an oGW 70 holds at the storage device 74. The oGW 70 may hold a S-GW for S11 interception housing table as indicated in FIG. 56, calculate the S11 interception device 80 from which a user identifier has to be obtained, and access this.

eNB Housing Table

FIG. 57 indicates a structure example of oGW information housing an eNB 11 that an oGW 70 holds at the storage device 74. The oGW 70 may calculate an oGW 70 which houses an eNB 11 using the eNB housing table indicated in FIG. 57. The table in FIG. 57 is used for the processing in S85 in FIG. 39, for example.

OPERATION EXAMPLES

Hereafter, operation examples of the embodiment will be described.

Operation Example 1

Activation of UE

Description will be made regarding operation after User Equipment (UE) 60 is activated (e.g., powered on) until an oGW 70 identifies a user of a communication line passing through this oGW, in accordance with the sequence illustrated in FIG. 6.

Operation 1-1: In FIG. 6, the activated User Equipment 60 (UE#x) transmits Attach Request which is a connection request message to an MME 21 (MME#1) via a base station 11 (eNB#1) (<1> in FIG. 6). The MME#1 transmits Create Session Request (FIG. 15) which is a session generation request message to an S-GW 22 (S-GW#1) with reception of the Attach Request as a trigger (<2> in FIG. 6). An S11 interception device 80 (S11 interception device#1) intercepts the Create Session Request (<3> in FIG. 6), and performs the processing illustrated in FIG. 22.

Operation 1-2: According to the processing illustrated in FIG. 22, as illustrated in FIG. 43, the intra-S11-interception-device UE identifier (1000), user identifier (IMSI), and MME-side UE control identification information in the user determination state table 82a (FIG. 18) are determined. Also, the intra-S11-interception-device UE identifier and user line identifier in the user-TEID (GTP-u) correspondence table 82b are determined.

Operation 1-3: Subsequently, upon Create Session Response (FIG. 16) which is a reply message being transmitted from the S-GW#1 to the MME#1 (<4> in FIG. 6), the S11 interception device#1 intercepts the Create Session Response (<5> in FIG. 6), and executes the processing illustrated in FIG. 23.

Operation 1-4: According to the processing illustrated in FIG. 23, the S-GW-side UE control identification information as to the intra-S11-interception-device UE identifier (1000) in the user determination state table 82a is determined. Also, the uplink line assignment information corresponding to (intra-S11-interception-device UE identifier, user line identifier) in the user-TEID (GTP-u) correspondence table 82b is determined.

Operation 1-5: Subsequently, Initial Context Setup Request (FIG. 25) which is a Bearer setting request message is transmitted from the MME#1 to the eNB#1 (<6> in FIG. 6). The oGW 70 (oGW#1) intercepts the Initial Context Setup Request (<7> in FIG. 6), and processing illustrated in FIGS. 33 and 41 is performed.

Operation 1-6: According to the processing illustrated in FIGS. 33 and 41, as illustrated in FIG. 44, the intra-oGW UE identifier (8000), user identifier (IMSI), intra-MME UE identifier, MME device identifier, intra-eNB UE identifier, eNB device identifier, user line identifier, uplink line assignment information, TOF sorting point position information, and TOF anchor point position information are registered and determined. The user identifier (IMSI) is received from the S11 interception device by the processing in S26 (see <7A> in FIG. 6).

Also, as illustrated in FIG. 45, the intra-oGW-anchor UE identifier (4000), user identifier (IMSI), user line identifier, TOF anchor point position, and TOF sorting point position in the TOF relay management table are registered and determined.

Note that the eNB#1 which has received the Initial Context Setup Request message transmits an Initial Context Setup Response message which is a reply message to the MME#1 (<8> in FIG. 6). Thereafter, Bearer (GTP-u tunnel) between the UE#1 and S-GW#1 is established, and the UE#1 becomes a state communicable with a communication partner (website or the like) on the ISP network 40 through the S-GW#1 and P-GW (<9> in FIG. 6).

Thereafter, in the event that an offload condition is satisfied regarding this communication (TCP communication), processing for offload is executed at the oGW 70, traffic to be offloaded (uplink) is transferred from the oGW 70 serving as the sorting point to the oGW 70 serving as the anchor point, and is transmitted to a communication partner (ISP network 40) through the offload network 50. Also, downlink traffic from the communication partner is received at the oGW 70 serving as the anchor point via the offload network 50, transferred to the oGW 70 serving as the sorting point, and further transferred to the eNB 11 (see FIG. 6).

Operation Example 2

Restoration from Non-communication State of UE

Next, description will be made regarding operation after UE 60 is activated (e.g., powered on) until an oGW 70 identifies a user of a communication line passing through this oGW, in accordance with the sequence illustrated in FIG. 7.

Operation 2-1: An MME 21 (MME#1) transmits a GUTI Relocation Command message to the UE 60 (UE#x) (<1> in FIG. 7), and receives a reply message, GUTI Relocation Completion, to be sent back from the UE#1 (<2> in FIG. 7).

As a result thereof, upon detecting the non-communication state of the UE 60 (UE#x), the MME 21 (MME#1) transmits UE Context Release Command (FIG. 30) which is a disconnect request message to an eNB 11 (eNB#1) (<3> in FIG. 7). At this time, an oGW 70 (oGW#1) intercepts the UE Context Release Command message (<4> in FIG. 7), and performs the processing illustrated in FIG. 38. Note that the eNB#1 performs processing according to the UE Context Release Command message, and transmits a completion message, UE Context Release Completion, to the MME#1 (<5> in FIG. 7).

Operation 2-2: According to the processing in FIG. 38, as illustrated in FIG. 46, a record corresponding to the intra-oGW UE identifier (8000) is deleted from the Bearer utilization subscriber determination table 175A and Bearer table 175B. Also, as illustrated in FIG. 47, a record of the TOF relay management table 178a corresponding to the intra-oGW-anchor UE identifier (4000) is deleted.

Operation 2-3: In FIG. 7, along with movement of the UE#1 in the non-communication state, the UE#1 transmits Tracking Area Update Request which is a tracking position updating request message to the MME#1 (<6> in FIG. 7). With reception of the Tracking Area Update Request message as a trigger, the MME#1 transmits a Create Session Request message (FIG. 15) to a new S-GW 22 (S-GW#3) (<7> in FIG. 7).

Thereupon, an S11 interception device 80 (S11 interception device#2) different from an S11 interception device#1 intercepts the Create Session Request message (<8> in FIG. 7), and performs the processing illustrated in FIG. 22. Next, a Create Session Response message (FIG. 16) is transmitted from the S-GW#3 to the MME#1 (<9> in FIG. 7). The S11 interception device#2 intercepts the Create Session Response (<10> in FIG. 7), and performs the processing illustrated in FIG. 23.

Operation 2-4: According to the processing illustrated in FIGS. 22 and 23, as illustrated in FIG. 48, an intra-S11-interception-device UE identifier (2000), user identifier (IMSI), MME-side UE control identification information, and S-GW-side UE control identification information are registered and set in the user determination state table 82a (In FIG. 48, indicated with a reference numeral "82a (#2)") in the S11 interception device#2.

Also, the intra-S11-interception-device UE identifier (2000), user line identifier, and uplink line assignment information are registered in the user-TEID (GTP-u) correspondence table 82b (In FIG. 48, indicated with a reference numeral "82b (#2)") in the S11 interception device#2, and are determined.

Operation 2-5: Next, as illustrated in FIG. 7, the MME#1 transmits Delete Session Request which is a session disconnect request message to the S-GW#1 which is the previous S-GW (old S-GW) (<11> in FIG. 7). Thereupon, the S11 interception device#1 which is the previous S11 interception device (old S11 interception device) intercepts the Delete Session Request (<12> in FIG. 7), and performs the processing illustrated in FIG. 24.

Operation 2-6: According to the processing illustrated in FIG. 24, as illustrated in FIG. 48, records of the user determination state table 82a and user-TEID (GTP-u) correspondence table 82b (In FIG. 48, indicated with reference numerals 82a (#1) and 82b (#1)) that the previous S11 interception device (S11 interception device#1) has are deleted.

Note that, as illustrated in FIG. 7, upon performing session disconnect processing based on Delete Session Request, the S-GW#1 transmits a completion message Delete Session Response to the MME#1.

Operation 2-7: Next, as illustrated in FIG. 7, upon being restored from the non-communication state, the UE#x transmits Service Request which is a communication start request message to the MME#1 (<13> in FIG. 7). With reception of the Service Request as a trigger, the MME#1 transmits Initial Context Setup Request (FIG. 25) to the eNB#1 (<14> in FIG. 7). Thereupon, the oGW 70 (oGW#1) intercepts the Initial Context Setup Request (<15> in FIG. 7), and performs the processing illustrated in FIGS. 33 and 41.

Operation 2-8: According to the processing illustrated in FIGS. 33 and 41, as illustrated in FIG. 46, a new intra-oGW UE identifier (8100) corresponding to the UE#x is acquired, and the record corresponding to this intra-oGW UE identifier (8100) is added to the Bearer utilization subscriber determination table 175A and Bearer table 175B.

Operation 2-9: Further, as illustrated in FIG. 47, a new intra-oGW-anchor UE identifier (4100) corresponding to the UE#x is acquired, and a record corresponding to the intra-oGW-anchor UE identifier (4100) is added to the TOF relay management table 178a.

Operation Example 3

Reactivation of UE

Description will be made regarding operation after the UE#x is stopped (e.g., powered off) and is reactivated until an oGW 70 identifies a user of a communication line passing through this oGW, in accordance with the sequence illustrated in FIG. 8.

Operation 3-1: Upon the UE#x being stopped, Detach Request which is a disconnect request message is transmitted from the UE#x to the previous MME (old MME (MME#1) (<1> in FIG. 8). With reception of the Detach Request as a trigger, the MME#1 transmits Delete Session Request (FIG. 17) which is a session deletion request message to an S-GW#1 (<2> in FIG. 8). An S11 interception device#1 intercepts the Delete Session Request (<3> in FIG. 8), and executes the processing illustrated in FIG. 24.

Operation 3-2: According to the processing illustrated in FIG. 24, as illustrated in FIG. 49, a record including an intra-S11-interception-device UE identifier (1000) is deleted from the user determination state table 82a and user-TEID (GTP-u) correspondence table 82b in an S11 interception device#1.

Operation 3-3: In FIG. 8, the S-GW#1 performs processing according to the Delete Session Request, and transmits Delete Session Response which is a reply message to the MME#1 (<4> in FIG. 8). Thereupon, the MME#1 transmits Detach Accept which is a reply message (acceptance of disconnect request) of the Detach Request to the UE#x (<5> in FIG. 8).

Next, the MME#1 transmits UE Context Release Command (FIG. 30) to an eNB#1 (<6> in FIG. 8). At this time, an oGW#1 intercepts the UE Context Release Command (<7> in FIG. 8), and performs the processing illustrated in FIG. 38. Note that the eNB#1 performs disconnect and resource release processing in accordance with the UE Context Release Command, and transmits UE Context Release Completion which is a completion message to the MME#1 (<8> in FIG. 8).

Operation 3-4: According to the processing illustrated in FIG. 38, as illustrated in FIG. 50, a record corresponding to the intra-oGW UE identifier (8000) is deleted from the Bearer utilization subscriber determination table 175A and Bearer table 175B in the oGW#1. Also, as illustrated in FIG. 51, a record corresponding to the intra-oGW-anchor UE identifier (4000) is deleted from the TOF relay management table 178a in the oGW#1.

Operation 3-5: Thereafter, the UE#x is activated, and Attach Request is transmitted to a new MME#3 (<9> in FIG. 8). Thereupon, the MME#3 performs transmission/reception of Identification Request/Identification Response to/from the MME#1 which is the previous MME (<10> and <11> in FIG. 8).

Thereafter, the MME#3 transmits Create Session Request (FIG. 15) to the S-GW#1 (<12> in FIG. 8). The S11 interception device#1 intercepts the Create Session Request (<13> in FIG. 8), and performs the processing illustrated in FIG. 22.

Also, upon Create Session Response (FIG. 16) being transmitted from the S-GW#1 to the MME#3 (<14> in FIG. 8), the S11 interception device#1 intercepts the Create Session Response (<15> in FIG. 8), and performs the processing illustrated in FIG. 23.

Operation 3-6: According to the processing illustrated in FIGS. 22 and 23, as illustrated in FIG. 49, an intra-S11-interception-device UE identifier (1100) is newly acquired at the S11 interception device#1. A record corresponding to the intra-S11-interception-device UE identifier (1100) is then added to the user determination state table 82a and user-TEID (GTP-u) correspondence table 82b.

Operation 3-7: Next, Initial Context Setup Request (FIG. 25) is transmitted from the MME#3 to the eNB#1 (<16> in FIG. 8). The oGW#1 intercepts the Initial Context Setup Request (<17> in FIG. 8), and performs the processing illustrated in FIGS. 33 and 41.

Operation 3-8: According to the processing illustrated in FIGS. 33 and 41, as illustrated in FIG. 50, a new intra-oGW UE identifier (8100) corresponding to the UE#x is acquired, and a record corresponding to this intra-oGW UE identifier is added to the Bearer utilization subscriber determination table 175A and Bearer table 175B.

Operation 3-9: Also, as illustrated in FIG. 51, a new intra-oGW-anchor UE identifier (4100) as to the UE#1 is acquired, and a record corresponding to the intra-oGW-anchor UE identifier (4100) is added to the TOF relay management table 178a. The user identifier (IMSI) is obtained (received) from the S11 interception device by the processing in S26 in FIG. 33 (see <18> in FIG. 8).

Note that, the eNB#1 which has received the Initial Context Setup Request message transmits an Initial Context Setup Response message which is a reply message to the MME#3 (<19> in FIG. 8).

Operation Example 4

Handover of User Identifier as to S1-based Hanover

At the time of handover from a handover source eNB (Source eNB) to a handover destination eNB (Target eNB) in accordance with movement of the UE#x, operation to hand over a user identifier (IMSI) from a handover source oGW (source oGW) to a handover destination oGW (target oGW) will be described in accordance with the sequence illustrated in FIG. 9.

Operation 4-1: Upon the Source eNB (eNB#1) starting the S1-based handover in accordance with movement of the UE#x, a Handover Required message (FIG. 26) is transmitted from a Source eNB (eNB#1) to a handover source MME (source MME (MME#1)) (<1> in FIG. 9). Thereupon, a Source oGW (oGW#1) intercepts the Handover Required (<2> in FIG. 9), and performs the processing illustrated in FIG. 34.

Figure 52:
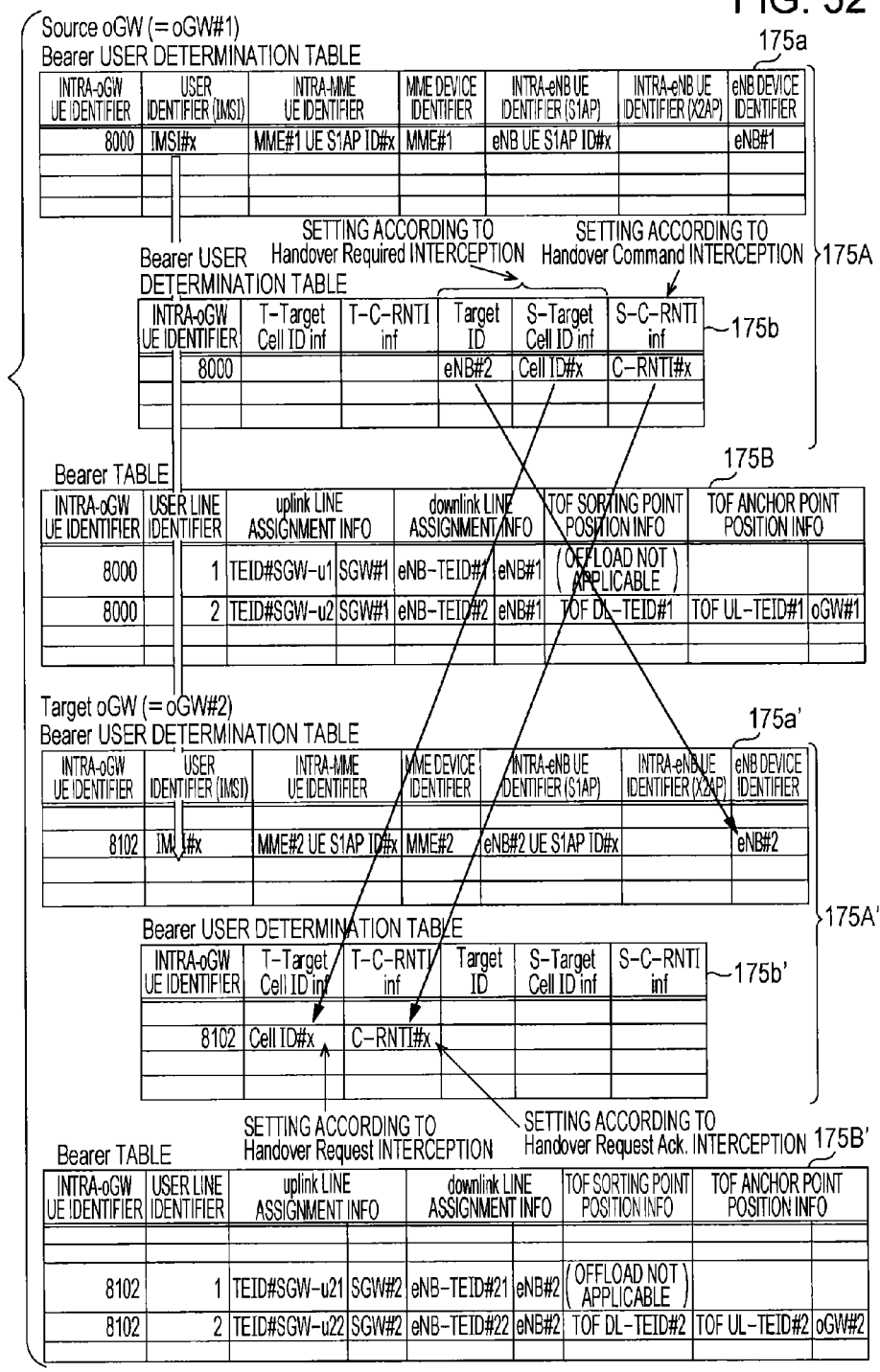
FIG. 52 indicates a setting example of Bearer state management data at the S1-based handover.

Operation 4-2: According to the processing in FIG. 34, as illustrated in FIG. 52, a Target eNB identifier "Target ID", and handover destination cell identification information "S-Target cell identification information" within the Handover Required are registered in the Bearer user determination table 175A in the Source oGW (oGW#1), and are determined.

Operation 4-3: The Source MME (MME#1) transmits a Forward Relocation Request message to a handover destination MME (Target MME (MME#2) (<3> in FIG. 9). Thereupon, the Target MME (MME#2) transmits a Handover Request message (FIG. 27) to a Target eNB#2 (<4> in FIG. 9). A handover destination oGW (Target oGW (oGW#2)) intercepts the Handover Request (<5> in FIG. 9), and executes the processing illustrated in FIGS. 35 and 41.

Operation 4-4: According to interception of the Handover Request message, as illustrated in FIG. 52, the Target oGW#2 stores the intra-oGW UE identifier (8102), intra-MME UE identifier, MME device identifier, eNB device identifier, user line identifier, uplink line assignment information, TOF sorting point position information, TOF anchor point position information, and T-target cell identification information within the oGW#2 in the Bearer user determination table 175A' (tables 175a' and 175b'), and determines these.

Operation 4-5: Also, the Target oGW#2 stores, as illustrated in FIG. 53, the intra-oGW-anchor UE identifier (4102), user line identifier, TOF anchor point position, and TOF sorting point position in the TOF relay management table 178a', and determines these.

Operation 4-6: Next, the Target eNB#2 transmits a Handover Request Ack. message (FIG. 28) to the Target MME#2 (<6> in FIG. 9). Thereupon, the Target oGW#2 intercepts the Handover Request Ack. message (<7> in FIG. 9), and performs the processing illustrated in FIG. 36.

Operation 4-7: According to the processing in FIG. 36, the Target oGW#2 stores, as illustrated in FIG. 52, downlink line assignment information corresponding to the intra-oGW UE identifier (8102) in the Bearer table 175B', and determines this. Also, the Target oGW#2 stores intra-T-Target-cell UE identification information corresponding to the intra-oGW UE identifier (8102) in the Bearer user determination table 175b', and determines this.

Operation 4-8: The Target MME#2 which has received the Handover Request Ack. message transmits a Forward Relocation Response message to the Source MME#1 (<8> in FIG. 9). Thereupon, the Source MME#1 transmits a Handover Command message (FIG. 29) to the Target eNB#1 (<9> in FIG. 9). At this time, the Source oGW#1 intercepts the Handover Command (<10> in FIG. 9), and performs the processing in FIGS. 37 and 42.

Operation 4-9: According to the processing in FIGS. 37 and 42, the Source oGW#1 registers intra-S-Target-cell UE identification information corresponding to the intra-oGW UE identifier (8000) in the Bearer user determination table 175b, and determines this (see FIG. 52).

Thus, the Target ID, S-Target cell identification information, and intra-S-Target-cell UE identification information in the Bearer user determination table 175A of the Source oGW#1 is coincided with the eNB device identifier, T-Target cell identification information, and intra-T-Target-cell UE identification information in the Bearer user determination table 175A' of Target oGW#2. Accordingly, the intra-oGW UE identifier (8000) of the Source oGW#1 can be correlated with the intra-oGW UE identifier (8102) of the Target oGW#2 as to UE#x.

Operation 4-10: Also, as illustrated in FIG. 52, a user identifier (IMSI#x) corresponding to the intra-oGW UE identifier (8000) of the oGW#1 is copied as a user identifier corresponding to the intra-oGW UE identifier (8102) of the oGW#2. The copy thereof is transmitted from the Source oGW#1 to the Target oGW#2, and is stored in the Bearer user determination table 175A' of the Target oGW#2.

Operation 4-11: Also, as illustrated in FIG. 53, a copy of the user identifier (IMSI) in the TOF relay management table 178a of the Source oGW#1 is transmitted from the Source oGW#1 to the Target oGW#2, and is stored as a user identifier corresponding to the intra-oGW-anchor UE identifier in the TOF relay management table 178a' of the Target oGW#2.

Operation 4-12: In FIG. 9, upon ending the processing as to the Handover Request, the Target eNB#2 transmits Handover Notification which is a completion message to the target MME (<10A> in FIG. 9). Thus, the destination eNB of downlink data is switched from the Source eNB to the Target eNB.

Thereafter, as illustrated in FIG. 9, the Source MME#1 transmits a UE Context Release Command message (FIG. 30) to the Source eNB (eNB#1) (<11> in FIG. 9). In this case, the Source oGW#1 intercepts the UE Context Release Command message (<12> in FIG. 9), and performs the processing illustrated in FIG. 38.

Operation 4-13: According to the processing illustrated in FIG. 38, as illustrated in FIG. 52, records of the Bearer user determination table 175A and Bearer table 175B corresponding to the intra-oGW UE identifier (8000) of the Source oGW#1 are deleted, and the resource of the sorting point of the Source oGW#1 is released.

Operation Example 5

Handover of User Identifier as to X2-based Handover

Next, description will be made regarding operation to hand over a user identifier from a source oGW to a target oGW at the time of handover from the Source eNB to the Target eNB in accordance with movement of UE, in accordance with the sequence in FIG. 10.

Operation 5-1: Upon a Source eNB#1 starting the X2-based handover in accordance with movement of UE#x, an X2AP: Handover Request message (FIG. 31) is transmitted from the Source eNB#1 to a target eNB#2 (<1> in FIG. 10). A Source oGW#1 intercepts the X2AP: Handover Request message (<2> in FIG. 10), and performs the processing illustrated in FIG. 39.

Operation 5-2: According to the processing illustrated in FIG. 39, as illustrated in FIG. 54, an intra-eNB UE identifier (X2AP) in the Bearer user determination table 175B in the Source oGW#1 is determined.

Operation 5-3: A Target oGW#2 intercepts the X2AP: Handover Request message (<3> in FIG. 10), and performs the processing illustrated in FIGS. 39 and 41.

Operation 5-4: According to the processing illustrated in FIGS. 39 and 41, with the Target oGW#2, as illustrated in FIG. 54, the intra-oGW UE identifier (8102), intra-MME UE identifier, MME device identifier, eNB device identifier, user line identifier, uplink line assignment information, TOF sorting point position information, and TOF anchor point position information of the oGW#2 are determined and stored in the Bearer user determination table 175A' and Bearer table 175B'.

Operation 5-5: Also, with the Target oGW#2, as illustrated in FIG. 55, the intra-oGW-anchor UE identifier (4102), user line identifier, TOF anchor point position, and TOF sorting point position of the oGW#2 are determined and stored in the TOF relay management table 178a'.

Operation 5-6: As described above, with the Bearer user determination table 175A' of the Target oGW#2, the intra-MME UE identifier is determined. At this time, as illustrated in FIG. 54, the intra-MME UE identifier in the Bearer user determination table 175A of the oGW#1 is coincided with the intra-MME UE identifier in the Bearer user determination table 175A' of the oGW#2. Thus, correlation between the intra-oGW UE identifier (8000) of the oGW#1 and the intra-oGW UE identifier (8102) of the oGW#2 as to the UE#x can be realized.

Operation 5-7: As illustrated in FIG. 54, a copy of the user identifier (IMSI#x) of the oGW#1 corresponding to the intra-oGW UE identifier (8000) of the oGW#1 is transmitted from the oGW#1 to the oGW#2. The copy of the user identifier is stored in the Bearer user determination table 175A' of the oGW#2 as a user identifier corresponding to the intra-oGW UE identifier (8102). The copy of the user identifier (IMSI#x) is, as illustrated in FIG. 55, stored in the TOF relay management table 178a' as a user identifier corresponding to the intra-oGW-anchor UE identifier (4102) of the oGW#2.

Operation 5-8: Thereafter, though not illustrated in FIG. 10, the Target eNB#2 transmits an X2AP: UE Context Release message (FIG. 32) to the Source eNB#1. Thereupon, the Source oGW#1 intercepts the X2AP: UE Context Release message, and performs the processing illustrated in FIG. 40.

Operation 5-9: According to the processing illustrated in FIG. 40, a record corresponding to the intra-oGW UE identifier (8000) of the Source oGW#1 is deleted from the Bearer user determination table 175A and Bearer table 175B (see FIG. 50). The resource of the sorting point 75 of the Source oGW#1 is then released.

According to the above-mentioned operation examples 1 through 5, the oGW 70 obtains the user identification information (IMSI) of a communication line to be passed through this oGW 70 from an S11 interception device 80. Also, at the time of handover of UE 60, the IMSI may be handed over from a source oGW to a target oGW. Based on such IMSI, the subscriber information of this user may be obtained, and also, statistical information (transit traffic amount and communication quality) correlated with this user may be collected.

Operation Example 6

Activation of UE When Installing S11 Interception Device Near MME

With the operation examples 1 through 5, description has been made regarding operation in the event that an S11 interception device 80 is installed closer to an S-GW 22 than an MME 21. With the operation 6 and operation examples thereafter, description will be made regarding an operation example in the event that an S11 interception device 80 is installed closer to an MME 21 than an S-GW 22.

Description will be made as the operation example 6 regarding operation after User Equipment 60 (UE#x) is activated (e.g., powered on) until an oGW 70 identifies a user of a communication line passing through this oGW, in accordance with the sequence illustrated in FIG. 6.

Figure 58:
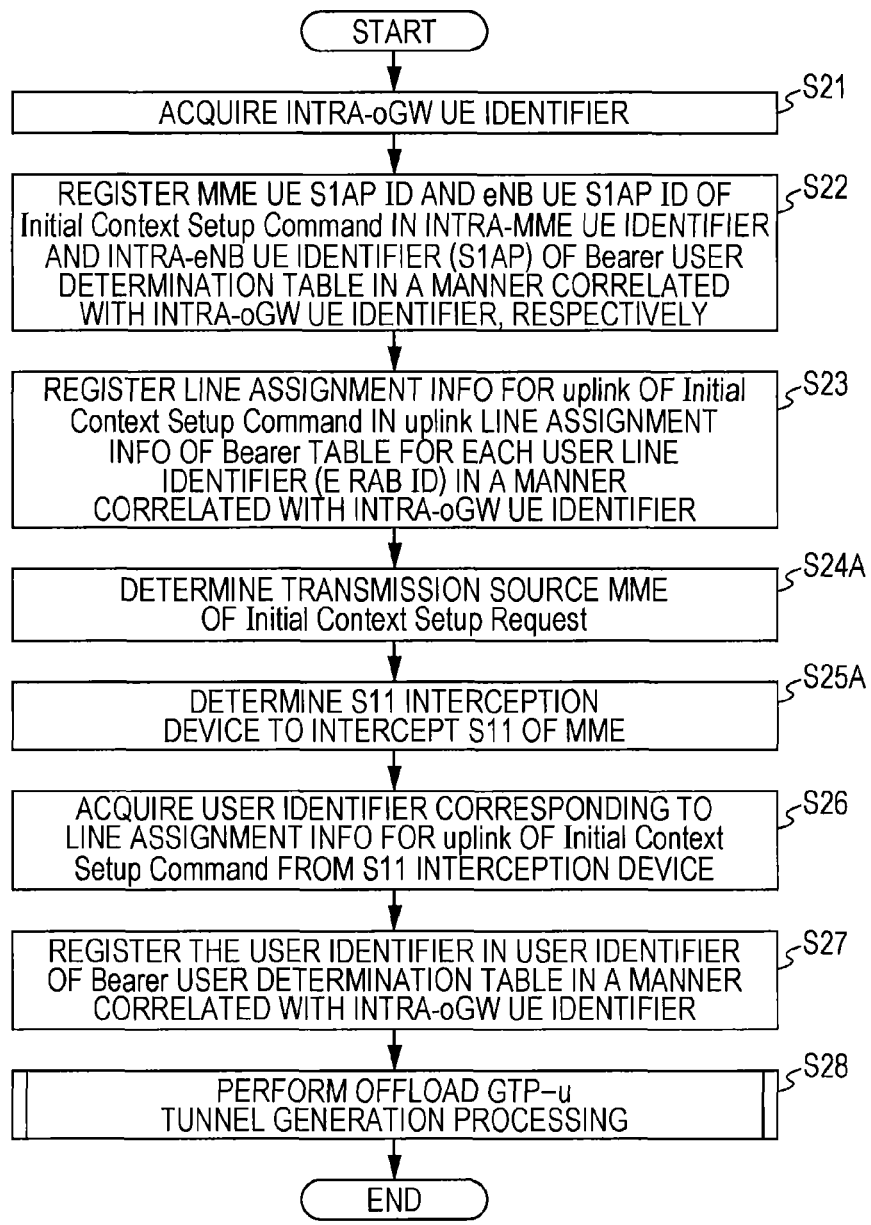
FIG. 58 illustrates, with a case where an S11 interception device has been disposed near an MME, an example of a processing flow in the event that the Initial Context Setup Request message (MME->eNB) has been intercepted.

The operation example 6 differs from the operation example 1 in that the processing flow illustrated in FIG. 58 is applied instead of the processing flow when intercepting an Initial Context Setup Request message (FIG. 33) in the operation example 1.

With the flow illustrated in FIG. 58, processing in S24A and S25A is executed instead of S24 and S25 in FIG. 33.

Specifically, in S24A, the CPU 73 of an oGW 70 determines the transmission source MME 21 of an Initial Context Setup Request message. In S25A, the CPU 73 of the oGW 70 determines the S11 interception device which intercepts an S11 signal of the MME.

FIG. 59 indicates a structure example of S11-intercepted MME information at an oGW. For the above-mentioned processing in S24A and S25A, the oGW 70 includes a S11-intercepted MME housing table as illustrated in FIG. 59, calculates a transmission source MME from the transmission source address of the Initial Context Setup Request message, and determines the corresponding S11 interception device 80.

Except for the above-mentioned point, the operation example 6 is the same as the operation example 1, and accordingly, detailed description will be omitted.

Operation Example 7

Restoration from Non-communication State of UE when Installing S11 Interception Device Near MME Description will be made regarding operation after User Equipment 60 (UE#x) is activated until an oGW 70 identifies a user of a communication line passing through this oGW, in accordance with the sequence illustrated in FIG. 11.

Operation 7-1: An MME 21 (MME#1) transmits a GUTI Relocation Command message to UE 60 (UE#x) (<1> in FIG. 11), and receives a reply message, GUTI Relocation Completion sent back from the UE#1 (<2> in FIG. 11).

As a result thereof, upon detecting the non-communication state of the UE#x, the MME#1 transmits UE Context Release Command (FIG. 30) which is a disconnect request message to an eNB 11 (eNB#1) (<3> in FIG. 11). At this time, the oGW#1 intercepts the UE Context Release Command (<4> in FIG. 11) and performs the processing illustrated in FIG. 38. Note that the eNB#1 performs processing according to the UE Context Release Command message, and transmits a completion message, UE Context Release Completion, to the MME#1 (<5> in FIG. 11).

Operation 7-2: FIG. 60 illustrates a setting example of TEID-IMSI correspondence state data when restoring UE through the idle state of the UE in the event that an S11 interception device is installed near an MME. FIG. 61 illustrates a setting example of the Bearer state management data in the state illustrated in FIG. 60. FIG. 62 illustrates a setting example of the TOF relay state management data in the state illustrated in FIG. 60.

Figure 63:
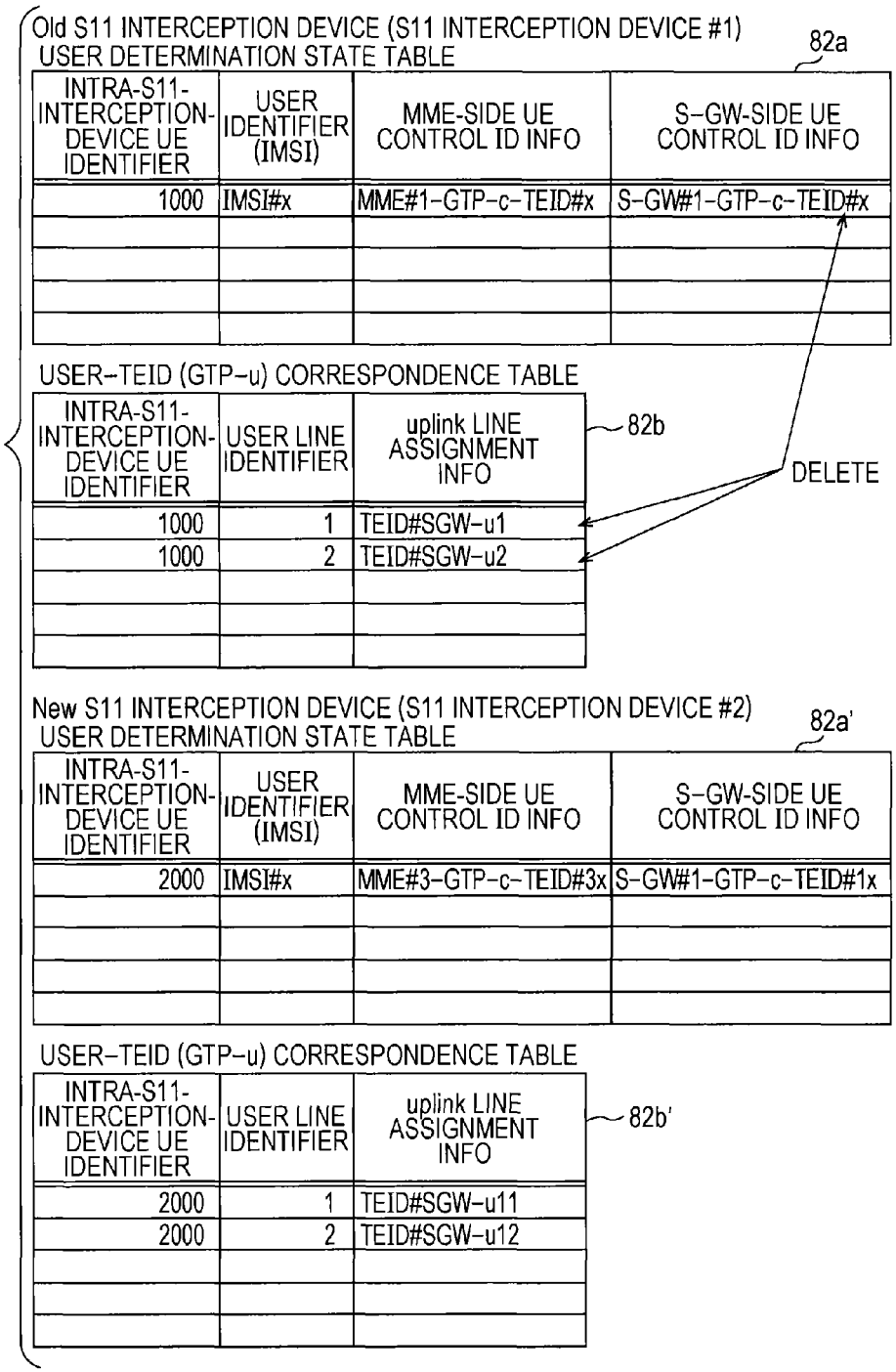
FIG. 63 indicates a setting example of TEID-IMSI correspondence state data after reactivation (re-Attach) of UE in the event that an S11 interception device is disposed near an MME.

According to the processing in FIG. 38, as illustrated in FIG. 61, a record corresponding to the intra-oGW UE identifier (8000) is deleted from the Bearer utilization subscriber determination table 175A and Bearer table 175B. Also, as illustrated in FIG. 63, a record in the TOF relay management table 178a corresponding to the intra-oGW-anchor UE identifier (4000) is deleted.

Operation 7-3: In FIG. 11, in accordance with movement of the UE#1 in the non-communication state, the UE#1 transmits Tracking Area Update Request which is a tracking position updating request message to the MME#1 (<6> in FIG. 11). With reception of the Tracking Area Update Request message as a trigger, the MME#1 transmits a Create Session Request message (FIG. 15) to a new S-GW 22 (S-GW#3) (<7> in FIG. 11).

Thereupon, an S11 interception device 80 (S11 interception device#1) intercepts the Create Session Request message (<8> in FIG. 11), and performs the processing illustrated in FIG. 22. Next, a Create Session Response message (FIG. 16) is transmitted from the S-GW#3 to the MME#1 (<9> in FIG. 11). The S11 interception device#1 intercepts the Create Session Response (<10> in FIG. 11), and performs the processing illustrated in FIG. 23.

Operation 7-4: According to the processing illustrated in FIGS. 22 and 23, as illustrated in FIG. 60, the intra-S11-interception-device UE identifier (1100), user identifier (IMSI), MME-side control identification information, and S-GW-side UE control identification information are registered in the user determination table 82a in the S11 interception device#1, and are determined.

Also, the intra-S11-interception-device UE identifier (1100), user line identifier, and uplink line assignment information are registered in the user-TEID (GTP-u) correspondence table 82b in the S11 interception device#1, and are determined.

Operation 7-5: Next, as illustrated in FIG. 11, the MME#1 transmits Delete Session Request which is a session disconnect request message to the S-GW#1 which is the previous S-GW (old S-GW) (<11> in FIG. 11). Thereupon, the S11 interception device#1 intercepts the Delete Session Request (<12> in FIG. 11), and performs the processing illustrated in FIG. 24.

Operation 7-6: According to the processing illustrated in FIG. 24, as illustrated in FIG. 60, a record corresponding to the intra-S11-interception-device UE identifier (1000) in the S11 interception device#1 is deleted from the user determination state table 82a and user-TEID (GTP-u) correspondence table 82b.

Note that, as illustrate in FIG. 11, after performing session disconnect processing based on the Delete Session Request, the S-GW#1 transmits a completion message Delete Session Response to the MME#1.

Operation 7-7: Next, as illustrated in FIG. 11, upon being restored from the non-communication state, the UE#x transmits Service Request which is a communication start request message to the MME#1 (<13> in FIG. 11). With reception of the Service Request as a trigger, the MME#1 transmits Initial Context Setup Request (FIG. 25) to the eNB#1 (<14> in FIG. 11). Thereupon, an oGW 70 (oGW#1) intercepts the Initial Context Setup Request (<15> in FIG. 11), and performs the processing illustrated in FIGS. 58 and 41.

Operation 7-8: According to the processing illustrated in FIGS. 58 and 41, as illustrated in FIG. 61, a new intra-oGW UE identifier (8100) corresponding to the UE#x is acquired, and a record corresponding to this intra-oGW UE identifier (8100) is added to the Bearer utilization subscriber determination table 175A and Bearer table 175B. The user identifier (IMSI) is obtained from the S11 interception device#1 (see <16> in FIG. 11).

Operation 7-9: Further, as illustrated in FIG. 62, a new intra-oGW-anchor UE identifier (4100) corresponding to the UE#x is acquired, and a record corresponding to the intra-oGW-anchor UE identifier (4100) is added to the TOF relay management table 178a.

Operation Example 8

Reactivation of UE when Installing S11 Interception Device Near MME

Description will be made regarding operation after UE#x is stopped (e.g., powered off) and is reactivated until an oGW 70 identifies a user of a communication line passing through this oGW, in accordance with the sequence illustrated in FIG. 12.

Operation 8-1: Upon the UE#x being stopped, Detach Request which is a disconnect request message is transmitted from UE#x to the previous MME (old MME (MME#1) (<1> in FIG. 12). With reception of the Detach Request as a trigger, the MME#1 transmits Delete Session Request (FIG. 17) which is a session deletion request message to the S-GW#1 (<2> in FIG. 12). An S11 interception device#1 intercepts the Delete Session Request (<3> in FIG. 12), and executes the processing illustrated in FIG. 24.

Operation 8-2: According to the processing illustrated in FIG. 24, as illustrated in FIG. 63, a record including an intra-S11-interception-device UE identifier (1000) is deleted from the user determination state table 82a and user-TEID (GTP-u) correspondence table 82b in the S11 interception device#1.

Operation 8-3: In FIG. 12, an S-GW#1 performs processing according to the Delete Session Request, and transmits Delete Session Response which is a reply message to the MME#1 (<4> in FIG. 12). Thereupon, the MME#1 transmits Detach Accept which is a reply message (acceptance of disconnect request) of the Detach Request to the UE#x (<5> in FIG. 12).

Next, the MME#1 transmits UE Context Release Command (FIG. 30) to an eNB#1 (<6> in FIG. 12). At this time, an oGW#1 intercepts the UE Context Release Command (<7> in FIG. 12), and performs the processing illustrated in FIG. 38. Note that the eNB#1 performs disconnect and resource release processing in accordance with the UE Context Release Command, and transmits UE Context Release Completion which is a completion message to the MME#1 (<8> in FIG. 12).

Operation 8-4: According to the processing illustrated in FIG. 38, as illustrated in FIG. 64, a record corresponding to the intra-oGW UE identifier (8000) is deleted from the Bearer utilization subscriber determination table 175A and Bearer table 175B in the oGW#1. Also, as illustrated in FIG. 65, a record corresponding to the intra-oGW-anchor UE identifier (4000) is deleted from the TOF relay management table 178a in the oGW#1.

Operation 8-5: Thereafter, the UE#x is activated, and Attach Request is transmitted to a new MME#3 (<9> in FIG. 12). Thereupon, the MME#3 performs transmission/reception of Identification Request/Identification Response to/from the MME#1 which is the previous MME (<10> and <11> in FIG. 12).

Thereafter, the MME#3 transmits Create Session Request (FIG. 15) to the S-GW#1 (<12> in FIG. 12). Thereupon, a new S11 interception device 80 (S11 interception device#2) intercepts the Create Session Request (<13> in FIG. 12), and performs the processing illustrated in FIG. 22.

Also, upon Create Session Response (FIG. 16) being transmitted from the S-GW#1 to the MME#3 (<14> in FIG. 12), the S11 interception device#2 intercepts the Create Session Response (<15> in FIG. 12), and performs the processing illustrated in FIG. 23.

Operation 8-6: According to the processing illustrated in FIGS. 22 and 23, an intra-S11-interception-device UE identifier (1100) is newly acquired at the S11 interception device#2. A record corresponding to the intra-S11-interception-device UE identifier (1100) is then added to the user determination state table 82a' and user-TEID (GTP-u) correspondence table 82b'.

Operation 8-7: Next, Initial Context Setup Request (FIG. 25) is transmitted from the MME#3 to the eNB#1 (<16> in FIG. 12). The oGW#1 intercepts the Initial Context Setup Request (<17> in FIG. 12), and performs the processing illustrated in FIGS. 58 and 41.

Operation 8-8: According to the processing illustrated in FIGS. 58 and 41, as illustrated in FIG. 64, a new intra-oGW UE identifier (8100) corresponding to the UE#x is acquired, and a record corresponding to this intra-oGW UE identifier is added to the Bearer utilization subscriber determination table 175A and Bearer table 175B.

Operation 8-9: Also, as illustrated in FIG. 65, a new intra-oGW-anchor UE identifier (4100) as to the UE#1 is acquired, and a record corresponding to the intra-oGW-anchor UE identifier (4100) is added to the TOF relay management table 178a. The user identifier (IMSI) is obtained (received) from the S11 interception device#1 by the processing in S26 in FIG. 58 (see <18> in FIG. 12).

Note that, the eNB#1 which has received the Initial Context Setup Request message transmits an Initial Context Setup Response message which is a reply message to the MME#1 (<19> in FIG. 12).

Operation Example 9

Operation to perform S1-based handover from a Source eNB to a Target eNB in accordance with movement of UE 60 while keeping TCP communication at UE 60 in the event that an S11 interception device 80 is disposed near an MME 21 is the same as with the operation example 4. Also, operation to perform X2-based handover from the Source eNB to the Target eNB in accordance with movement of the UE 60 while keeping TCP communication at the UE 60 is the same as with the operation example 5. Therefore, detailed description of these operations will be omitted.

Operation Example 10

Obtaining User Identifier from S11 Interception Device during S1-Based Handover

Description will be made regarding operation to hand over a user identifier (IMSI) from a handover source oGW (source oGW) to a handover destination oGW (target oGW) at the time of handover from a handover source eNB (Source eNB) to a handover destination eNB (Target eNB) in accordance with movement of the UE#x, in accordance with the sequence illustrated in FIG. 13. The operation example 10 differs from the operation examples 4 and 9 in that a user identifier (IMSI) is obtained from an S11 interception device 80 even at the time of handover.

Operation 10-1: Upon a Source eNB (eNB#1) starting the S1-based handover in accordance with movement of UE#x, a Handover Required message (FIG. 26) is transmitted from the Source eNB (eNB#1) to a handover destination MME (source MME (MME#1)) (<1> in FIG. 13). Thereupon, a Source oGW (oGW#1) intercepts the Handover Required (<2> in FIG. 13), and performs the processing illustrated in FIG. 34.

Operation 10-2: According to the processing in FIG. 34, as illustrated in FIG. 52, the Target eNB identifier "Target ID" and handover destination cell identification information "S-Target cell identification information" within the Handover Required are registered in the Bearer user determination table 175A of the Source oGW (oGW#1), and are determined.

Operation 10-3: The Source MME (MME#1) transmits a Forward Relocation Request message to a handover destination MME (Target MME (MME#2)) (<3> in FIG. 13). Thereupon, the Target MME (MME#2) transmits Create Session Request (FIG. 15) to a Target S-GW (S-GW#2) (<4> in FIG. 13).

At this time, a Target S11 interception device 80 (S11 interception device#2) intercepts the Create Session Request (<5> in FIG. 13), and performs the processing illustrated in FIG. 22.

Operation 10-4: According to the processing illustrated in FIG. 22, as illustrated in FIG. 55, the intra-S11-interception-device UE identifier (2000), user identifier (IMSI), and MME-side UE control identification information in the user determination state table 82a' of the target S11 interception device (S11 interception device#2) are determined. Also, the intra-S11-interception-device UE identifier and user line identifier in the user-TEID (GTP-u) correspondence table 82b' are determined.

Operation 10-5: Next, as illustrated in FIG. 13, upon Create Session Response (FIG. 16) being transmitted from the target S-GW (S-GW#2) to the target MME (MME#2) (<6> in FIG. 13), the S11 interception device#2 intercepts the Create Session Response (<7> in FIG. 13), and performs the processing illustrated in FIG. 23.

Operation 10-6: According to the processing illustrated in FIG. 23, as illustrated in FIG. 66, S-GW-side control identification information as to the intra-S11-interception-device UE identifier (2000) in the user determination state table 82a' of the target S11 interception device#2 is determined. Also, uplink line assignment information corresponding to (intra-S11-interception-device UE identifier, user line identifier) in the user-TEID (GTP-u) correspondence table 82b' of the target S11 interception device#2 is determined.

Operation 10-7: Next, the target MME (MME#2) transmits a Handover Request message (FIG. 27) to Target eNB#2 (<8> in FIG. 13). The handover destination oGW (Target oGW (oGW#2)) intercepts the Handover Request (<9> in FIG. 13), and executes the processing illustrated in FIGS. 67 and 41.

FIG. 67 illustrates a processing flow at the time of interception of Handover Request of the oGW in the operation example 9. The processing flow in FIG. 67 differs from the processing flow in FIG. 35 in that S44 through S47 are inserted between S43 and S28 in the processing flow illustrated in FIG. 35 (the remaining processing is the same as with FIG. 35, and accordingly, description will be omitted).

In S44, the CPU 73 of the oGW determines the S-GW which terminates a line for uplink from the line assignment information for uplink of the Handover Request. In the next S45, the CPU 73 determines the S11 interception device 80 which intercepts an S11 signal of the determined S-GW. In the next S46, the CPU 73 accesses the determined S11 interception device 80 to receive a user identifier (IMSI) corresponding to the line assignment information for uplink of the Handover Request. In the next S47, the CPU 73 registers the user identifier in the Bearer user determination table 175A in a manner correlated with the intra-oGW UE identifier.

Operation 10-8: With the operation example 10, the Target oGW#2 performs the processing in FIG. 67, determines, in S44, the Target S-GW#2, determines, in S45, the Target S11 interception device#2, and obtains, in S46, a user identifier (IMSI) corresponding to the S11 interception device#2 (see <10> in FIG. 13).

According to the processing in FIGS. 67 and 41, as illustrated in FIG. 52, the Target oGW#2 stores the intra-oGW UE identifier (8102), intra-MME UE identifier, MME device identifier, eNB device identifier, user line identifier, uplink line assignment information, TOF sorting point position information, TOF anchor point position information, and T-target cell identification information within the oGW#2 in the Bearer user determination table 175A', and determines these.

Operation 10-9: Also, the Target oGW#2 stores, as illustrated in FIG. 53, the intra-oGW-anchor UE identifier (4102), user line identifier, TOF anchor point position, and TOF sorting point position in the TOF relay management table 178a', and determines these.

Subsequent processing is similar to the operation 4-6 through operation 4-13 described in the operation example 4, and accordingly, description will be omitted.

Operation Example 11

Obtaining User Identifier from S11 Interception Device During X2-Based Handover

Description will be made regarding operation until handover is performed from a Source eNB to a Target eNB in accordance with movement of UE, in accordance with the sequence in FIG. 14.

Operation 11-1: Upon a Source eNB (eNB#1) starting the X2-based handover in accordance with movement of with UE#x, an X2AP: Handover Request message (FIG. 31) is transmitted from the Source eNB (eNB#1) to a Target eNB (eNB#2) (<1> in FIG. 14). A Source oGW (oGW#1) intercepts the X2AP: Handover Request (<2> in FIG. 14), and performs the processing illustrated in FIG. 68.

Operation 11-2: The processing flow illustrated in FIG. 68 includes S85A, S86A, S87A, and S88A instead of S85 through S87 in FIG. 39, which differs from the processing flow in FIG. 39, but other than which is the same as the processing flow in FIG. 39.

Figure 68:
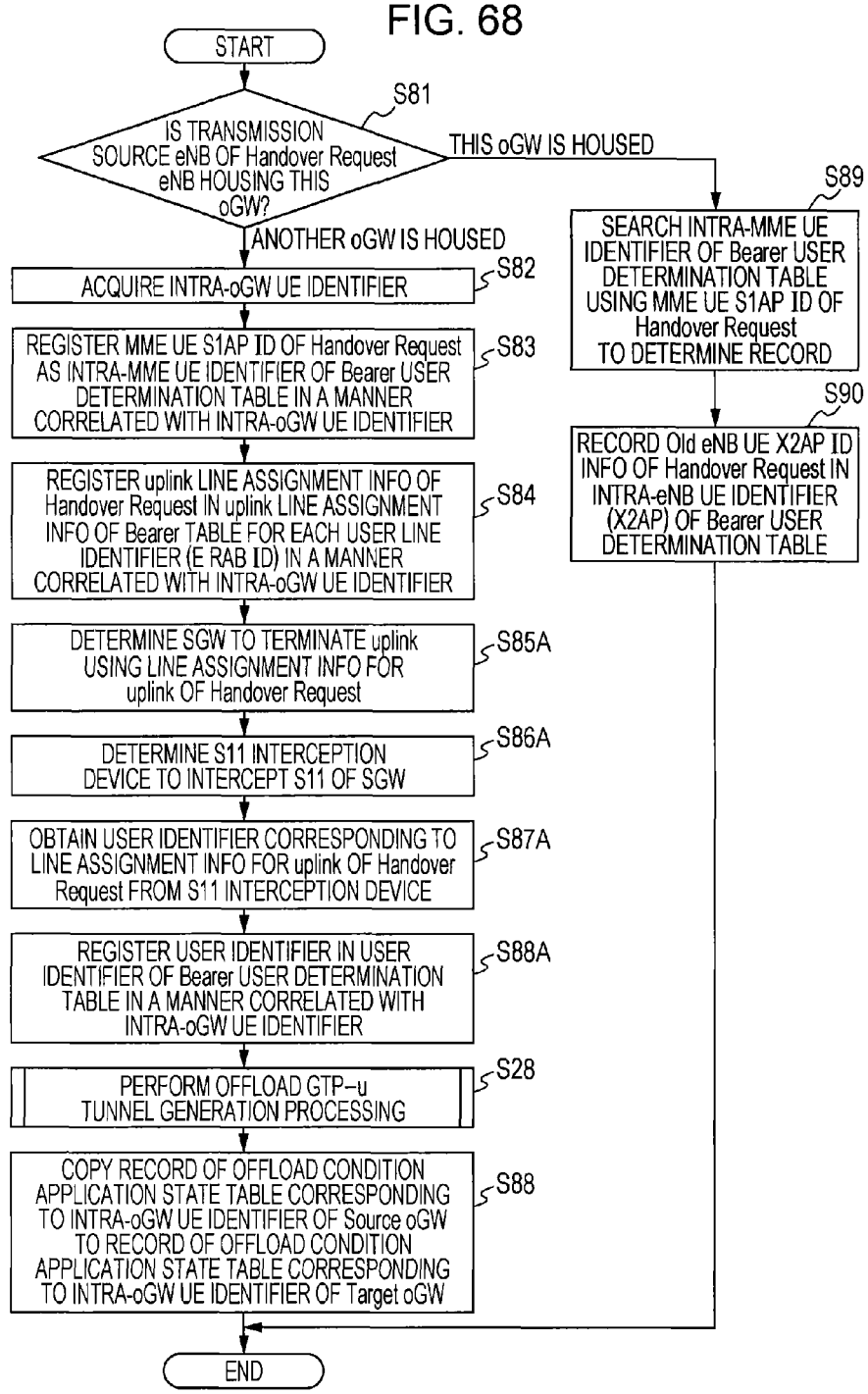
FIG. 68 illustrates an example of a processing flow in the event of receiving a user identifier from an S11 interception device disposed near an S-GW at the time of interception of an X2AP: Handover Request message (source eNB->target eNB)

In S85A in FIG. 68, the CPU 73 of the oGW determines the S-GW 22 which terminates a line for uplink from the line assignment information for uplink of the Handover Request. In the next S86A, the CPU 73 determines the S11 interception device 80 which intercepts an S11 signal of the determined S-GW 22. In the next S87A, the CPU 73 accesses the determined S11 interception device 80 to receive a user identifier (IMSI) corresponding to the line assignment information for uplink of the Handover Request. In the next S88A, the CPU 73 registers the user identifier in the Bearer user determination table 175A in a manner correlated with the intra-oGW UE identifier. These operations are the same as S44 through S47 in the operation example 10.

Operation 11-3: According to the processing illustrated in FIG. 68, the Source oGW#1 determines, in S85A, the Target S-GW#2, determines, in S86A, the Target S11 interception device#2, and obtains, in S87A, the corresponding user identifier (IMSI) from the S11 interception device#2 (see FIG. 69). According to the processing illustrated in FIG. 68, as illustrated in FIG. 54, the intra-eNB UE identifier (X2AP) in the Bearer user determination table 175A at the Source oGW#1 is determined.

Operation 11-4: A Target oGW#2 intercepts the X2AP: Handover Request message (<3> in FIG. 14), and performs the processing illustrated in FIGS. 69 and 41. According to the processing in FIG. 68, the Source oGW#1 obtains a user identifier (IMSI) from the S11 interception device#2 (see <4> in FIG. 14), and can register this in the Bearer user determination table 82a'.

Operation 11-5: According to the processing in FIGS. 68 and 41, with the Target oGW#2, as illustrated in FIG. 54, the intra-oGW UE identifier (8102), intra-MME UE identifier, MME device identifier, eNB device identifier, user line identifier, uplink line assignment information, TOF sorting point position information, and TOF anchor point position information of the oGW#2 are determined, and stored in the Bearer user determination table 175A' and Bearer table 175B', and are determined.

Operation 11-6: Also, with the Target oGW#2, as illustrated in FIG. 69, the intra-oGW-anchor UE identifier (4102), user line identifier, TOF anchor point position, and TOF sorting point position of the oGW#2 are determined, and are stored in the TOF relay management table 178a'.

Subsequent processing is similar to the operation 5-6 and thereafter in the operation example 5, and accordingly, description will be omitted.

According to the embodiment, an S11 interception device 80 intercepts the user identifier (IMSI) of UE relating to communication for offload traffic, and stores this in a manner correlated with the uplink line assignment information. An oGW 70 obtains from the user identifier (IMSI) from an S11 interception device 80, and stores this. The IMSI is handed over from a source oGW to a target oGW in the event that the oGW is changed by handover of UE.

Thus, with an offload device (oGW) which offloads traffic at a joint point between a core network (EPC network) and a wireless access network, a user of a communication line to pass through this oGW can be determined. Thus, a function which is conscious of a user (e.g., determination of a user has to be performed) such as accounting or the like can be provided with this oGW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network system comprising:
    a plurality of base stations, each with which a mobile station communicates;
    a core network to include one or more gateways, each with which the plurality of base stations communicates;
    a plurality of offload devices, each arranged between the base station and the gateway, each to serve as the gateway of an anchor point at which traffic to be offloaded is transmitted to or received from an offload network, and each to serve as the gateway of a relay point at which the traffic to be offloaded is relayed between the anchor point and one of the plurality of base stations with which the mobile station is communicating;
    a control station to control the traffic between the mobile station and the gateway; and
    one or more interception devices, each to intercept the traffic flowing into the interface connecting the control station and the gateway;
    wherein each of the one or more interception devices obtains user identification information of the mobile station by intercepting the traffic, and stores the user identification information,
    wherein each of the offload devices intercepts the traffic between the mobile station and the gateway at a time of starting of the traffic between the mobile station and the gateway, obtains line information used for the traffic, and receives the user identification information corresponding to the obtained line information from the interception device,
    wherein a first offload device of the offload devices, in a case that the first offload device serves as the offload device for a handover source according to handover of the mobile station, receives the user identification information from a second offload device of the offload devices for the handover source or the interception device.

2. The network system according to claim 1, wherein the interception device intercepts the traffic on the S11 interface that is a interface between the gateway and the control station so as to obtain the user identification information.

3. The network system according to claim 1, wherein the offload device intercepts the traffic for setting a path between the base station and the gateway so as to obtain the line information.

4. An offload device comprising:
    a processor to execute interception processing to intercept traffic between a mobile station and a gateway at a time of starting of the traffic between the mobile station and the gateway and to obtain line information used for the traffic by intercepting the traffic;
    a communication device to receive user identification information corresponding to the line information obtained by the interception processing from a interception device to intercept the traffic between a control station and the gateway; and
    a storage device to store the user identification information;
    wherein the interception processing obtains the user identification information from a second offload device for the handover source or the interception device, in a case that the interception processing is executed in a first offload device serving as the offload device for a handover source according to handover of the mobile station, and
    wherein the offload device is arranged between a base station and the gateway included in a core network including a plurality of base stations, serves as the gateway of an anchor point at which traffic to be offloaded is transmitted to or received from an offload network, and serves as the gateway of a relay point at which the traffic to be offloaded is relayed between the anchor point and one of the plurality of base stations with which the mobile station is communicating.

5. A user identification information obtaining method for an offload device comprising:
    intercepting traffic between a mobile station and a gateway at a time of starting of the traffic between a mobile station and the gateway;
    obtaining line information used for the traffic by intercepting the traffic;
    receiving user identification information corresponding to the obtained line information from a interception device to intercept the traffic between the control station and the gateway; and
    obtaining the user identification information from a second offload device for the handover source or the interception device, in a case that the intercepting is executed in a first offload device serving as the offload device for a handover source according to handover of a mobile station, by a processor.

* * * * *